(12) United States Patent
McAlister

(10) Patent No.: US 9,169,821 B2
(45) Date of Patent: Oct. 27, 2015

(54) FUEL INJECTION SYSTEMS WITH ENHANCED CORONA BURST

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/273,479

(22) Filed: May 8, 2014

(65) Prior Publication Data

US 2015/0037738 A1    Feb. 5, 2015

Related U.S. Application Data

(63) Continuation-in-part of application No. 14/266,508, filed on Apr. 30, 2014, which is a continuation of application No. 13/844,488, filed on Mar. 15, 2013, now Pat. No. 8,746,197, application No. 14/273,479, (Continued)

(51) Int. Cl.
*F02M 67/06*    (2006.01)
*F02B 51/04*    (2006.01)

(Continued)

(52) U.S. Cl.
CPC .............. *F02P 15/006* (2013.01); *F02B 17/005* (2013.01); *F02B 23/101* (2013.01); *F02M 27/04* (2013.01); *F02M 57/06* (2013.01); *F23Q 3/006* (2013.01); *F23Q 13/00* (2013.01); *F02M 51/061* (2013.01)

(58) Field of Classification Search
CPC ....... F02P 15/006; F02P 23/045; F02P 9/007; F02M 57/06; F02M 27/04
USPC ..................... 123/297, 143 B, 536
See application file for complete search history.

(56) References Cited

U.S. PATENT DOCUMENTS 1,307,088 A    6/1919    Drummond
1,451,384 A    4/1923    Whyte
(Continued)

FOREIGN PATENT DOCUMENTS

CN    1411535 A    4/2003
DE    3443022 A1    5/1986
(Continued)

OTHER PUBLICATIONS

U.S. Appl. No. 13/797,351, filed Mar. 12, 2013, McAlister.
(Continued)

*Primary Examiner* — Hai Huynh
(74) *Attorney, Agent, or Firm* — Perkins Coie LLP

(57) ABSTRACT

Methods, systems, and devices are disclosed for delivery a fluidic substance using Lorentz forces. In one aspect, a method to accelerate particles into a chamber includes distributing a fluidic substance between electrodes configured at a location proximate a chamber, in which electrodes include a low work function material, generating a current of ionized particles by applying an electric field between the electrodes to ionize at least some of the fluidic substance, and producing a Lorentz force to accelerate the ionized particles into the chamber. In some implementations, the method further includes applying an electric potential on an antenna electrode interfaced at the port to induce a corona discharge into the chamber, in which the corona discharge ignites the ionized particles within the chamber.

14 Claims, 32 Drawing Sheets

Related U.S. Application Data filed on May 8, 2014, which is a continuation-in-part of application No. 14/266,489, filed on Apr. 30, 2014, which is a continuation of application No. 13/844,240, filed on Mar. 15, 2013, now Pat. No. 8,752,524.

(60) Provisional application No. 61/722,090, filed on Nov. 2, 2012.

(51) Int. Cl.

| | | |
|---|---|---|
| *F02P 23/00* | (2006.01) | |
| *F02P 15/00* | (2006.01) | |
| *F02B 17/00* | (2006.01) | |
| *F23Q 3/00* | (2006.01) | |
| *F23Q 13/00* | (2006.01) | |
| *F02B 23/10* | (2006.01) | |
| *F02M 27/04* | (2006.01) | |
| *F02M 57/06* | (2006.01) | |
| *F02M 51/06* | (2006.01) | |

(56) References Cited

U.S. PATENT DOCUMENTS

| | | |
|---|---|---|
| 2,255,203 A | 9/1941 | Wiegand |
| 2,864,974 A | 12/1958 | Beye |
| 3,058,453 A | 10/1962 | May |
| 3,060,912 A | 10/1962 | May |
| 3,081,758 A | 3/1963 | May |
| 3,149,620 A | 9/1964 | Cataldo |
| 3,243,335 A | 3/1966 | Faile |
| 3,286,164 A | 11/1966 | De Huff |
| 3,361,161 A | 1/1968 | Schwartz |
| 3,373,724 A | 3/1968 | Papst |
| 3,520,961 A | 7/1970 | Suda et al. |
| 3,551,738 A | 12/1970 | Young |
| 3,594,877 A | 7/1971 | Suda et al. |
| 3,608,050 A | 9/1971 | Carman et al. |
| 3,689,293 A | 9/1972 | Beall |
| 3,762,170 A | 10/1973 | Fitzhugh |
| 3,802,194 A | 4/1974 | Tanasawa et al. |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,066,046 A | 1/1978 | McAlister |
| 4,095,580 A | 6/1978 | Murray et al. |
| 4,099,494 A | 7/1978 | Goloff et al. |
| 4,105,004 A | 8/1978 | Asai et al. |
| 4,122,816 A | 10/1978 | Fitzgerald et al. |
| 4,135,481 A | 1/1979 | Resler, Jr. |
| 4,183,467 A | 1/1980 | Sheraton et al. |
| 4,203,393 A | 5/1980 | Giardini |
| 4,313,412 A | 2/1982 | Hosaka et al. |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,402,036 A | 8/1983 | Hensley et al. |
| 4,469,160 A | 9/1984 | Giamei |
| 4,483,485 A | 11/1984 | Kamiya et al. |
| 4,511,612 A | 4/1985 | Huther et al. |
| 4,514,712 A | 4/1985 | McDougal |
| 4,528,270 A | 7/1985 | Matsunaga |
| 4,531,679 A | 7/1985 | Pagdin |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,688,538 A | 8/1987 | Ward et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,830,286 A | 5/1989 | Asslaender et al. |
| 4,841,925 A | 6/1989 | Ward |
| 4,922,883 A | 5/1990 | Iwasaki |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,076,223 A | 12/1991 | Harden et al. |
| 5,095,742 A | 3/1992 | James et al. |
| 5,109,817 A | 5/1992 | Cherry |
| 5,131,376 A | 7/1992 | Ward et al. |
| 5,134,982 A | 8/1992 | Hosoi |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,343,699 A | 9/1994 | McAlister |
| 5,361,737 A | 11/1994 | Smith et al. |
| 5,377,633 A | 1/1995 | Wakeman |
| 5,392,745 A | 2/1995 | Beck |
| 5,394,852 A | 3/1995 | McAlister |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,473,502 A | 12/1995 | Bonavia et al. |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,534,781 A | 7/1996 | Lee et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,598,699 A | 2/1997 | Few et al. |
| 5,605,125 A | 2/1997 | Yaoita |
| 5,607,106 A | 3/1997 | Bentz et al. |
| 5,649,507 A | 7/1997 | Gregoire et al. |
| 5,676,026 A | 10/1997 | Tsuboi et al. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,769,049 A | 6/1998 | Nytomt et al. |
| 5,797,427 A | 8/1998 | Buescher |
| 5,806,581 A | 9/1998 | Haasch et al. |
| 5,832,906 A | 11/1998 | Douville et al. |
| 5,853,175 A | 12/1998 | Udagawa |
| 5,863,326 A | 1/1999 | Nause et al. |
| 5,876,659 A | 3/1999 | Yasutomi et al. |
| 5,896,842 A | 4/1999 | Abusamra |
| 5,915,272 A | 6/1999 | Foley et al. |
| 5,930,420 A | 7/1999 | Atkins et al. |
| 5,941,207 A | 8/1999 | Anderson et al. |
| 6,015,065 A | 1/2000 | McAlister |
| 6,017,390 A | 1/2000 | Charych et al. |
| 6,026,568 A | 2/2000 | Atmur et al. |

(56) References Cited

U.S. PATENT DOCUMENTS

| | | |
|---|---|---|
| 6,029,175 A | 2/2000 | Chow et al. |
| 6,029,627 A | 2/2000 | VanDyne |
| 6,029,640 A | 2/2000 | Bengtsson et al. |
| 6,062,498 A | 5/2000 | Klopfer |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,138,639 A | 10/2000 | Hiraya et al. |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,335,065 B1 | 1/2002 | Steinlage et al. |
| 6,340,015 B1 | 1/2002 | Benedikt et al. |
| 6,360,721 B1 | 3/2002 | Schuricht et al. |
| 6,360,730 B1 | 3/2002 | Koethe |
| 6,378,485 B2 | 4/2002 | Elliott |
| 6,386,178 B1 | 5/2002 | Rauch |
| 6,443,373 B1 | 9/2002 | Portugues |
| 6,446,597 B1 | 9/2002 | McAlister |
| 6,453,660 B1 | 9/2002 | Johnson et al. |
| 6,455,173 B1 | 9/2002 | Marijnissen et al. |
| 6,478,007 B2 | 11/2002 | Miyashita et al. |
| 6,483,311 B1 | 11/2002 | Ketterer et al. |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,532,315 B1 | 3/2003 | Hung et al. |
| 6,532,737 B1 | 3/2003 | Kozerski et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,556,746 B1 | 4/2003 | Zhao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,587,239 B1 | 7/2003 | Hung |
| 6,599,028 B1 | 7/2003 | Shu et al. |
| 6,615,899 B1 | 9/2003 | Woodward et al. |
| 6,626,164 B2 | 9/2003 | Hitomi et al. |
| 6,663,027 B2 | 12/2003 | Jameson et al. |
| 6,668,630 B1 | 12/2003 | Kuglin et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,722,340 B1 | 4/2004 | Sukegawa et al. |
| 6,725,826 B2 | 4/2004 | Esteghlal |
| 6,745,744 B2 | 6/2004 | Suckewer et al. |
| 6,756,140 B1 | 6/2004 | McAlister |
| 6,763,811 B1 | 7/2004 | Tamol, Sr. |
| 6,772,965 B2 | 8/2004 | Yildirim et al. |
| 6,776,352 B2 | 8/2004 | Jameson |
| 6,786,200 B2 | 9/2004 | Viele et al. |
| 6,832,472 B2 | 12/2004 | Huang et al. |
| 6,832,588 B2 | 12/2004 | Herden et al. |
| 6,841,309 B1 | 1/2005 | Alpay et al. |
| 6,845,920 B2 | 1/2005 | Sato et al. |
| 6,850,069 B2 | 2/2005 | McQueeney et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,881,386 B2 | 4/2005 | Rabinovich et al. |
| 6,883,490 B2 | 4/2005 | Jayne |
| 6,883,507 B2 | 4/2005 | Freen |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,940,213 B1 | 9/2005 | Heinz et al. |
| 6,954,074 B2 | 10/2005 | Zhu et al. |
| 6,976,683 B2 | 12/2005 | Eckert et al. |
| 6,978,767 B2 | 12/2005 | Bonutti |
| 6,984,305 B2 | 1/2006 | McAlister |
| 6,993,960 B2 | 2/2006 | Benson |
| 6,994,073 B2 | 2/2006 | Tozzi et al. |
| 7,006,993 B1 | 2/2006 | Cheong et al. |
| 7,007,658 B1 | 3/2006 | Cherry et al. |
| 7,013,863 B2 | 3/2006 | Shiraishi et al. |
| 7,025,358 B2 | 4/2006 | Ueta et al. |
| 7,032,031 B2 | 4/2006 | Jungck et al. |
| 7,032,845 B2 | 4/2006 | Dantes et al. |
| 7,051,070 B2 | 5/2006 | Tuttle et al. |
| 7,062,463 B2 | 6/2006 | Knapp |
| 7,070,126 B2 | 7/2006 | Shinogle |
| 7,073,480 B2 | 7/2006 | Shiraishi et al. |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,124,964 B2 | 10/2006 | Bui |
| 7,131,426 B2 | 11/2006 | Ichinose et al. |
| 7,137,382 B2 | 11/2006 | Zhu et al. |
| 7,138,046 B2 | 11/2006 | Roychowdhury |
| 7,140,347 B2 | 11/2006 | Suzuki et al. |
| 7,198,208 B2 | 4/2007 | Dye et al. |
| 7,204,133 B2 | 4/2007 | Benson et al. |
| 7,249,578 B2 | 7/2007 | Fricke et al. |
| 7,255,290 B2 | 8/2007 | Bright et al. |
| 7,272,487 B2 | 9/2007 | Christen et al. |
| 7,278,392 B2 | 10/2007 | Zillmer et al. |
| 7,284,543 B2 | 10/2007 | Kato et al. |
| 7,302,792 B2 | 12/2007 | Land, III et al. |
| 7,308,889 B2 | 12/2007 | Post et al. |
| 7,340,118 B2 | 3/2008 | Wlodarczyk et al. |
| 7,367,319 B2 | 5/2008 | Kuo et al. |
| 7,386,982 B2 | 6/2008 | Runkle et al. |
| 7,395,146 B2 | 7/2008 | Ueda et al. |
| 7,404,395 B2 | 7/2008 | Yoshimoto |
| 7,418,940 B1 | 9/2008 | Yi et al. |
| 7,449,034 B1 | 11/2008 | Mikkelsen et al. |
| 7,481,043 B2 | 1/2009 | Hirata et al. |
| 7,484,369 B2 | 2/2009 | Myhre |
| 7,554,250 B2 | 6/2009 | Kadotani et al. |
| 7,625,531 B1 | 12/2009 | Coates et al. |
| 7,626,315 B2 | 12/2009 | Nagase |
| 7,627,416 B2 | 12/2009 | Batenburg et al. |
| 7,628,137 B1 | 12/2009 | McAlister |
| 7,628,145 B2 | 12/2009 | Ishibashi et al. |
| 7,650,873 B2 | 1/2010 | Hofbauer et al. |
| 7,690,352 B2 | 4/2010 | Zhu et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,721,697 B2 | 5/2010 | Smith et al. |
| 7,728,489 B2 | 6/2010 | Heinz et al. |
| 7,814,019 B2 | 10/2010 | Knapp |
| 7,849,833 B2 | 12/2010 | Toyoda |
| 7,865,546 B1 | 1/2011 | Tuzhilin et al. |
| 7,900,850 B2 | 3/2011 | Zengerle et al. |
| 7,918,212 B2 | 4/2011 | Verdejo et al. |
| 8,069,836 B2 | 12/2011 | Ehresman |
| 8,091,536 B2 | 1/2012 | Munshi et al. |
| 8,104,444 B2 | 1/2012 | Schultz |
| 8,132,560 B2 | 3/2012 | Ulrey et al. |
| 8,147,599 B2 | 4/2012 | McAlister |
| 8,192,852 B2 | 6/2012 | McAlister |
| 8,240,293 B2 | 8/2012 | Ikeda |
| 8,267,063 B2 | 9/2012 | McAlister |
| 8,297,254 B2 | 10/2012 | McAlister |
| 8,312,759 B2 | 11/2012 | McAlister |
| 8,318,131 B2 | 11/2012 | McAlister |
| 8,365,700 B2 | 2/2013 | McAlister |
| 8,371,273 B2 | 2/2013 | Ulrey et al. |
| 8,387,599 B2 | 3/2013 | McAlister |
| 8,416,552 B2 | 4/2013 | Gefter et al. |

(56) References Cited

U.S. PATENT DOCUMENTS

| | | | |
|---|---|---|---|
| 8,441,361 | B2 | 5/2013 | McAlister |
| 8,469,009 | B2 | 6/2013 | Munshi et al. |
| 8,511,259 | B2 | 8/2013 | Ambrosini et al. |
| 8,538,663 | B2 | 9/2013 | Jung et al. |
| 8,578,902 | B2 | 11/2013 | Permuy et al. |
| 8,601,819 | B2 | 12/2013 | Hammer et al. |
| 8,646,432 | B1 | 2/2014 | McAlister et al. |
| 8,746,197 | B2 * | 6/2014 | McAlister ............. 123/143 B |
| 8,752,524 | B2 * | 6/2014 | McAlister .................. 123/297 |
| 8,851,047 | B2 | 10/2014 | McAlister |
| 2002/0017573 | A1 | 2/2002 | Sturman |
| 2002/0070287 | A1 | 6/2002 | Jameson et al. |
| 2002/0084793 | A1 | 7/2002 | Hung et al. |
| 2002/0131171 | A1 | 9/2002 | Hung |
| 2002/0131666 | A1 | 9/2002 | Hung et al. |
| 2002/0131673 | A1 | 9/2002 | Hung |
| 2002/0131674 | A1 | 9/2002 | Hung |
| 2002/0131706 | A1 | 9/2002 | Hung |
| 2002/0131756 | A1 | 9/2002 | Hung |
| 2002/0141692 | A1 | 10/2002 | Hung |
| 2002/0150375 | A1 | 10/2002 | Hung et al. |
| 2002/0151113 | A1 | 10/2002 | Hung et al. |
| 2003/0012985 | A1 | 1/2003 | McAlister |
| 2003/0126312 | A1 | 7/2003 | Frolund et al. |
| 2004/0008989 | A1 | 1/2004 | Hung |
| 2004/0084017 | A1 | 5/2004 | Viele et al. |
| 2004/0084026 | A1 | 5/2004 | Zhu et al. |
| 2004/0187847 | A1 | 9/2004 | Viele et al. |
| 2005/0126537 | A1 | 6/2005 | Daniels et al. |
| 2005/0255011 | A1 | 11/2005 | Greathouse et al. |
| 2005/0257776 | A1 | 11/2005 | Bonutti |
| 2006/0016916 | A1 | 1/2006 | Petrone et al. |
| 2006/0169244 | A1 | 8/2006 | Allen |
| 2007/0186903 | A1 | 8/2007 | Zhu et al. |
| 2007/0189114 | A1 | 8/2007 | Reiner et al. |
| 2008/0017170 | A1 | 1/2008 | Moroi et al. |
| 2009/0093951 | A1 | 4/2009 | McKay et al. |
| 2009/0101114 | A1 | 4/2009 | Czekala et al. |
| 2009/0107439 | A1 | 4/2009 | Schultz |
| 2010/0007095 | A1 | 1/2010 | Klinner |
| 2010/0282198 | A1 | 11/2010 | Hampton et al. |
| 2011/0001294 | A1 | 1/2011 | Ikeda |
| 2011/0146619 | A1 | 6/2011 | McAlister |
| 2011/0253104 | A1 | 10/2011 | McAlister |
| 2012/0112620 | A1 | 5/2012 | Lykowski et al. |
| 2012/0180743 | A1 | 7/2012 | Burrows et al. |
| 2012/0199088 | A1 | 8/2012 | Burrows et al. |
| 2012/0210968 | A1 | 8/2012 | Burrows et al. |
| 2013/0149621 | A1 | 6/2013 | McAlister |
| 2014/0041631 | A1 | 2/2014 | McAlister |

FOREIGN PATENT DOCUMENTS

| | | | |
|---|---|---|---|
| DE | 19731329 | C1 | 6/1998 |
| DE | 10356133 | A1 | 7/2005 |
| DE | 102006021192 | A1 | 11/2007 |
| EP | 671555 | A1 | 9/1995 |
| GB | 1038490 | A | 8/1966 |
| JP | 02259268 | | 10/1990 |
| JP | 08049623 | | 2/1996 |
| JP | 2003-239802 | A | 8/2003 |
| JP | 2004324613 | A | 11/2004 |
| JP | 2009287549 | A | 12/2009 |
| WO | 03071167 | A2 | 8/2003 |

OTHER PUBLICATIONS

U.S. Appl. No. 13/843,976, filed Mar. 15, 2013, McAlister.

U.S. Appl. No. 13/844,488, filed Mar. 15, 2013, McAlister.

"Ford DIS/EDIS "Waste Spark" Ignition System." Accessed: Jul. 15, 2010. Printed: Jun. 8, 2011. <http://rockledge.home.comcast.net/.about.rockledge/RangerPictureGalle- ry/DIS.sub.--EDIS.htm>. pp. 1-6.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

"Piston Velocity and Acceleration." EPI, Inc. Accessed: Jun. 28, 2010. Printed: May 16, 2011. <http://www.epi-eng.com/piston.sub.--engine.sub.--technology/piston.su- b.--velocity.sub.--and.sub.--acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dang- ers-to-earth-based-technology>. pp. 1-2.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 1-9.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2011/024778 Applicant: McAlister Technologies, LLC.; Date of Mailing: Sep. 27, 2011 (10 pages).

International Search Report and Written Opinion for Application No. PCT/US2010/054364; Applicant: McAlister Technologies, LLC.; Date of Mailing: Aug. 22, 2011, 8 pages.

Supplementary European Search Report for Application No. EP 10846264.9; Applicant McAlister Technologies, LLC.; Date of Mailin Oct. 2, 2013, 5 pages.

International Search Report and Written Opinion for Application No. PCT/US2013/068355; Applicant McAlister Technologies, LLC; Date of Mailing: Feb. 12, 2014, 15 pages.

* cited by examiner

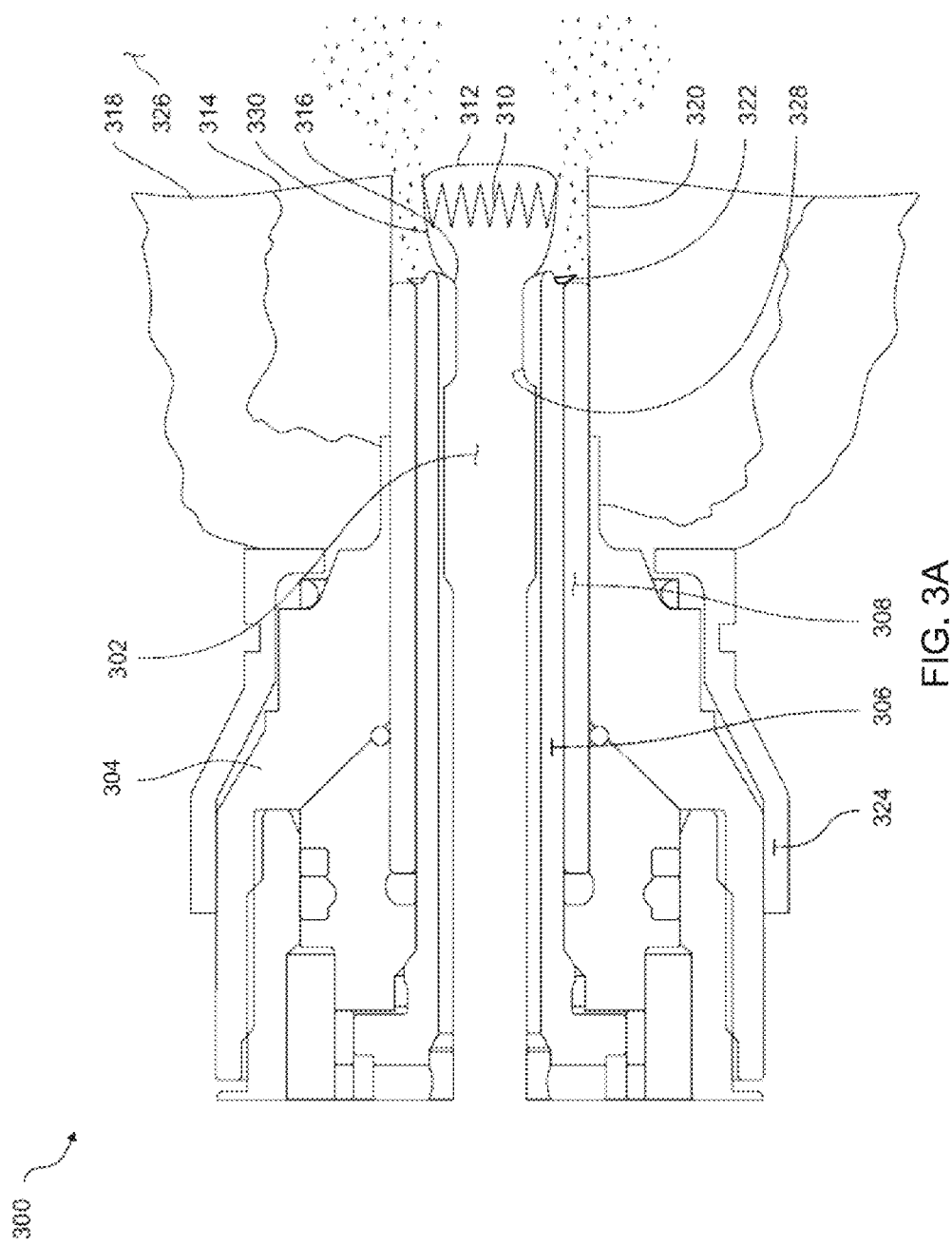

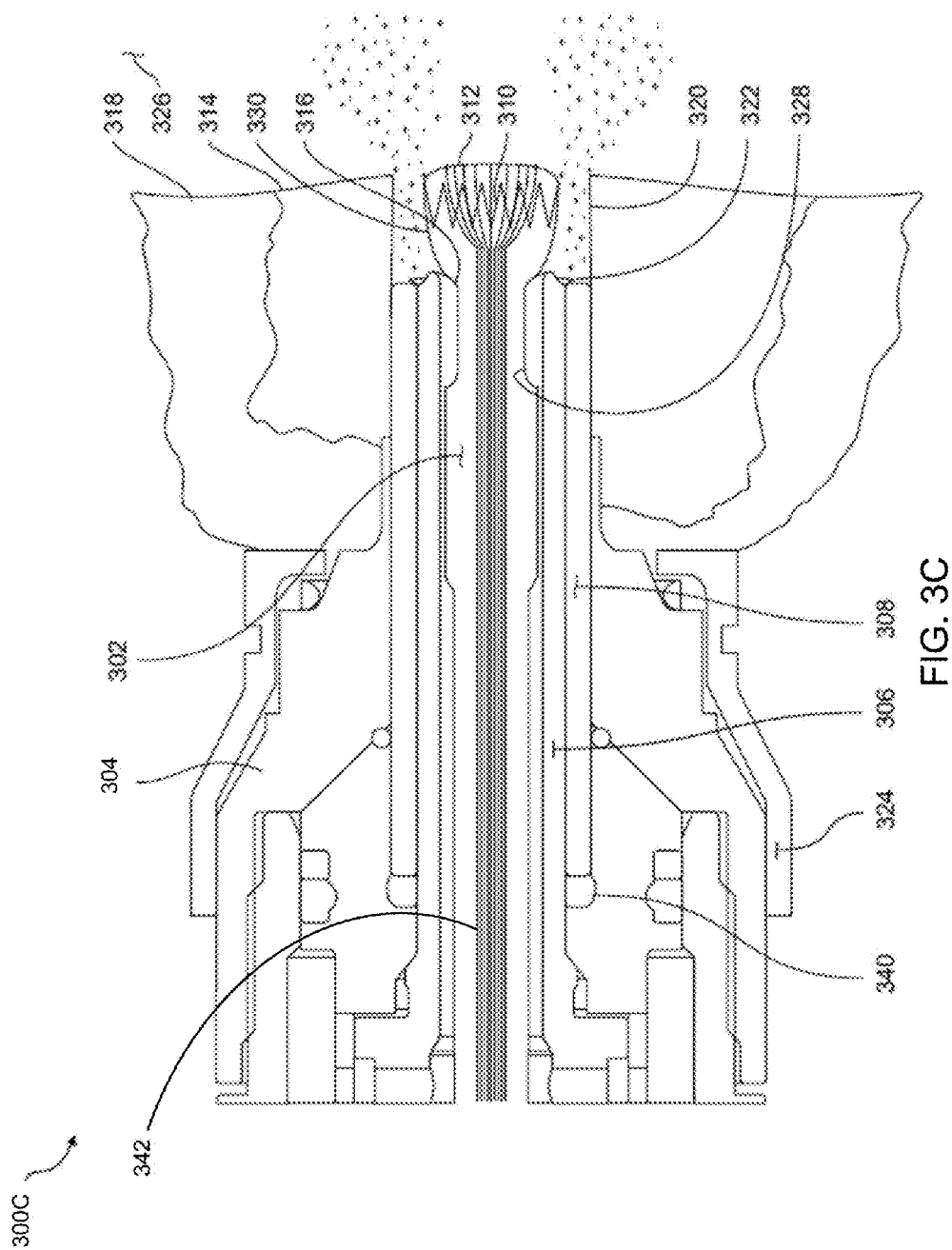

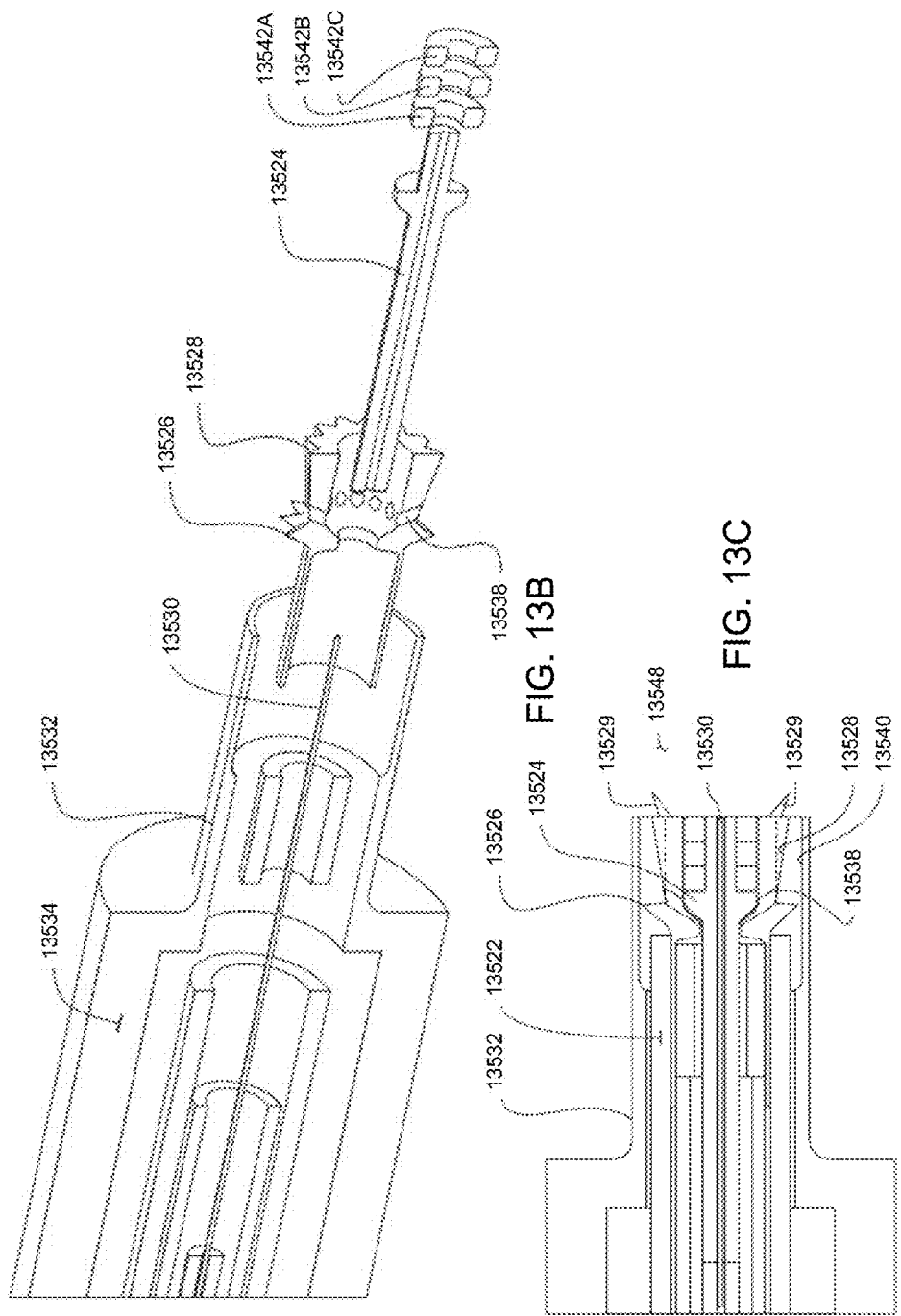

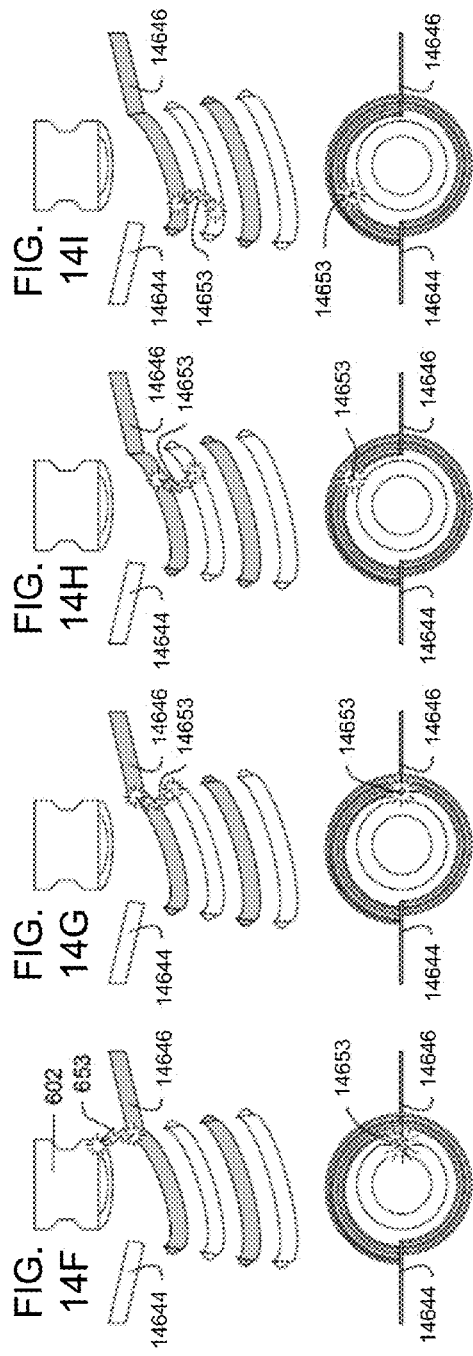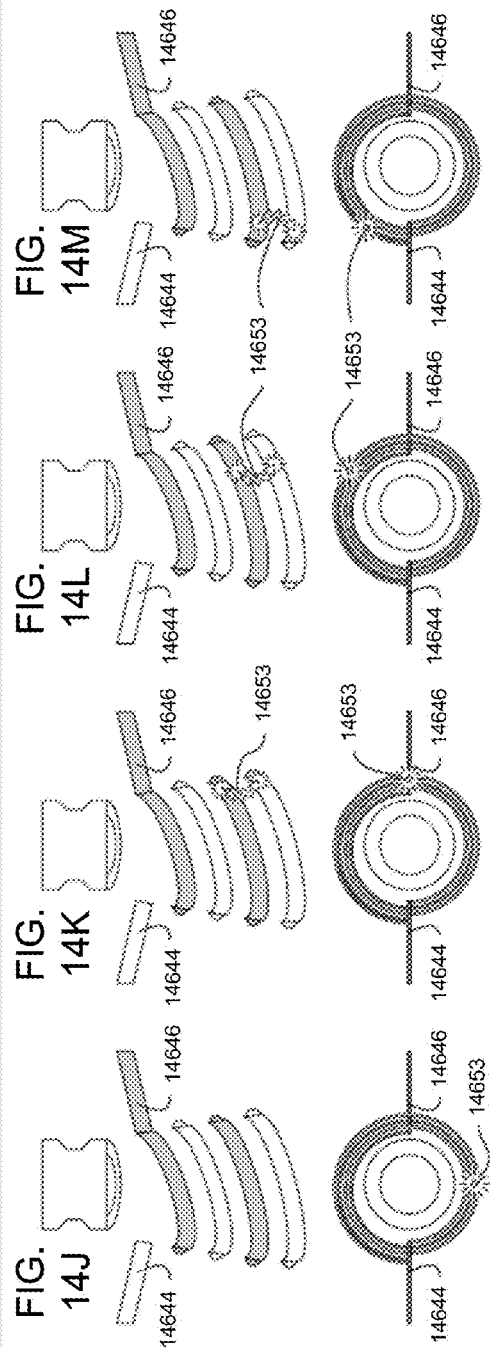

ND CORONA BURST

FUEL INJECTION SYSTEMS WITH ENHANCED CORONA BURST

CROSS-REFERENCE TO RELATED APPLICATIONS

This patent document is related to U.S. application Ser. No. 14/273,482 entitled "SYSTEMS, METHODS, AND DEVICES WITH ENHANCED LORENTZ THRUST", filed on May 8, 2014, which is a continuation-in-part of U.S. application Ser. No. 13/844,240 entitled "FUEL INJECTION SYSTEMS WITH ENHANCED THRUST" filed on Mar. 15, 2013, which claims the priority of U.S. Provisional Application No. 61/722,090 entitled "FUEL INJECTION AND COMBUSTION SYSTEM FOR HEAT ENGINES" filed on Nov. 2, 2012. The patent document is also related to U.S. application Ser. No. 13/844,488 entitled "FUEL INJECTION SYSTEMS WITH ENHANCED CORONA BURST" filed on Mar. 15, 2013, which claims the priority of U.S. Provisional Application No. 61/722,090 entitled "FUEL INJECTION AND COMBUSTION SYSTEM FOR HEAT ENGINES" filed on Nov. 2, 2012. Each of these aforementioned patent applications are incorporated by reference in their entirety as part of the disclosure of this patent document.

TECHNICAL FIELD

This patent document relates to injector technologies.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Fuel injectors used in these fuel injection systems are generally capable of two basic functions. First, they deliver a metered amount of fuel for each inlet stroke of the engine so that a suitable air-fuel ratio can be maintained for the fuel combustion. Second, they disperse fuel to improve the efficiency of the combustion process. Conventional fuel injection systems are typically connected to a pressurized fuel supply, and the fuel can be metered into the combustion chamber by varying the time for which the injectors are open. The fuel can also be dispersed into the combustion chamber by forcing the fuel through a small orifice in the injectors.

Diesel fuel is a petrochemical derived from crude oil. It is used to power a wide variety of vehicles and operations. Compared to gasoline, diesel fuel has a higher energy density (e.g., 1 gallon of diesel fuel contains ~$155 \times 10^6$ J, while 1 gallon of gasoline contains ~$132 \times 10^6$ J). For example, most diesel engines are capable of being more fuel efficient as a result of direct injection of the fuel to produce stratified charge combustion into unthrottled air that has been sufficiently compression heated to provide for the ignition of diesel fuel droplets, as compared to gasoline engines, which are operated with throttled air and homogeneous charge combustion to accommodate such spark plug ignition-related limitations. However, while diesel fuel emits less carbon monoxide than gasoline, it emits nitrogen-based emissions and small particulates that can produce global warming, smog, and acid rain along with serious health problems such as emphysema, cancer, and cardiovascular diseases.

SUMMARY

Techniques, systems, and devices are disclosed for injecting and igniting a fuel using Lorentz forces and/or Lorentz-assisted corona discharges.

In one aspect of the disclosed technology, a method to inject a fuel into a chamber, includes distributing a fuel between electrodes configured at a port of a chamber, generating an ion current of ionized fuel particles by applying an electric field between the electrodes to ionize at least some of the fuel, and producing a Lorentz force to accelerate the ionized fuel particles into the chamber.

In another aspect, a method to combust a fuel in an engine includes distributing an oxidant between electrodes interfaced at a port of a combustion chamber of an engine, ionizing the oxidant by generating an electric field between the electrodes to produce a current of ionized oxidant particles, producing a Lorentz force to accelerate the ionized oxidant particles into the combustion chamber, and injecting a fuel into the combustion chamber, in which the ionized oxidant particles initiate combustion of the fuel in the combustion chamber.

In another aspect, a method to combust a fuel in an engine includes distributing a fuel between electrodes configured at a port of a combustion chamber of an engine, ionizing at least some of the fuel by generating an electric field between the electrodes to produce a current of ionized fuel particles, and producing a Lorentz force to accelerate the ionized fuel particles into the combustion chamber, in which the ionized fuel particles initiate combustion with oxidant compounds present in the combustion chamber.

In another aspect, a method to inject a fuel into an engine includes distributing an oxidant between electrodes configured at a port of a combustion chamber of an engine, ionizing at least some of the oxidant by generating an electric field between the electrodes to produce a current of ionized oxidant particles, producing a Lorentz force to accelerate the ionized oxidant particles into the combustion chamber, distributing a fuel between the electrodes, ionizing at least some of the fuel by generating a second electric field between the electrodes to form a current of ionized fuel particles, and producing a second Lorentz force to accelerate the ionized fuel particles into the combustion chamber.

The subject matter described in this patent document can be implemented in specific ways that provide one or more of the following exemplary features. In some examples, one or more Lorentz accelerations of oxidant ions and/or fuel ions can be initiated at relatively smaller coaxial electrode gaps than the subsequent spacing of electrodes to enable adaptive control of the ion current, velocity and pattern of ions and other swept particles that are launched into the combustion chamber. In some examples, one or more rapid (e.g., nanosecond) corona discharges can be established in patterns based on the thrusted ions that penetrate the combustion chamber by the Lorentz acceleration and/or pressure gradients. For example, the corona discharge can be produced by applying an electric potential on an antenna electrode interfaced with the combustion chamber, in which the corona discharge takes a form of the stratified pattern, and in which the corona discharge ignites the ionized fuel and/or oxidant particles within the combustion chamber. The disclosed technology can include the following operational characteristics and features for releasing heat by combustion of fuel within a gaseous oxidant substance in a combustion chamber. For example, stratified heat generation can be achieved where a gaseous oxidant in a combustion chamber completely oxidizes one or more additions of stratified fuel, and where surplus oxidant substantially insulates the combustion products from the combustion chamber surfaces. For example, the conversion of heat produced by stratified products of combustion into work can be achieved by expanding such products and/or by expanding surrounding inventory of the insulating oxidant. The beginning of combustion can be accelerated before, at, or after top dead center (ATDC) to enable substantial combustion to increase combustion chamber pressure, e.g., before crankshaft rotation through 90° ATDC and completion of combustion before 120° ATDC.

BRIEF DESCRIPTION OF THE DRAWINGS

FIG. 3A shows a schematic of another exemplary embodiment of a fuel injection and ignition system.

FIG. 3C shows a schematic of another exemplary embodiment of a fuel injection and ignition system.

FIG. 13B shows an enlarged and partial cross-sectional perspective view of an exemplary end assembly shown in FIG. 13A that interfaces with a chamber.

FIG. 13C shows a partial cross-sectional side view of the exemplary assembly shown in FIG. 13B.

FIGS. 14E-14M show ion current travel path through an ion launch chamber of an exemplary injection and/or ignition device as it is thrust by a Lorentz force.

Like reference symbols and designations in the various drawings may indicate like elements.

DETAILED DESCRIPTION

Figure 1A:
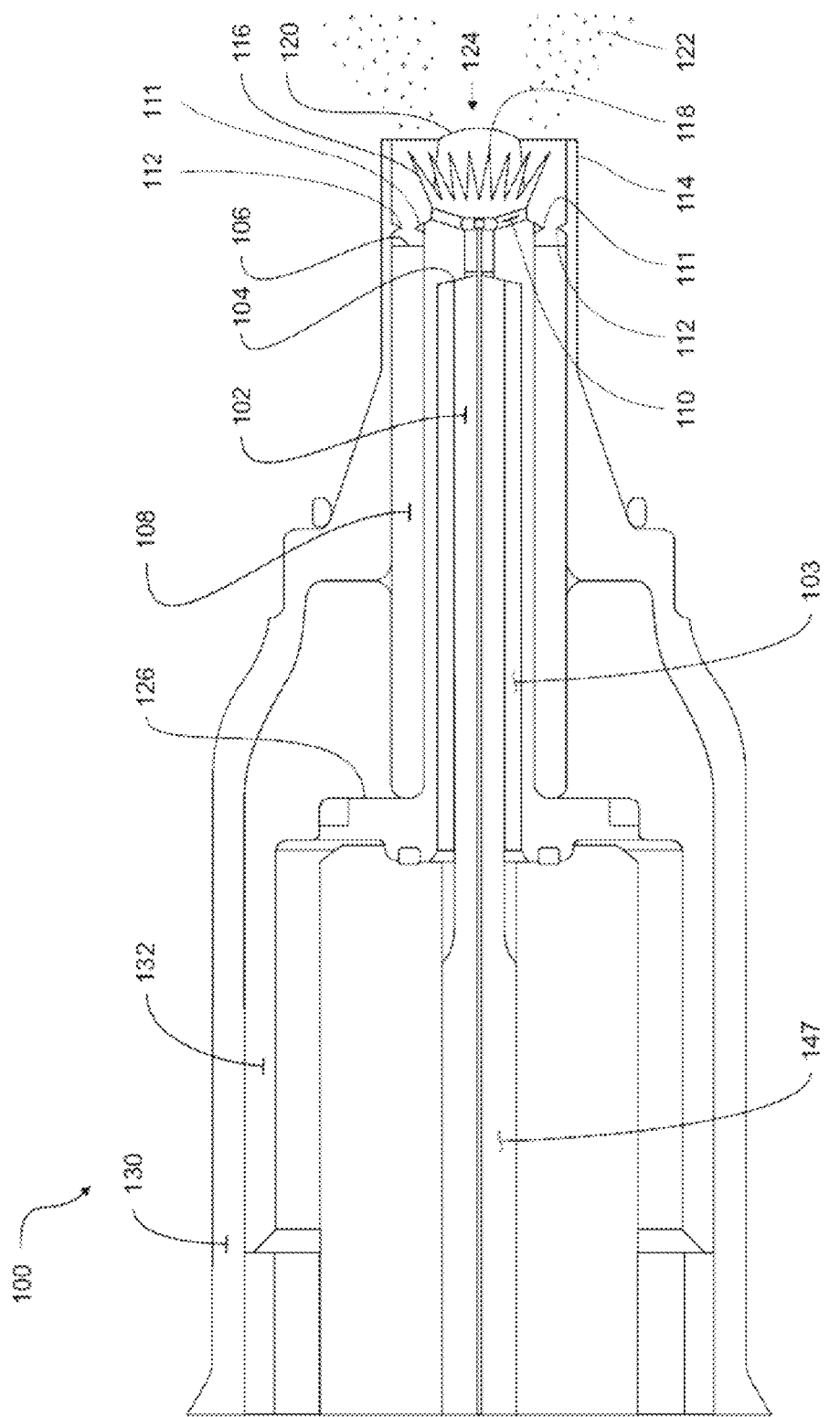
FIG. 1A shows a schematic of an exemplary embodiment of a fuel injection and ignition system.

A Lorentz force is a phenomenon in physics in which a force is exerted on a charged particle q moving with velocity v through an electric field E and magnetic field B, characterized by the expression $F=qE+q(v \times B)$. The Lorentz force includes two components of force, one of which is influenced by the electric field vector and the other by the cross product of the velocity of the particle and the magnetic field vector.

A corona discharge is an electrical discharge that can occur if the field strength of an electric field emanating from a conductor material, e.g., such as from a protruding structure or point of the conductor, exceeds the breakdown field strength of a fluid medium (e.g., such as air). In some examples, the corona discharge can occur if a high voltage is applied to the conductor with protrusions, depending on other parameters including the geometric conditions surrounding the conductor, e.g., like the distance to an electrical ground-like source. In other examples, the corona discharge can occur if a protrusion structure of an electrically grounded conductor (e.g., at zero voltage) is brought near a charged object with a high field enough strength to exceed the breakdown field strength of the medium. For example, in a combustion chamber of an engine, a corona can be produced by applying a large voltage to a central electrode that causes the surrounding gas to become locally ionized due to a non-uniform electric field gradient that exists based on the orientation of the central electrode within geometry of the chamber, forming a conductive envelope. The conductive boundary is determined by the electric field intensity and represents the corona formed in the chamber, in which the field intensity decreases the farther it is from the central electrode. The generated corona can exhibit luminous charge flows.

Techniques, systems, and devices are disclosed for injecting and igniting a fuel using Lorentz forces and/or Lorentz-assisted corona discharges.

In one aspect of the disclosed technology, a method to inject a fuel into a chamber includes distributing a fuel between electrodes configured at a port of a chamber, generating an ion current of ionized fuel particles by applying an electric field between the electrodes to ionize at least some of the fuel, and producing a Lorentz force to accelerate the ionized fuel particles into the chamber.

In some implementations of the method, for example, the accelerated ionized fuel particles can initiate a combustion process with oxidant compounds present in the chamber. For example, the fuel can include, but is not limited to, methane, natural gas, an alcohol fuel including at least one of methanol or ethanol, butane, propane, gasoline, diesel fuel, ammonia, urea, nitrogen, or hydrogen. For example, the oxidant can include, but is not limited to, oxygen molecules ($O_2$), ozone ($O_3$), oxygen atoms (O), hydroxide ($OH^-$), carbon monoxide (CO), or nitrous oxygen ($NO_x$). In some implementations, air can be used to provide the oxidant. For example, implementation of the method can result in the combustion process being completed at an accelerated rate as compared to a combustion process using the direct injection of the fuel. In some implementations, the method can further include applying an electric potential on an antenna electrode interfaced at the port to induce a corona discharge into the chamber, in which the corona discharge ignites the ionized fuel particles within the chamber. For example, the corona discharge can take the form of a stratified pattern. In some implementations, the method can further include distributing an oxidant between the electrodes, generating an ion current of ionized oxidant particles by applying an electric field between the electrodes to ionize at least some of the oxidant, and producing a Lorentz force to accelerate the ionized oxidant particles into the chamber. For example, the Lorentz force can be utilized to accelerate/thrust the ionized oxidant particles and/or the ionized fuel particles into the chamber in a striated pattern.

In another aspect of the disclosed technology, a method to inject a fuel in an engine includes distributing an oxidant between electrodes configured at a port of a combustion chamber of an engine, ionizing at least some of the oxidant by generating an electric field between the electrodes to produce a current of ionized oxidant particles, and producing a Lorentz force to accelerate the ionized oxidant particles into the combustion chamber. For example, in some implementations, such ionized oxidant particles can be utilized to initiate combustion of fuel that is injected into the combustion chamber or present in the combustion chamber. In other implementations, the method includes distributing a fuel between the electrodes, ionizing at least some of the fuel by generating an electric field between the electrodes to form a current of ionized fuel particles, and producing a Lorentz force to accelerate the ionized fuel particles into the combustion chamber. For example, such ionized fuel particles can be utilized to initiate and/or accelerate a combustion process. Implementation of the method can result in the combustion process being completed at an accelerated rate when compared to a combustion process using direct injection of the fuel. For example, the Lorentz force can be utilized to accelerate/thrust the ionized oxidant particles and/or the ionized fuel particles to enter the combustion chamber in a striated pattern. In some implementations, for example, the ionized fuel particles can be accelerated by the Lorentz force to achieve thrust velocities to overtake the previously accelerated ionized oxidant particles in the combustion chamber.

In some implementations, for example, the ionized oxidant particles are produced to be the same charge as the ionized fuel particles. In other implementations, the ionized oxidant particles are produced to be oppositely charged from the ionized fuel particles. For example, in some implementations, the velocities of the ionized fuel particles (or the directly injected fuel) are configured to be sufficiently larger than the oxidant particles to assure the initiation of oxidation and combustion of such fuel particles.

In some implementations, the disclosed systems, devices, and methods can be implemented to enhance compression-ignition of diesel fuel by operating an engine with faster stratified multi-burst deliveries of alternative fuels (e.g., such as hydrogen and methane) and to expedite the beginning and completion of combustion. In some implementations, the faster stratified multi-burst delivery of fuels used for expedited beginning and completion of combustion can be implemented with methane fuel by Lorentz thrusting of ionized fuel (e.g., ionized methane and/or particles derived from methane or from products of methane reactions) and/or ionized oxidants at controlled velocities (e.g., which can range from Mach 0.2 to Mach 10) and accelerated combustion of the stratified charged fuel using corona discharge to the ion patterns established by the one or more Lorentz thrusts (multi-bursts). The velocity of the thrusted ions (e.g., ionized fuel particles and/or ionized oxidant particles) into the combustion chamber can be controlled, as well as the population of ions in the plasma that is thrust into the combustion chamber. Additionally, the disclosed techniques, systems, and devices can control the direction of vectors in the launch/thrust pattern, along with the included angle. Such control of the thrust velocity, the ion population of the formed plasma, and the direction/angle of the ion thrust can be achieved by controlling particular parameters including one or more of applied voltage, current delivered, magnetic lens, fuel pressure into an injector, and/or combustion chamber pressure.

For example, the initial gap in the high compression pressure gas can be controlled to be quite small, e.g., to limit the wear-down of electrode(s) (of an exemplary injector) and be no more than a conventional spark plug at low compression. Also for example, the number of such gaps can be 100 or more, instead of a single gap, to further extend the application life. In some examples, after the initial current is accomplished, it is thrust away from the small gap(s), then the current can be suddenly enlarged to many thousand peak amps by capacitor discharge. Spark-free corona discharge can then be timed to overtake and be patterned by the Mach 1-10 ions.

The disclosed system, devices, and techniques for Lorentz thrust of ions can include thrusting of one or both of the oxidant ions and fuel ions, which can provide an accelerated initiation and completion of combustion. For example, presenting a stratified charge of oxidant ions into the combustion chamber utilizing a Lorentz thrust with subsequent injection of oppositely charged fuel ions (e.g., using Lorentz thrust) can achieve the fastest combustion, but yet, Lorentz thrust of just one of the oxidant ions or fuel ions still accelerates the combustion process. Further enhancement of combustion can be achieved by multi-burst injections of each of the oxidant ions and fuel ions as a function of valve opening and/or Lorentz thrusts at an adaptively adjusted controlled frequency.

The disclosed system, devices, and techniques for corona discharge to produce ignition can be implemented by applying of an electric field potential at a rate or frequency that is too fast for ionization or ion current or "spark" on or between the electrodes. For example, fuel ignition by implementation of the disclosed systems and methods for creating corona discharge bursts can provide benefits including preserving the life of electrodes, e.g., because the electrodes do not experience substantial wear or loss of materials due to non-sparking.

Systems are described that can be utilized to implement the disclosed method.

FIG. 1A shows a cross-sectional view of a schematic showing at least some of the components of a system 100 combining fuel injection and ignition systems. The system 100 includes a containment case 130 to provide structural support for at least some of the components of the system 100. In some exemplary embodiments, the containment case 130 can be configured of an insulative material. In some implementations of the system 100, pressurized fuel is routed to an inward opening flow control valve 102 that is retracted from stationary valve seat 104 by a valve actuator to provide fuel flow from coaxial accumulator and passageway 103 through conduit 106 to one or more intersecting ports 110. The valve actuator of the system 100 that actuates the valve 102 may include by any suitable system, e.g., including hydraulic, pneumatic, magnetostrictive, piezoelectric, magnetic or electromagnetic types of operations. For example, an exemplary valve actuator may be connected and acted on by a push-pull coaxial piezoelectric actuator in an annular space or an appropriately connected electromagnetic winding in the space that acts on a disk armature to open and close the valve 102 by force applied through valve stem 147.

The system 100 includes a multi-electrode coaxial electrode subsystem including electrodes 114, 126, and 116 to ionize oxidants, e.g., provided by air, as well as provide the Lorentz thrust of such ionized fuel and/or oxidant particles. As shown in FIG. 1A, the electrode 114 includes an outside diameter configured to fit within a port to combustion chamber 124, e.g., such as a port ordinarily provided for a diesel fuel injector in a diesel engine. In some implementations, the electrode 114 can be structured as a tubular or cylindrical electrode, e.g., which can be configured to have a thin-walled structure and interfacing with the port to the combustion chamber 124. For example, the electrode 114 can be configured with the electrode 126 as a coaxial electrode, in which an inner tubular or cylindrical electrode structure 126 is surrounded in an outer tubular or cylindrical shell electrode structure 114. The coaxial electrode 114 and 126 can be structured to include ridges or points 112 and/or 111, respectively. The exemplary ridge or point features 111 and/or 112 of the coaxial electrode can concentrate an applied electrical field and reduce the gap for initial production of an initial ion current, e.g., which can occur at a considerably reduced voltage, as compared to ordinary spark plug gap requirements in high compression engines. Additionally, for example, the ridges or points 111 and/or 112 allow the electrode 114 to be substantially supported and/or shielded and protected by the surrounding material of the engine port through which the system 100 operates. The electrode 116 is configured within the annular region of the coaxial structure 114 and interfaces with the port to the combustion chamber 124. In some implementations, for example, the electrode 116 is structured to include electrode antenna 118 at the distal end (interfaced with the port of the combustion chamber 124).

The system includes an insulator and capacitor structure 132 that surrounds at least a portion of a coaxial insulator tube 108 that can be retained in place by axial constraint provided by the ridges or points 111 and/or 112 as shown, and/or other ridges or points not shown in the cross-sectional view of the schematic of FIG. 1A. For example, engine cooling systems including air and liquid cooling systems provide for the material surrounding electrode 114 to be a beneficial heat sink to prevent overheating of electrode 114 or the voltage containment tube 108.

The system 100 can include one or more permanent magnets (not shown in FIG. 1A) on the annular passageway of the valve to produce a magnetic field that when utilized with the applied electric field produces Lorentz acceleration on the ionized particles. In some implementations, for example, the magnetic field can be operated to produce a Lorentz current having a torsional moment. For example, following such initiation, the ion current is rapidly increased in response to rapidly reduced resistance, and the growing ion current is accelerated toward the combustion chamber 124 by Lorentz force.

The disclosed Lorentz thrust techniques can produce any included angle of entry pattern of ionized fuel and/or oxidants into the combustion chamber. For example, in an idling engine, the thrusted particles can be controlled to enter at a relatively small entry angle, whereas in an engine operating at full power, the thrusted particles can be controlled to enter with a relatively large angle and at higher velocity for greatest penetration into the combustion chamber (e.g., the widest included angles provide for greater air utilization to generate greater power in combustion). For example, the system 100 can enable utilization of excess air in the combustion chamber 124 to insulate the stratified charge combustion of fuel and utilize heat in production of expansive work produced by combustion gases, e.g., before heat can be lost to piston, cylinder, or head, etc.

In one example, Lorentz thrusting fuel and/or oxidant particles can be produced by applying of a sufficient electric field strength to initially produce a conductive ion current across a relatively small gap between electrode features, e.g., such as the electrode ridges or points 111 and/or 112. The ion current can be utilized to produce a Lorentz force on the ions of the ion current to thrust/accelerate the ions toward the combustion chamber 124, as shown by the representative spray of ionized particles (ions) 122 in FIG. 1A. The relatively small ion current initiated across the smaller gap between the exemplary electrodes ridges or points 111 and 112 (e.g., as compared to a subsequently larger ion current across the electrodes 116 and 114) first reduces the resistance to establishing a larger ion current, in which the larger ion current can be used to generate an even larger Lorentz force on the particles.

The described Lorentz thrust technique provides control over the produced Lorentz force. For example, the Lorentz force can be increased by controlling the electric field strength to grow the population of ions in the produced ion current. Also, for example, the Lorentz force can be increased by increasing the availability of particles to be ionized to produce the ion current, e.g., by increasing the amount of distributed air and/or fuel in the spacing between the electrodes. Also, for example, the exemplary Lorentz thrust technique can be implemented to ionize a smaller ion population to form the initial ion current, in which the smaller population of ionized particles can be used to thrust other particles (e.g., including non-ionized particles) within the overall population of particles.

In other examples, a magnetic field can be generated and controlled, e.g., by a magnet of the system 100 (not shown in FIG. 1A), in which the magnetic field interacts with the produced ion current to generate the Lorentz force on the ions of the ion current to thrust/accelerate the ions 122 toward the combustion chamber 124. In other examples, a Lorentz force can be produced by the disclosed systems, devices, and methods distinct from producing an ion current, in which the applied electric field between the electrodes (e.g., such as the electrodes 111 and 112) can be controlled to ionize the oxidant and/or fuel particles while not producing a current, and a magnetic field can be generated and controlled, e.g., by a permanent or electromagnet of the system 100, for example, at the general location zone, to interact with the ionized particles in the electric field to produce a Lorentz force to accelerate/thrust and shape the pattern of the ionized particles 122 toward the combustion chamber 124.

Application of such Lorentz thrust of ion currents may be implemented during the intake and/or compression periods of engine operation to produce a stratified charge of activated oxidant particles, e.g., such as electrons, $O_3$, O, $OH^-$, CO, and $NO_x$ from constituents ordinarily present in air that is introduced from the combustion chamber, e.g., such as $N_2$, $O_2$, $H_2O$, and $CO_2$. Fuel may be introduced before, at, or after the piston reaches top dead center (TDC) to start the power stroke following one or more openings of the valve 102. For example, fuel particles can be first accelerated by pressure drop from annular passageway 103 to the annular passageway between the coaxial electrode structure 114 and the electrode 116. The electrodes 116 and 114 ionize the fuel particles, e.g., with the same or opposite charge as the oxidant ions, to produce a current across the coaxial electrode 114 and electrode 116. Lorentz acceleration may be controlled to launch the fuel ions and other particles that are swept along to be thrust into the combustion chamber 124 at sufficient velocities to overtake or intersect the previously launched oxidant ions. For example, in instances where the fuel ions are the same charge as the oxidant ions (and are thus accelerated away from such like charges), the swept fuel particles that are not charged are ignited by the ionized oxidant particles and the ionized fuel particles penetrate deeper into compressed oxidant to be ignited and thus complete the combustion process.

In some implementations, a Lorentz (thrust pattern)-induced corona discharge may be applied to further expedite the completion of combustion processes. Corona ionization and radiation can be produced from the electrode antenna 118 in an induced pattern presented by the Lorentz-thrusted ions 122 into the combustion chamber 124 (as shown in FIG. 1A). Corona discharge may be produced by applying an electrical field potential at a rate or frequency that is too rapid to allow ion current or "spark" to occur between the electrode ridges or points 111 and/or 112 or the electrode 114 and the antenna 118. Illustratively, for example, one or more corona discharges, which may be produced by the rapidly applied fields (e.g., in time spans ranging from a few nanoseconds to several tens of nanoseconds), are adequate to further expedite the completion of combustion processes, e.g., depending upon the combustion chamber pressure and chemical constituents present in such locations. Protection of the antenna 118 from oxidation or other degradation may be provided by a ceramic cap 120. For example, suitable materials for the ceramic cap 120 include, but are not limited to, quartz, sapphire, multicrystalline alumina, and stoichiometric or non-stoichiometric spinel. The ceramic cap 120 may also be provided to protect pressure and temperature sensor instrumentation fibers or filaments that extend through the valve 102, in which some of the fibers or filaments extend to the surface of the ceramic cap 120 and/or to electromagnets or permanent magnets that can be contained or included by the electrode antenna 118. For example, sapphire instrumentation filaments can be used as the pressure and/or temperature sensor instrumentation fibers or filaments to extend into or through the ceramic cap 120, e.g., such as spinel, to measure the temperature and/or pressure and/or fuel injection and combustion pattern to determine the air utilization efficiency and brake mean effective pressure for adaptive optimization of one or more adjustable controls, e.g., such adaptive controls to control operations such as the fuel pressure, operation of the valve 102, Lorentz thrusting timing and magnitude, and corona discharge timing and frequency.

Figure 1B:
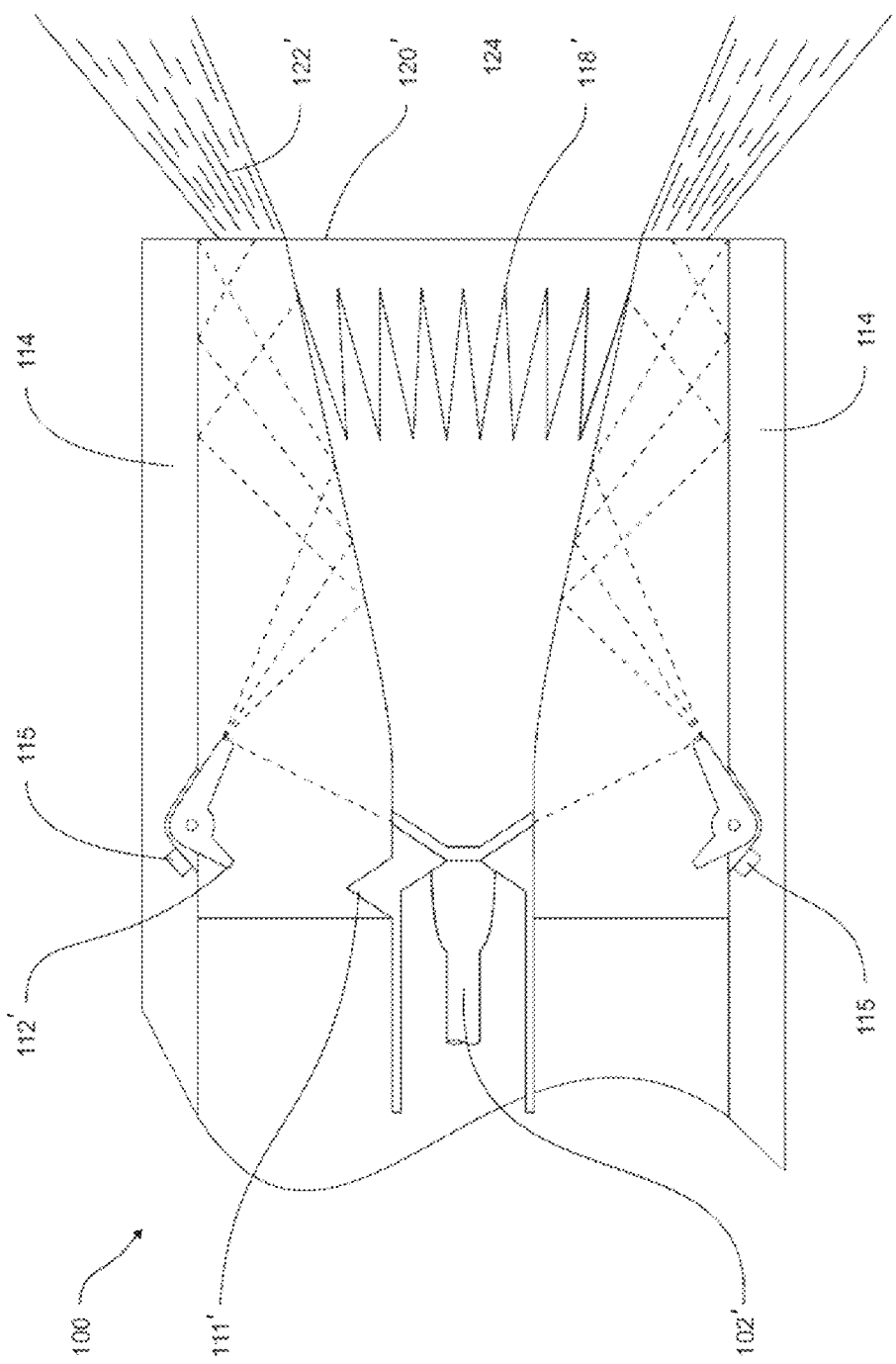
FIG. 1B shows a schematic of another exemplary embodiment of the system of FIG. 1A to provide a variable electrode gap.

FIG. 1B shows a portion of an alternate embodiment of the system 100 showing components that provide a variable electrode gap between articulated points or tips 112' and 111'. For example, in operation, the tips 112' can initiate a Lorentz ion current in a smaller gap to reduce the energy required to produce the ion current and reduce the resistance to establishing a larger current. At a selected time, e.g., such as just before the ion current is established, fuel valve 102' can be actuated to open to allow one or more bursts of fuel to impinge and rotate valve tip toward tip 111' to reduce the gap and provide for the initiation of a conductive ion current with greatly reduced energy, e.g., as compared to developing an arc current in a considerably larger spark plug gap that is adequate for lean burn air/fuel ratios. For example, after the initial ion current is established, a magnet 115 embedded in the wall of the electrode 114 and or in the base of tip 112' can rotate the tip 112' away from tip 111'. For example, such electrode gaps can be configured to be at their smallest to initiate Lorentz ion current and/or configured to be at their widest to facilitate and improve the efficiency of one or more corona discharges into the Lorentz ion thrust pattern 122' in the combustion chamber 124, e.g., in which the corona discharges initiated by electrode antenna 118' (e.g., which may have a protective ceramic shield 120').

Figure 2:
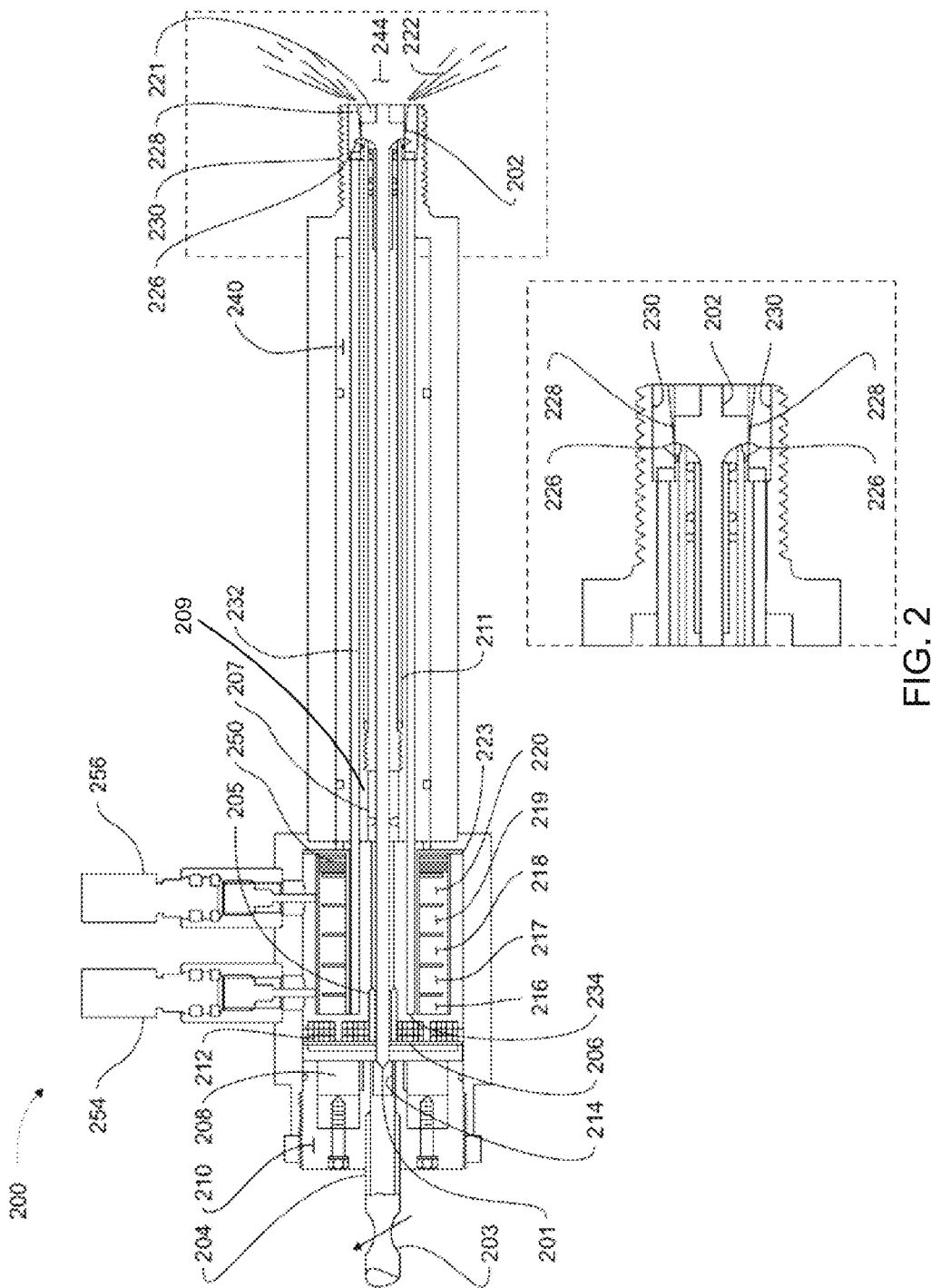
FIG. 2 shows a schematic of another exemplary embodiment of a fuel injection and ignition system.

FIG. 2 shows a cross-sectional view of a schematic of an embodiment of a fuel injection and ignition system 200. The system 200 may be operated on low voltage electricity, e.g., which can be delivered by cable 254 and/or cable 256, e.g., in which such low voltage is used to produce higher voltage by actuating an exemplary electromagnet assembly to open a fuel valve and to produce Lorentz thrust and/or corona ignition events. The system 200 includes an outwardly opening fuel control valve 202 that allows intermittent fuel to flow from a pressurized supply into the system 200 through conduit fitting 204. The system 200 includes a valve actuator for actuation of the fuel control valve 202, which may include any suitable system, e.g., including, but not limited to, hydraulic, pneumatic, magnetostrictive, piezoelectric, magnetic or electromagnetic types of operations. As an illustrative example of combined magnetic and electromagnetic control, the fuel control valve 202 is held closed by force exerted on disk armature 206 by an electromagnet and/or permanent magnet 208 in a coaxial zone of retaining cap component 210. Disk armature 206 is guided in the bore of component 210 by tubular skirt 214 within which fuel introduced through pressure trim regulator 203 and tube conduit 204 passes to axial passageways or holes 205 through the disk 206 surrounding the valve stem and retainer 201 of the fuel control valve 202. Fuel flow continues through passageways 207 into accumulator volume 209 and serves as a coolant, dielectric fluid, and/or heat sink for an insulator tube 232 (e.g., such as a dielectric voltage containment tube) within the system 200.

For example, in certain applications such as small-displacement high-speed engines, maintaining the insulator tube 232 at a working temperature within an upper limit of about 50° C. above the ambient temperature of the fuel or other fluid supplied through passageway 204 is an important function of the fluids flowing through annular accumulator 209 which may be formed as a gap and/or one or more linear or spiral passageways in the outside surface of electrode tube 211. Such heat transfer enhancement to fluid moving through the accumulator 209 and to such fluids as expansion cooling occurs upon the opening of valve 202 from the valve seat provided by conductive tube 211 enables the insulator tube 232 to be made of materials that would have compromised the dielectric strength if allowed to reach higher operating temperatures.

Illustratively, the insulator tube 232 may be made of a selection of material disclosed in U.S. Pat. No. 8,192,852, which is incorporated by reference in its entirety as part of the disclosure in this patent document, that is thinner-walled because of the fluid cooling embodiment of the insulator tube 232 may be made of coaxial or spiral wound layers of thin-wall selections of the materials listed in Table 1 or as disclosed regarding FIG. 3 of U.S. Pat. No. 8,192,852. In one example, a particularly rugged embodiment provides fiber optic communicator filaments (e.g., communicators 332 of FIG. 3 in U.S. Pat. No. 8,192,852), e.g., made of polymer, glass, quartz, sapphire, aluminum fluoride, ZBLAN fluoride, within spiral or coaxial layers of polyimide or other film material selected from Table 1 of U.S. Pat. No. 8,192,852. Another exemplary embodiment of the insulator tube 232 can include a composite tube material including a glass, quartz, or sapphire tube that may be combined with one or more outside and/or inside layers of polyimide, parylene, polyether sulfone, and/or PTFE.

As exemplified by the illustrative embodiment shown in FIG. 2, actuation for opening of the fuel control valve 202 occurs when the armature 206 is operated to overcome the magnetic force exerted by an electromagnet and/or a permanent magnet. The armature 206 is configured between an electromagnet 212 and a permanent magnet in annular zone 208. The electromagnet 212 is structured to include one or more relatively flat electromagnetic solenoid windings (e.g., coaxial windings of insulated magnetic wire). The permanent magnet 208 is configured to provide permanent polarity to the armature component 206. In some examples, the armature 206 includes two or more pieces, in which a first piece is configured on the side of the armature 206 that is interfaced with the permanent magnet 208 and the second piece is configured as the other side of the armature 206 that interfaces with the electromagnet 212. The first armature piece, which is biased towards the permanent magnet having undergone saturation, attracts the second armature component to rest against it thereby setting the armature 206 in a 'cocked' position. Activation of the electromagnet 212 can then pull the closest armature component towards the electromagnet 212 to accelerate and gain kinetic energy that is suddenly transferred to the other component to quickly open the valve 202 (e.g., to allow fuel to flow). Upon relaxation of electromagnet 212 the armature assembly 206 returns to the 'cocked' position. Each fuel burst actuated into the system 200 can be projected into the combustion chamber 224 in one or more sub-bursts of accelerated fuel particles by the disclosed techniques of Lorentz thrusting.

In the exemplary embodiment, the fuel injection and ignition system 200 includes a series of inductor windings, exemplified as inductor windings 216-220 in annular cells in this exemplary embodiment, as shown in FIG. 2. In some implementations, the series of inductor windings 216-220 can be utilized as a secondary inline transformer to produce attractive force on armature 206 in the opening actuation of the valve 202. For example, the pulsing of coils of the electromagnet 212 builds current and voltage in secondary of the transformer annular cells 216-220. Thus, less energy (e.g., current in the coils of the electromagnet 212) is required to pull the armature 206 to the right and open the valve. In some implementations, an electromagnetic field is produced when voltage is applied to at least one inductor winding of the series of inductor windings 216-220. For example, the electromagnetic field is amplified as it progresses through the winding coils from a first cell (e.g., inductor winding 216) where a first voltage is applied to subsequent winding coils in the series. In some examples, additional voltage can be applied at subsequent winding cells in the series of inductor windings 216-220, e.g., in which the additional voltages are applied using additional leads interfaced at the desired winding cells. Also for example, the transformer can make its own high voltage to remove RF interference.

In some implementations, the magnet 208 can be configured as an electromagnet. In such examples, activation of the electromagnet 212 may be aided by applying the energy discharged as the field of the exemplary electromagnet 208 collapses. Alternatively, for example, in certain duty cycles, the discharge of the exemplary electromagnet 208 in the a coaxial zone space and/or the electromagnet 212 may be utilized with or without additional components (e.g., such as other inductors or capacitors) to rapidly induce current in windings of a suitable transformer 216, which may be successively wound in annular cells such as 217, 218, 219, and 220. Examples of such are disclosed in U.S. Pat. No. 4,514,712, which is incorporated by reference in its entirety as part of the disclosure in this patent document. For example, this discharge of the exemplary electromagnet 208 in the a coaxial zone space and/or the electromagnet 212 can reduce the stress on magnet wire windings as sufficiently higher voltage is produced by each annular cell to initiate Lorentz thrusting of ions initiated by reduced gap between electrode features 226 of electrode 228 and electrode 230, as shown in the insert schematic of FIG. 2.

The insulator tube 232 can be configured as a coaxial tube that insulates and provides voltage containment of voltage generated by the transformer assembly's inductor windings 216, 217, . . . 220. For example, insulator tube 232 is axially retained by electrode ridges on the inside diameter of electrode 230 and/or points 226 of electrode 228. In some embodiments, the insulator tube 232 is transparent to enable sensors 234 to monitor piston speed and position, pressure, and radiation frequencies produced by combustion events in combustion chamber 224 beyond electrode 228 and/or 230. For example, such speed-of-light instrumentation data enables each combustion chamber to be adaptively optimized regarding oxidant ionizing events, timing of one or more fuel injection bursts, timing of one or more Lorentz sub-bursts, and timing of one or more corona discharge events, along with fuel pressure adjustments.

Application of such Lorentz thrust may be implemented during the intake and/or compression period of engine operation to produce a stratified charge of activated oxidant particles, e.g., such as electrons, $O_3$, O, $OH^-$, CO, and $NO_x$ from constituents ordinarily present in air, e.g., such as $N_2$, $O_2$, $H_2O$, and $CO_2$. Fuel may be introduced before, at, or after the piston reaches top dead center following one or more openings of fuel control valve 202. Fuel may be ionized to produce a current across coaxial electrodes 226 and 230, and the Lorentz acceleration may be controlled to launch fuel ions and other particles that are thrust into combustion zone 224 at sufficient velocities to overtake the previously launched oxidant ions.

For example, such ionized particles can include ionized oxidant particles that are utilized to initiate combustion of fuel, e.g., fuel that is dispersed into such ionized oxidant particles. In another example, fuel introduced upon opening of the valve 202 flows between coaxial electrodes 230 and 228. Fuel particles are ionized by the electric field, and the ionized fuel particles are accelerated into the combustion chamber by the Lorentz force to initiate and/or accelerate combustion. In other examples, the ionized oxidant particles are produced with the same or opposite charge compared to the ionized fuel particles. In other examples, the velocities of the fuel particles and/or ionized fuel particles can be controlled to be sufficiently larger than the oxidant particles to assure initiation of oxidation and combustion of such fuel particles.

In some implementations of the system 200, a Lorentz thrust pattern-induced corona discharge may be applied to further expedite the completion of combustion processes. Shaping the penetration pattern of oxidant and/or fuel ions may be achieved by various combinations of electromagnet or permanent magnets in annular space 221, or by helical channels or fins on the inside diameter of the electrode 230 or the outside diameter of the electrode 228 as shown. Corona ionization and radiation can be produced from electrode antenna, e.g., such as at the combustion chamber end of electrode 228, which may be provided by discharge of one or more capacitors such as 223 and/or 240 contained within the system 200 in the induced pattern presented by ions 222 that are produced and thrust into combustion chamber zone 224. Corona discharge may be produced by applying an electrical field potential at a rate or frequency that is too rapid to allow ion current or spark to occur between electrode 230 and antenna, e.g., which in some implementations can be included on the electrode 228.

The fuel injection and ignition system 200 can include a controller 250 that receives combustion chamber instrumentation data and provides adaptive timing of events selected from options, e.g., such as (1) ionization of oxidant during compression in the reduced gap between electrodes 226 and 230; (2) adjustment of Lorentz force as a function of the current and oxidant ion population generated by continued application of EMF between the electrodes; (3) opening of the fuel control valve 202 and controlling duration that fuel flow occurs; (4) ionization of fuel particles before, at, or after TDC during power stroke in the reduced gap between electrodes 226 and 230; (5) adjustment of Lorentz force as a function of the current and fuel ion population generated by continued application of EMF between the electrodes; (6) adjustment of the time after completion of fuel flow past insulator 232 to provide a corona nanosecond field from the electrode antenna (e.g., antenna 228) and with controlled frequency of the corona field application; and (7) subsequent production and injection of fuel ions followed by corona discharge after one or more adaptively determined intervals "$t_v$," to provide multi bursts of stratified charge combustion.

One exemplary implementation of the fuel injection and ignition system 200 to produce an oxidant ion current and subsequent ion current of fuel particles to thrust into a combustion chamber and/or initiate combustion is described. A voltage can be applied to create current in stator coils of the electromagnet 212. For example, the conductor applies a voltage, e.g., 12 V or 24 V, to create the current in the electromagnet coils 212. The current can create a voltage in the secondary inline transformer, in which the series of inductor windings 216-220 in annular cells are used to step up voltage.

The pulsing of the electromagnet coils 212 builds voltage in the transformer (e.g., inductor windings wound 216-220 in the annular cells). In some implementations, initiation of Lorentz thrust can be produced by approximately 30 kV or less across the electrode 226, which can be achieved on highest compression, e.g., accomplishing combustion with a low gap and plasma. For example, this represents the highest boost diesel retrofit known and achieves efficient stratified charge combustion in unthrottled air at idle, acceleration, cruise, and full power fuel rates, along with great reduction or elimination of objectionable emissions. In contrast, for example, in regular spark plug technology about 80 kV is needed for combustion of homogeneous charge mixtures of fuel with throttled air, which is coupled with compromised results, e.g., including emissions of oxides of nitrogen and reduced power production and fuel economy.

For example, based on the applied voltage, the conductor tube 211 is energized to produce an ion current between electrode tips 226 (of the electrode 228) and the electrode 230, e.g., the ion current formed of oxidant ion particles ionized from air. For example, air can enter the space between annular electrodes 228 and 230 of the system 200 from the combustion chamber 224 during exhaust, intake, or compression cycles, or in other examples, air can be brought into the system 200 through the valve 202 or through input tubes, which can be coupled with the cables 254 and/or 256. For example, the ionized oxidant particles can be thrusted into the combustion chamber 224 of the engine before top dead center (TDC) to deliver energized ions in that space (e.g., pre-conditioning and ionizing the oxidant) to provide faster ignition and completion of combustion of fuel that is subsequently injected. This can achieve effects such as reduction of time to initiate combustion and of time to complete combustion.

For example, to thrust the ionized oxidant particles, the energized conductor tube 211 delivers oxidant ion current between electrode tips 226 (of the electrode 228) and the electrode 230. The ion current produces a Lorentz acceleration on the ionized oxidant particles that thrust them into combustion chamber 224, e.g., which can be produced as a pattern of Lorentz thrust oxidant ions by the system 200 by control of any of several parameters, e.g., including controlling the DC voltage application profile or the pulsed frequency of the applied electric field between the electrodes.

The fuel control valve 202 can be opened by actuation of the valve actuation unit, and the conductor tube 211 can again be energized to produce an ion current of fuel ion particles, e.g., in which the energized conductor tube 211 provides the ionized fuel particle current between the electrode tips 226 (of the electrode 228) and the electrode 230, thereby producing a pattern of Lorentz thrust fuel ions by the system 200. For example, the valve actuator can cause the movement of the armature 206 to the right. Additionally, for example, fluid in the accumulator volume 209 can help open the fuel control valve 202, e.g., pressurized fluid is delivered through the conduit fitting/passageway 204.

The Lorentz thrust of the fuel ions can initiate combustion as they contact the oxidant ions and/or oxidant in the combustion chamber 224. For example, the fuel ions are thrust out at a higher velocity to overtake the activated oxidant. Subsequently, a highly efficient corona discharge can be repeatedly applied to produce additional combustion activation in the pattern of Lorentz thrust fuel ions. For example, the repetition of the corona discharge can be performed at high frequency, e.g., in the MHz range, to a Lorentz-thrusted ion pattern that exceeds the speed of sound. The corona shape can be determined by the pattern of the oxidant and/or fuel ions. For example, the corona can be shaped by the pattern produced by Lorentz thrusting, as well as by pressure drop and/or swirl of fuel with or without ionization (e.g., due to fins or channels, as shown later in FIG. 8), and combinations of Lorentz thrusting, pressure drop, and swirl.

For example, the one or more corona discharges are initiated to provide additional activations in the pattern of Lorentz thrust fuel ions. For example, one or more additional multi-bursts of fuel can be initiated in the same or new patterns of Lorentz-thrusted ions. For example, an adjustment in included angles can be made by changing the current applied and/or the magnet field applied, e.g., which can allow for the system 200 to meet any combustion chamber configuration for maximum air utilization efficiency.

Additionally, for example, a stratified heat production within surplus oxidant can be implemented using the system 200 by one or more additional fuel bursts followed by corona discharges to provide additional activations in the pattern of Lorentz thrust fuel ions, e.g., which provides more nucleating sites of accelerated combustion. For example, the system 200 can control nanosecond events so the next burst doesn't have to wait until the next cycle.

FIG. 3A shows a cross-sectional view of a schematic of an embodiment of a fuel injection and ignition system 300 that also shows a partial cutaway and section of supporting material 314 of an engine head 318 portion of combustion chamber 326. The exemplary embodiment of the system 300 is shown within changeable tip case assembly 304 for combining fuel injection and ignition systems. The system 300 provides an outward opening fuel control valve 302 that operates in a normally closed position against valve seat 316 of multifunctional tubular fuel delivery electrode 306. Upon actuation, valve 302 opens toward combustion chamber 326 and fuel flows from internal accumulator volume 328 having suitable connecting passageways within the assembly 304. Fuel flow accelerates past the valve seat 316 to enter the annular space between electrode 320 and the annular portion 330 of valve 302.

Figure 3B:
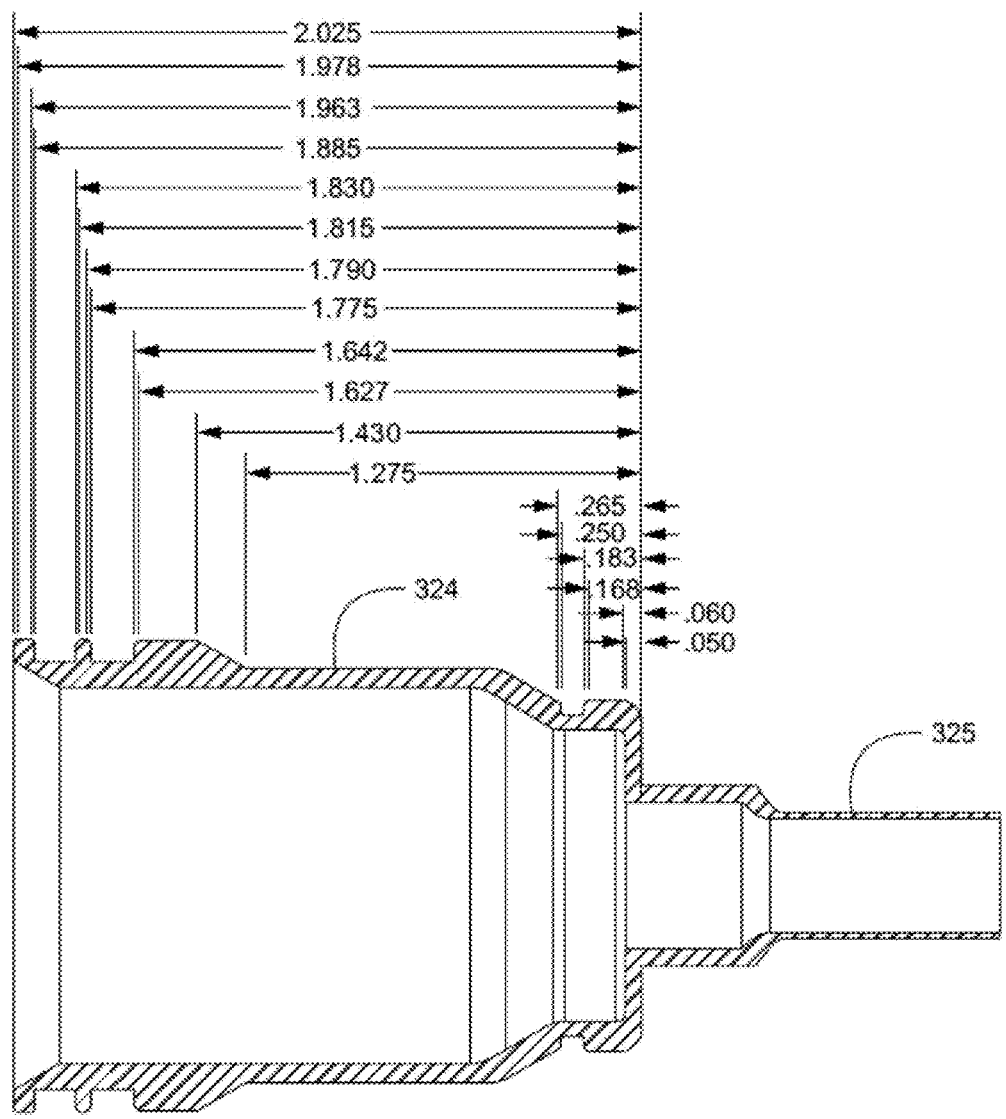
FIG. 3B shows a schematic of an exemplary electrode configuration.

In some examples, the electrode 320 may be a suitable thin walled tubular extension of the tip case 304. Or for example, as shown in FIG. 3B, the electrode 320 may be a tubular portion 325 of a separate insert cup 324 that extends as a liner within the combustion chamber port. In other exemplary applications, the electrode 320 may be the surface of the engine port into combustion chamber 326, as shown in FIG. 3A. In this exemplary embodiment, which is suitable for many engine applications, the electrode 320 can be configured as a relatively thin walled tubular electrode that extends from the assembly body 304 and is readily deformed by an installation tool and/or by combustion gases to conform and rest against the port into combustion chamber 326 of the engine as shown.

In some implementations, plastically reforming tubular electrode 320 to be intimately conformed to the surface of the surrounding port provides solid mechanical support strength for improved fatigue endurance service and greatly improves heat transfer to the engine head and cooling system of the engine to regulate the temperature for improved performance of and life of electrode sleeve 320. For example, this enables electrode sleeve 320 to be made of aluminum, copper, iron, nickel, or cobalt alloys to provide excellent heat transfer and resist or eliminate electrode degradation due to overheating or spark erosion. Suitable coatings for opposing surfaces of electrodes 330 and/or 320 include, for example, unalloyed aluminum and a selection from the alloy family AlCrTiNi, in which the Al constituent is aluminum, the Cr constituent is chromium, the Ti constituent can be titanium, yttrium, zirconium, hafnium or a combination of such metals, and the Ni constituent can be nickel, iron, cobalt or a combination of such metals. For example, the outer diameter surface of electrode sleeve 320 may be coated with aluminum, copper, AlCrTiNi, and/or silver to improve the corrosion resistance and geometrical conformance achieved in service for providing greater fatigue endurance and enhanced heat transfer performance to supporting material 314.

Features 322, such as an increased diameter and/or ridges or spikes, of the delivery electrode tube 306 provide mechanical retention of voltage containment insulator 308. The exemplary features 322 present the first path to the electrode 320 for the production of an ion current in response to application of an ignition voltage from a suitable electrical or electronic driver and control signal by a controller (not shown in the figure, but present in the various embodiments of the fuel injection and ignition system system). Examples of such drivers and controller are disclosed in U.S. patent application Ser. No. 13/843,976 entitled "CHEMICAL FUEL CONDITIONING AND ACTIVATION", and U.S. patent application Ser. No. 13/797,351 entitled "ROTATIONAL SENSOR AND CONTROLLER", both filed on or before Mar. 15, 2013, and both of which are incorporated by reference in their entirety as part of the disclosure in this patent document. Examples of such suitable drivers and controller are also disclosed in U.S. Pat. Nos. 5,473,502 and 4,122,816 and U.S. patent application publication reference US2010/0282198, each of which the entire document is incorporated by reference as part of the disclosure in this patent document.

For example, upon production of an ion current, the impedance suddenly drops and the current can be greatly amplified if desired in response to controlled application of much lower applied voltage. Growing current established between electrodes 330 and 320 is thrust toward combustion chamber 326 by Lorentz force that is a function of the current magnitude and the field strength of the applied voltage. Ion currents thus developed can be accelerated to achieve launch velocities that are tailored by control of the voltage applied by the electronic driver via the control signal provided by the controller and by control of the pressure of the fluid in the annular space between electrodes the 320 and 330 to optimize oxidant utilization efficiency during idle, acceleration, cruise and full power operations.

Illustratively, current developed by the described ionization of an oxidant, e.g., such as air, that enters the annular space between the electrodes 320 and 330 during intake and/or compression periods of operation can produce an ion pattern that is stratified within surplus oxidant in combustion chamber 326. Subsequently, fuel that enters the annular space between electrodes 320 and 330 can achieve a velocity that is substantially increased by the described Lorentz ion current thrust in addition to the pressure induced flow into the combustion chamber 326. Thus, Lorentz thrust fuel ions and other particles that are swept into the combustion chamber 326 can achieve subsonic or supersonic velocities to overtake oxidant ions, e.g., such as ozone and/or oxides of nitrogen, to greatly accelerate the beginning and/or completion of combustion events, e.g., including elimination of such oxidant ions.

In some implementations, additional impetus to accelerated initiation and/or completion of combustion may be provided by subsequent application of an electrical field at a rate or frequency that is too rapid for ions to traverse the gap between electrodes 320 and 330 to produce corona discharge beyond field shaping antenna, such as antenna 310, which for example may include one or more permanent magnets and/or temperature and pressure sensors that are protected by a suitable ceramic coating 312. Such corona discharge impetus is produced by highly efficient energy conversion that is shaped to occur in the pattern of ions traversing the combustion chamber to thus further extend the advantage of Lorentz-thrusted ions to initiate combustion and/or accelerate the completion of combustion for additional improvement of the electrical ignition efficiency, e.g., as compared to the limitations of spark plug operation.

FIG. 3C shows another embodiment of a fuel injection and ignition system 300C that reverses certain roles of components in the embodiment of the system 300, i.e., the fuel control valve 302 and the delivery electrode tube 306. The system 300C in FIG. 3C includes a solid or tubular electrode 302 that contains and protects various instrumentation 342, e.g., which can include Fabry-Perot fibers and/or IR tubes and/or fiber optics, such as may be selected to monitor combustion chamber pressure, temperature, combustion patterns, and piston positions and acceleration. In some implementations, the tubular electrode 302 can be configured as a stationary component. They system 300C includes a fuel control valve tube 306 that can be retracted by a suitable actuator, e.g., such as a solenoid, magnetostrictive or piezoelectric component, to provide occasional fuel flow past the valve seat 316. In such instances, component 340 may be a suitable mechanical spring or O-ring that urges the return of tube assembly 306 including insulator tube 308 to the normally closed position.

The various embodiments of the fuel injection and ignition systems can include a controller (e.g., like that of the controller 250 shown in FIG. 2) that receives combustion chamber instrumentation data and provides adaptive timing of events selected from options, e.g., such as: (1) ionization of oxidant during compression in reduced gap between electrode 320 and 322; (2) adjustment of Lorentz force as a function of the current and oxidant ion population, e.g., generated by continued application of EMF between electrodes 320 and 330 as shown in FIG. 3A or 3C; (3) opening of the fuel control valve (e.g., fuel control valve 102 as shown in FIG. 1A, fuel control valve 202 as shown in FIG. 2, fuel control valve 302 as shown in FIG. 3A, and fuel control valve 306 as shown in FIG. 3C) and controlling duration that fuel flow occurs; (4) ionization of fuel particles before, at, or after TDC during power stroke in reduced gap between electrode 320 and 322, for example, as shown in FIG. 3A or 3C; (5) adjustment of Lorentz force as a function of the current and fuel ion population generated by continued application of EMF between electrodes 320 and 330, for example, as shown in FIG. 3A or 3C; (6) adjustment of the time after completion of fuel flow past insulator 312 to provide a corona nanosecond field from antenna (e.g., antenna 310) and with controlled frequency of the corona field application; and (7) subsequent production and injection of fuel ions followed by corona discharge after one or more adaptively determined intervals "$t_v$" to provide multi bursts of stratified charge combustion.

Figure 4:
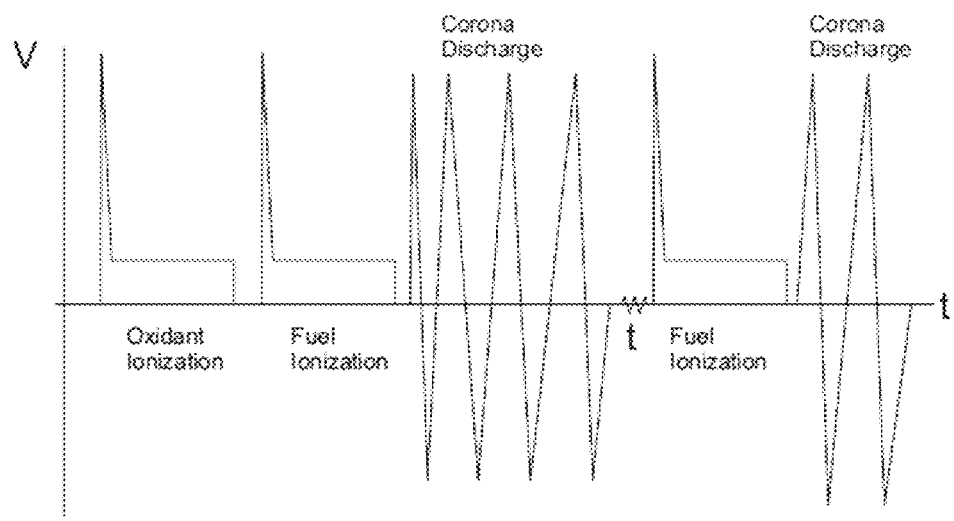
FIGS. 4 and 5 show exemplary voltage and corresponding current plots depicting the timing of events during implementation of the disclosed technology.
Figure 5:
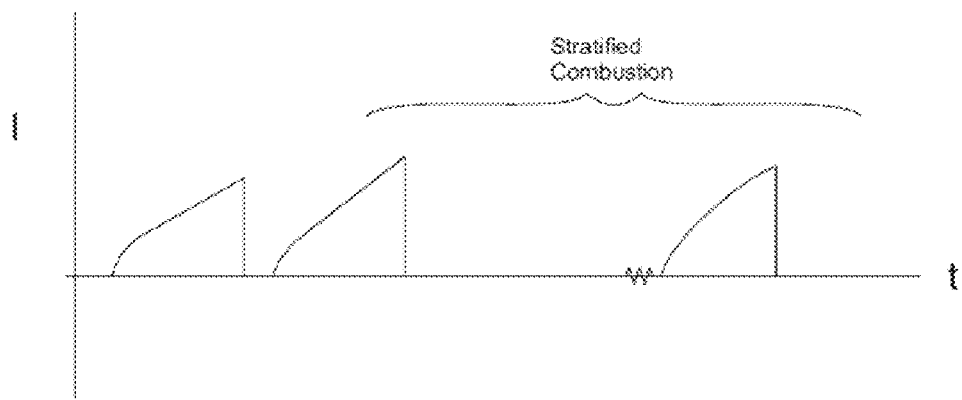

FIGS. 4 and 5 show data plots that illustrate the timing of such events including applications of EMF or voltage "V" in time "t" (FIG. 4) and corresponding current "I" in time "t" (FIG. 5) produced during generation of ions of oxidant followed by generation of fuel ions followed by production of corona discharge in the pattern of ion penetration into the combustion chamber at an adaptively determined frequency.

Figure 6:
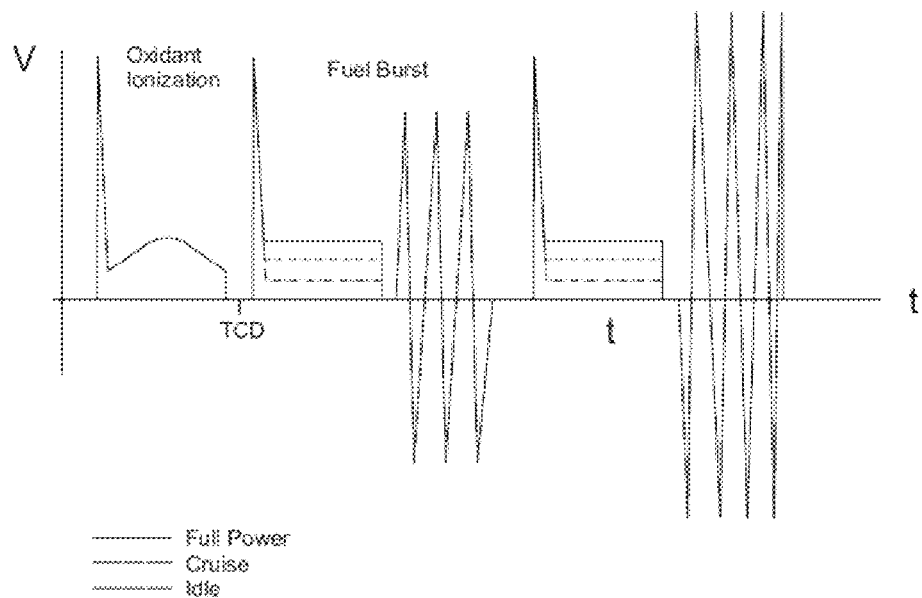
FIGS. 6 and 7 show exemplary data plots depicting the timing of events during implementation of the disclosed technology commensurate to the crank angle timing at various engine performance levels.
Figure 7:
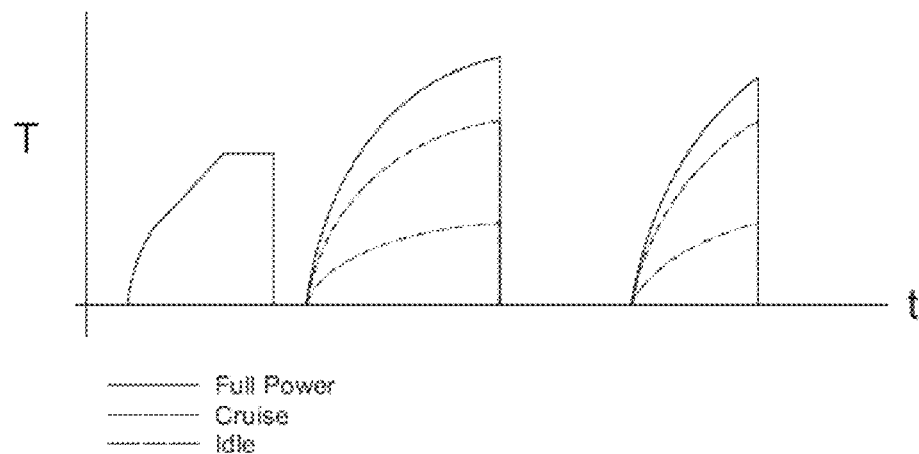

FIGS. 6 and 7 show data plots that depict various adaptive adjustments commensurate with/to the crank angle timing to produce required torque at performance levels such as idle (shown in FIGS. 6 and 7 data plots as  − ·· − ), cruise (shown in FIGS. 6 and 7 data plots as  − • − ), and full power (shown in FIGS. 6 and 7 data plots as ——) with minimum fuel consumption by initiation of events, e.g., such as: (1) oxidant activation prior to or following fuel injection by ionization, Lorentz thrusting, and/or corona discharge; (2) fuel particle activation by ionization, Lorentz thrusting, and/or corona discharge; (3) the timing between successive activations of oxidant and fuel particles (e.g., to produce multi bursts of activated fuel thrusts); (4) the launch velocity of each type of activated particle group; and (5) the penetration extent and pattern into oxidant within the combustion chamber.

For example, FIG. 6 can represent the EMF or voltage applied between electrodes such as 320 and 322 beginning with a much higher voltage to initiate an ion current followed by a maintained or reduced voltage magnitude to continue the current growth along the gap between concentric electrode surfaces 320 and 330 commensurate with engine performance levels such as idle, cruise, and full power. Accordingly the oxygen utilization efficiency is higher at full power than at cruise or idle because fuel is launched at higher included angle and at higher velocity to penetrate into a larger volume and more oxygen is activated to complete combustion at the greater fuel rate, while the air utilization efficiency for supplying oxidant and insulation of the combustion events is less at full power compared to cruise and idle power levels.

For example, angular acceleration of the ions and swept particles traversing the gap between electrodes 330 and 320 may be accomplished by various combinations, e.g., such as: (1) magnetic acceleration by applying magnetic fields via electromagnetic windings or circuits inside electrode 330 or outside electrode 320; (2) magnetic acceleration by applying magnetic fields via permanent magnets inside electrode 330 or outside electrode 320; (3) utilization of permanent magnetic materials in selected regions of electrode 320 and/or 330; (4) utilization of one or more curvilinear fins or sub-surface channels in electrodes 330 and/or 322 including combinations such as curvilinear fins on electrode 330 and curvilinear channels in electrode 320 and vice versa to produce swirl that is complementary to swirl introduced within the combustion chamber during intake and/or compression and/or combustion events; and (5) utilization of one or more curvilinear fins or sub-surface channels in electrodes 330 and/or 322 including combinations such as curvilinear fins on electrode 330 and curvilinear channels in electrode 320 and vice versa to produce swirl that is contrary to swirl introduced within the combustion chamber during intake and/or compression and/or combustion events.

FIG. 7 shows representative ion current magnitudes that occur in response to the variations in applied voltage between electrodes 320 and 322. Therefore the launch velocity and penetration pattern including angular and linear vector components is closely related to the applied fuel pressure, ion current, and the distance of acceleration of ions between electrode 322 along electrode surface 330 and the combustion chamber extent of electrode 320.

Figure 8:
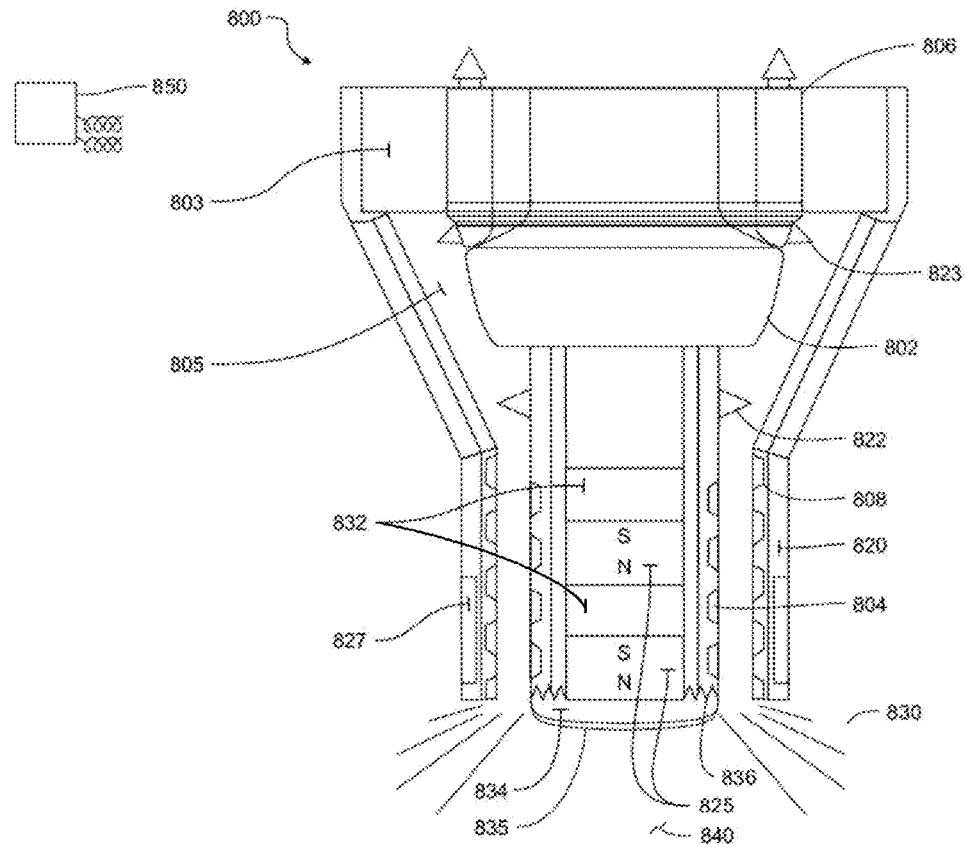
FIG. 8 shows a schematic of another exemplary embodiment of a fuel injection and ignition system.

FIG. 8 shows a cross-sectional schematic view of an embodiment of a fuel injection and ignition system 800. As illustrated in this exemplary embodiment, the system 800 includes a valve seat component 802 and a tubular valve 806 that is axially moved by an actuator, e.g., including but not limited to an electromagnet, piezoelectric, magnetostrictive, pneumatic or hydraulic actuator, away from stationary valve seat 802 along a low friction bearing surface of ceramic insulator 803. This provides for one or more fuel flows into annular space 805 between electrodes 822 and 820 and/or electrodes 823 and 820. For example, before and/or after such fuel flows, an oxidant (e.g., such as air) that enters the annular space 805 may be ionized initially between the annular electrode 822, which can be configured as a ring or series of points, and accelerated linearly and/or in curvilinear pathways by helical fins or channel features 808 and/or 804.

Accordingly, ions of the oxidant and subsequently ions of fuel, along with swept molecules, reach launch velocities that are increased over the magnitudes of starting velocities by the ion currents that are adaptively adjusted by controller 850 for operation of the applied current profile and/or by interaction with electromagnets such as electromagnets 832 and/or permanent magnets 825 and/or permanent magnets 827 according to various combinations and positions as may be desired to operate in various combustion chamber designs to optimize the oxidant and/or fuel ion characterized penetration patterns 830 into combustion chamber 840 for highly efficient production of operating characteristics, e.g., such as high fuel economy, torque, and power production.

In some implementations, a corona discharge may be utilized for fuel ignition without or including occasional operation in conjunction with Lorentz-thrusted ion ignition and combustion in combustion chamber 840. The described system 800 can produce the corona by high frequency and/or other methods for rapid production of an electrical field from electrode region 836 at a rate that is too rapid for spark to occur between electrodes 836 and 820 or narrower gaps, which causes corona discharge of ultraviolet and/or electrons in the pattern 830 as established by swirl acceleration of injected particles and/or ions previously produced by Lorentz thrusting and/or one or more magnetic accelerations.

Protection of the exemplary corona discharge antenna features of the electrode 836 may be provided by a coating of ceramic 834 of a suitable ceramic material and/or reflective coating 835 to block heat gain and prevent oxidation or thermal degradation of the magnets such as the electromagnets 832 and/or the permanent magnets 825 and/or 827. Further heat removal is provided by fluid cooling. For example, fluids traveling under the influence of pressure gradients or Lorentz induced flow through pathways defined by fins or channels can provide highly effective cooling of components, e.g., such as the components 825, 827, 832, and 836.

Figure 9:
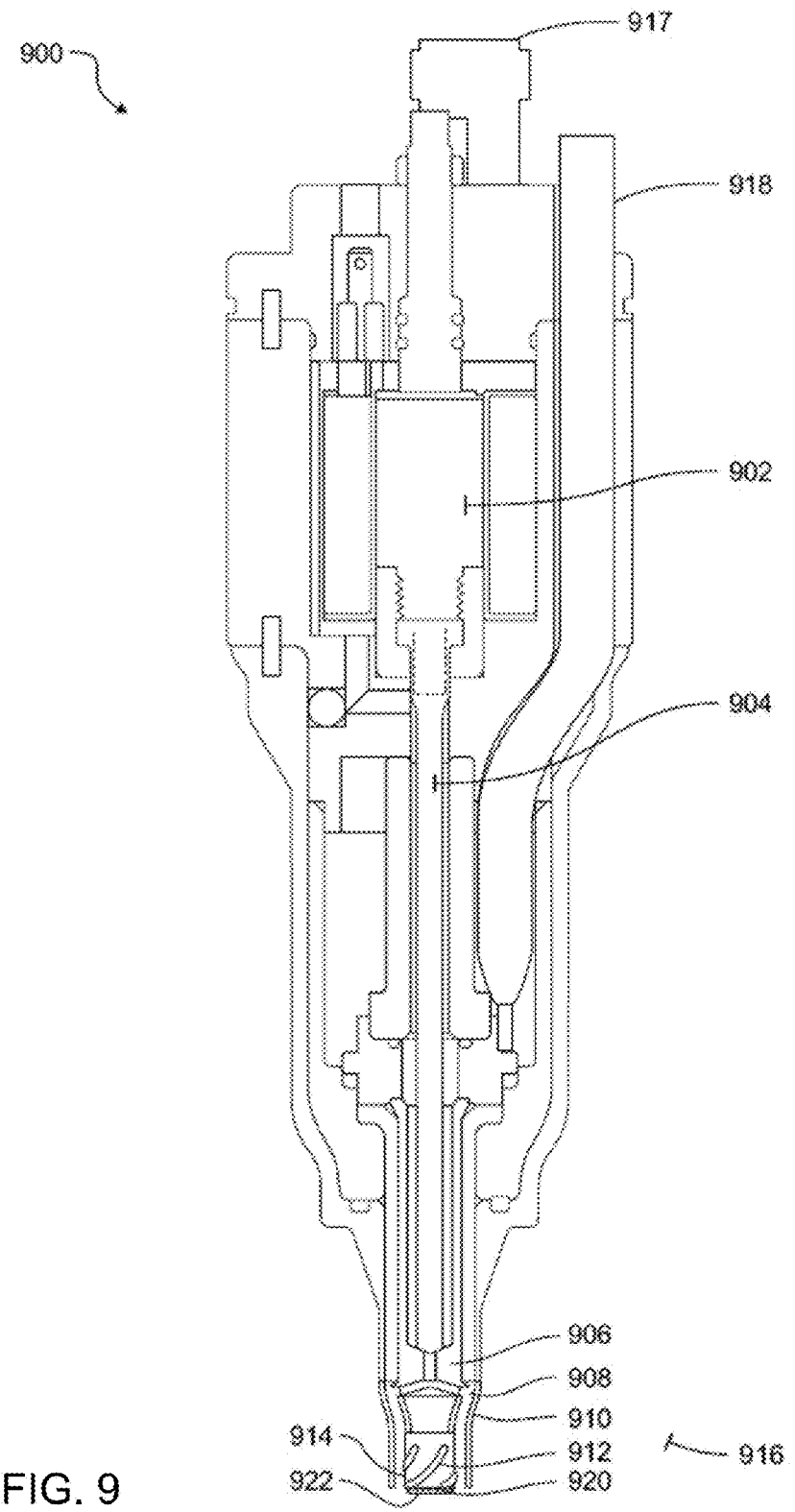
FIG. 9 shows a schematic of another exemplary embodiment of a fuel injection and ignition system.

FIG. 9 shows a cross-sectional view of a schematic of an embodiment of a fuel injection and ignition system 900. In some implementations, the system 900 can be configured to include fuel control valve openings that are radial, inward or outward. As illustrated in an exemplary embodiment, the system 900 includes an actuator 902, e.g., such as an electromagnetic solenoid assembly with armature structure, or a suitable piezoelectric actuator, that forces ceramic valve pin 904 away from conductive seat 906 to provide for adaptively-adjusted fuel pressure to be conveyed from fitting 917 through an internal circuit to ports and upon opening of valve 904 to flow to electrode features, e.g., such as electrode tips 908, into an annular passage between electrodes 910 and 914.

The system 900 includes one or more injection and/or ignition controllers (not shown in FIG. 9, but present in this and other embodiments of the fuel injection and ignition system) that provide electrical power through one or more cables including high voltage cable 918, e.g., to provide valve actuation, Lorentz acceleration, and/or corona discharge). Electrode tips 908 provide a relatively narrow gap and can be configured to include sharp features to initiate ion currents at considerably lower voltage, e.g., such as 15 KV to 30 KV, as compared to 60 KV to 80 KV that would be required for a spark plug with larger gaps needed for lean burn with alternative fuels at the elevated pressure provided in the combustion chambers of modem engines. For example, in ionization applications before fuel flow into the annular space between electrodes 910 and 914, such ion current may be comprised of activated oxidant particles including, but not limited to, $O_3$, O, $OH^-$, $N_2O$, NO, $NO_2$, and/or electrons, etc., and acceleration by Lorentz force into combustion chamber zone 916. For example, in ionization applications after fuel flow into the annular space between electrodes 910 and 914, such ion current may be comprised of activated fuel particles. Illustratively, in the instance that a hydrocarbon such as methane is included in the fuel flow, activated fuel fragments or radicals (e.g., such as $CH_3$, $CH_2$, CH, $H_3$, $H_2$, H, and/or electrons etc.) are accelerated by Lorentz force into the combustion chamber zone 916. The velocity of the fuel ions and other particles that are swept into the combustion chamber 916 is initially limited to the local speed of sound as fuel enters the annular electrode gap, but can be Lorentz accelerated quickly to supersonic magnitudes.

In some examples, one or more fins such as fins 912 may be placed or extended at desirable locations on the electrode 910 and/or the electrode 914, as shown in FIG. 9, to produce swirl flows of ions and other particles that are swept through the annular pathway to the combustion chamber 916. Guide channels and/or fins 912 provide a wide range of entry angles into the combustion chamber 916 to meet various geometric considerations for oxidant utilization in combined roles of expedited fuel combustion and insulation of the heat produced to provide high-efficiency conversion of stratified charge heat into work during the power stroke of the engine.

In some implementations, the system 900 can incorporate at least some of the components and configurations of the system 800, e.g., arranged at the terminal end of the system 900. For example, the system 900 can include components similar to 825, 827, and/or 832. Control of the Lorentz thrust current as it interacts with the variable acceleration by permanent and/or electromagnets (e.g., within the electrode 914 similar to the arrangements with magnets 825 and/or 832 along with 827 installed on the electrode 910), electrode gaps of channel and/or fin locations and proportions of fuel flow provided in channels compared to other zones for total flow thus enables an extremely large range of adjustable penetration magnitudes and patterns to optimize operation in modes such as idle, acceleration, cruise, and full power. This provides an adaptable range of launch velocities and patterns in response to the variations in electrode gaps and ion current pathways according to the design of channels 804 and/or 808 and/or the outside diameter or inside diameter fins 912. Additional adaptive optimization of fuel efficiency and performance can be provided by choices of Lorentz ion ignition and/or corona ignition from electrode 920 (e.g., which can be configured with electrode antenna 922), along with combinations, e.g., such as Lorentz adjusted penetration patterns that are followed by corona discharge ignition to such patterns to accelerate completion of combustion.

Figure 10A:
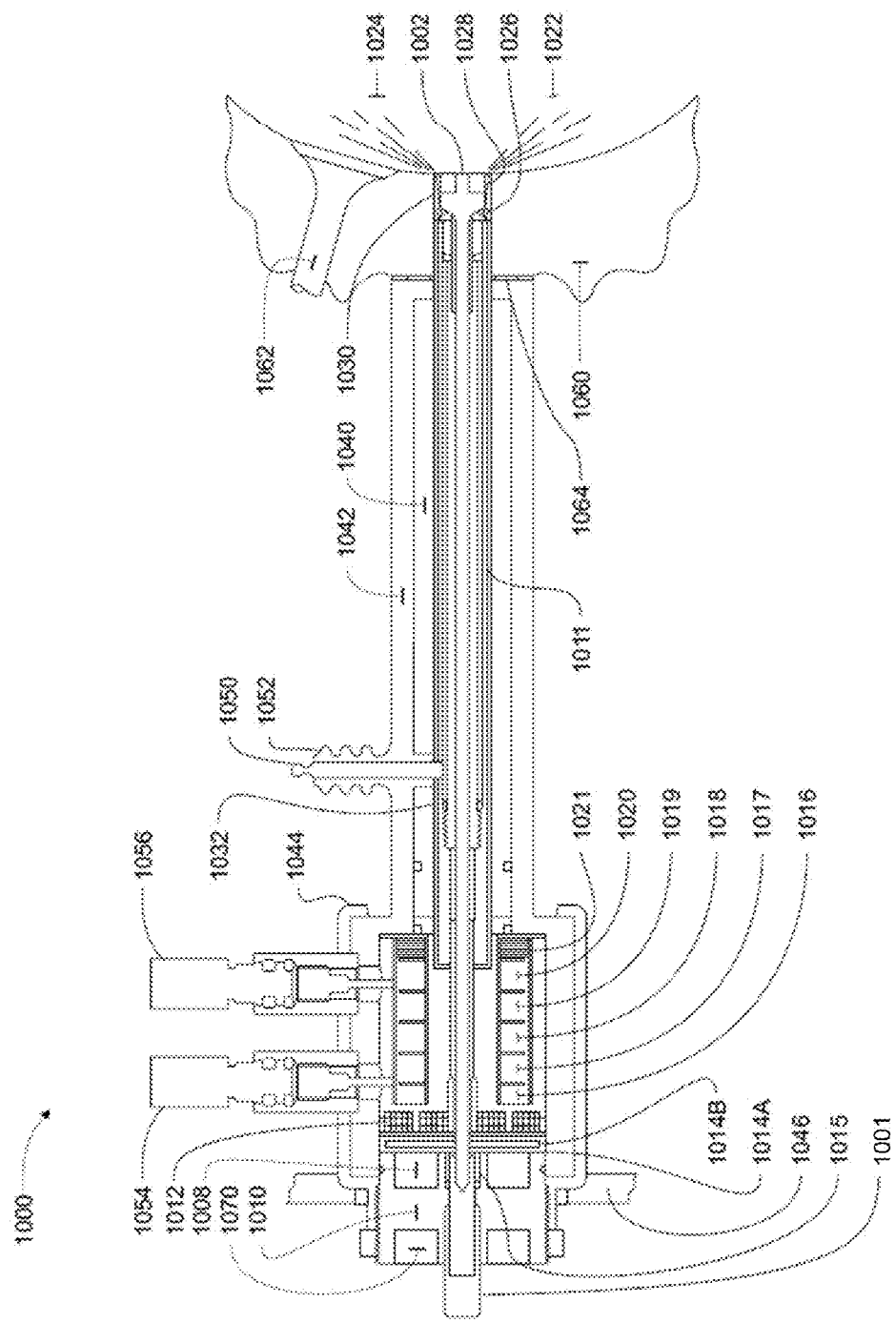
FIGS. 10A-10F show schematics of a system including an assembly of components for converting engines.

FIG. 10A shows embodiment of a system 1000 including an assembly of components for converting heat engines, e.g., such as piston engines, to operation on gaseous fuels. A representative illustration of such engines includes a partial section of a portion of combustion chamber 1024 including engine head portion 1060, an inlet or exhaust valve 1062 (e.g., generally typical to two or four valve engine types), a glass body 1042, adapter encasement 1044 and a section of an engine hold down clamp 1046 for assembling the system 1000 in a suitable port through the casting of engine head portion 1060 to the combustion chamber 1024. A suitable gasket, O-ring assembly, and/or or washer 1064 may be utilized to assure establishment of a suitable seal against gas travel out of the combustion chamber 1024.

Glass body 1042 may be manufactured to include development of compressive surface forces and stress particularly in the outside surfaces to provide long life with adequate resistance to fatigue and corrosive degradation. Contained within the glass body 1042 are additional components of the system 1000 for providing combined functions of fuel injection and ignition by one or more technologies. For example, actuation of fuel control valve 1002, which operates by axial motion within the central bore of an electrode 1028 for the purpose of opening outward and closing inward, may be by a suitable piezoelectric, magnetostrictive, or solenoid assembly. FIG. 10A shows a fuel inlet tube fitting 1001 to enable the system 1000 to fluidically couple to other fluid conduits, tubes, or other devices, e.g., to provide fuel to the system 1000.

For the purpose of illustration, an electromagnetic-magnetic actuator assembly is shown as an electromagnet 1012, one or more ferromagnetic armature disks 1014A and 1014B, a guide and bearing sleeve 1015 (e.g., of the armature disk 1014A), and electromagnet and/or permanent magnet 1008. For example, in operation, after magnetic attraction reaches saturation of disk 1014A, disk 1014B is then closed against disk 1014A. The armature disk 1014A can be guided and slide axially on the friction-minimizing guide and bearing sleeve 1015. The armature disk 1014A is attached to the armature disk 1014B by one or more suitable stops such as riveted bearings that allow suitable axial travel of disk 1014B from 1014A to a preset kinetic drive motion limit. In the normally closed position of valve 1002, disk 1014A is urged toward magnet 1008 to thus exert closing force on valve 1002 through a suitable head on the valve stem of valve 1002 as shown, and disk 1014 B is closed against the face of disk 1014A. Establishing a current in one or more windings of electromagnet 1012 produces force to attract and produce kinetic energy in disk 1014B which then suddenly reaches the limit of free axial travel to quickly pull disk 1014A along with valve 1002 to the open position and allow fuel to flow through radial ports near electrode tips 1026.

Figure 10B:
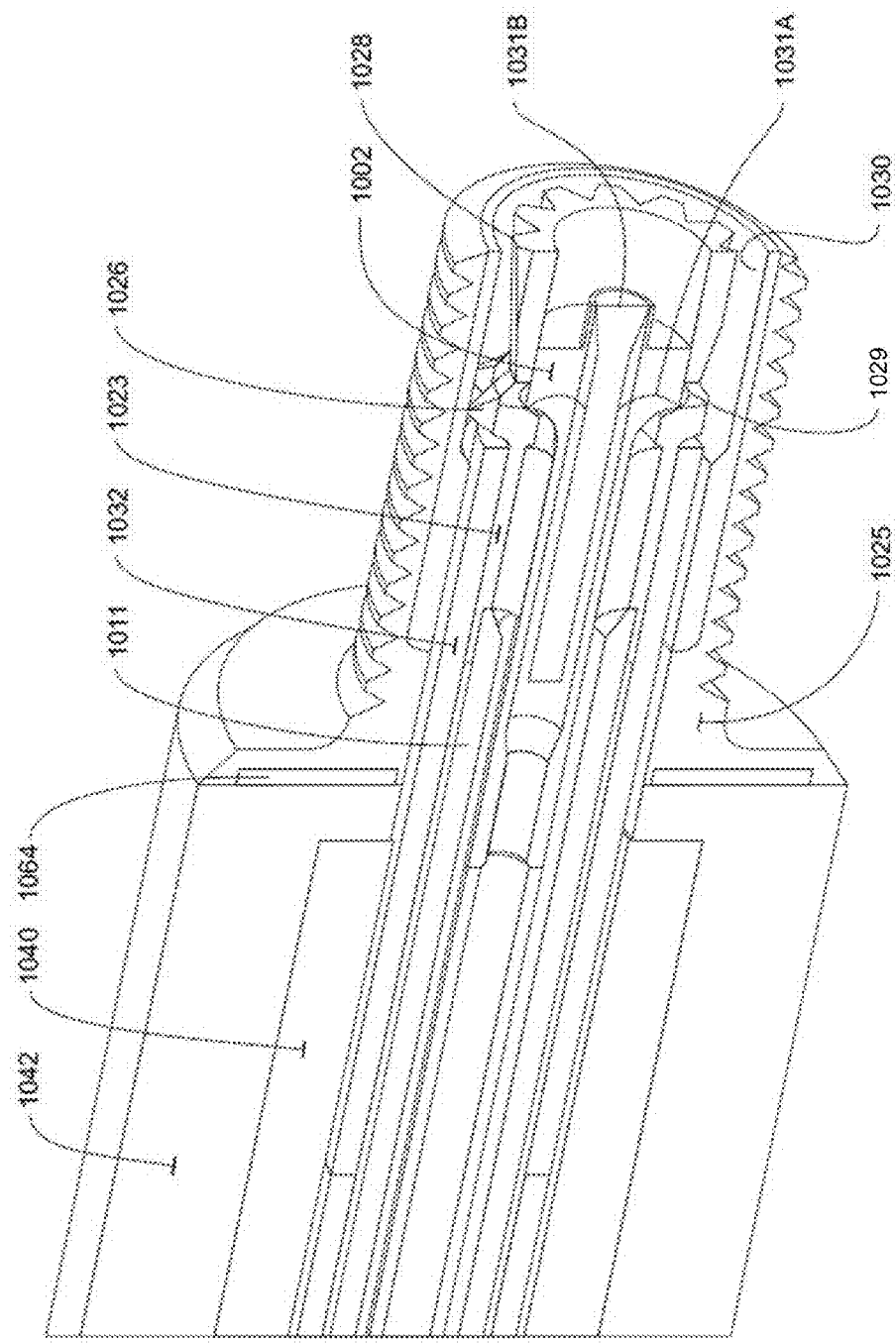
Figure 10C:
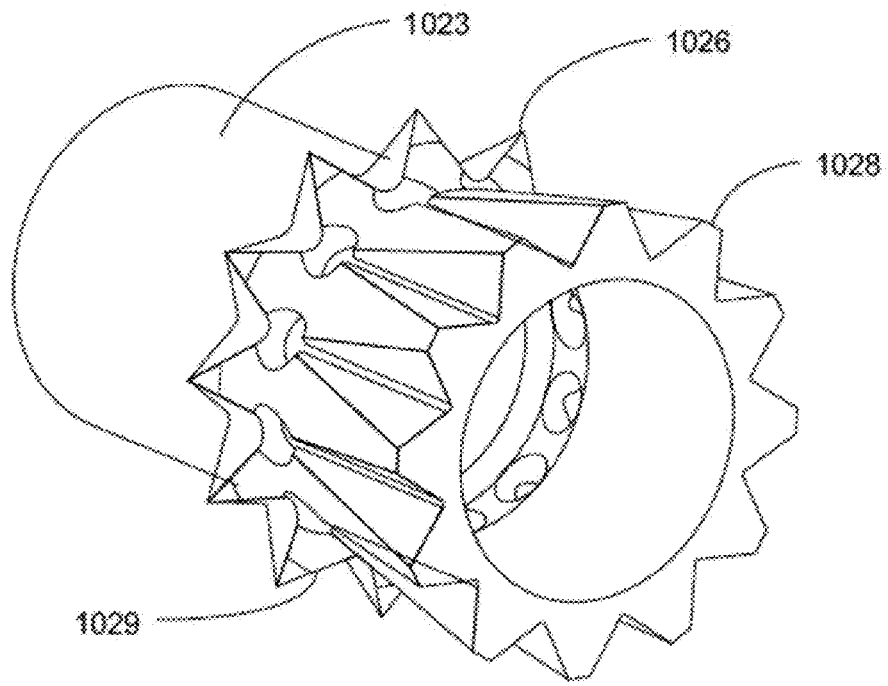
Figure 10D:
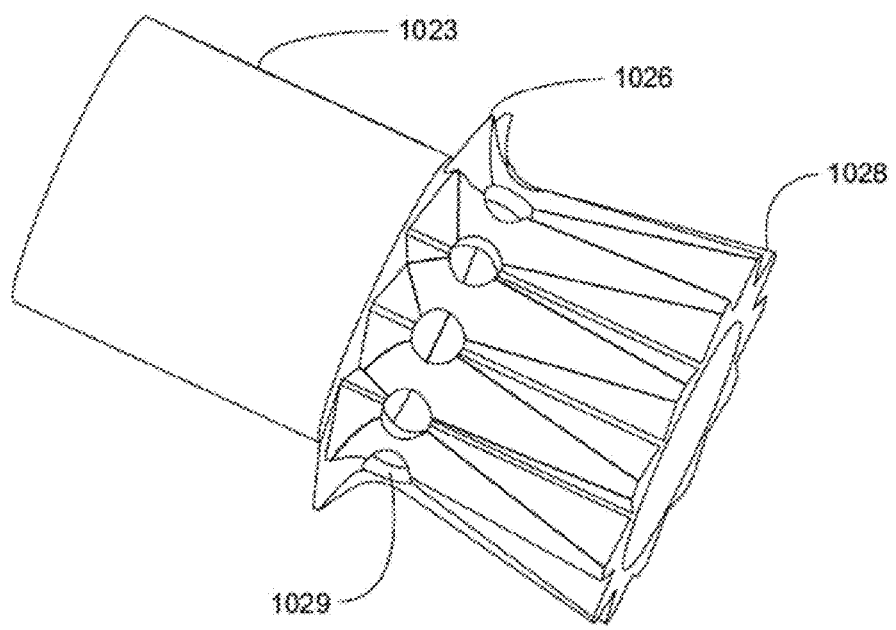
Figure 10E:
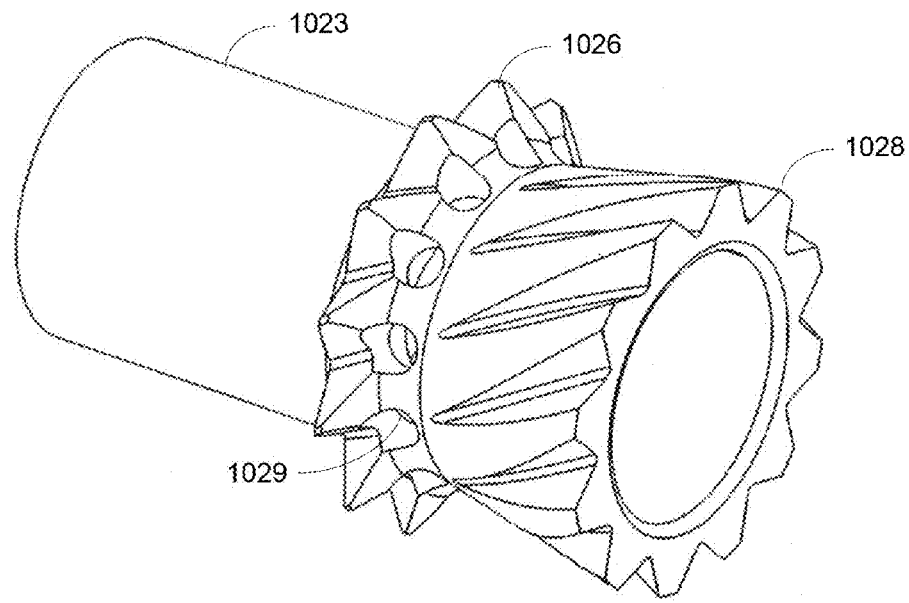
Figure 10F:
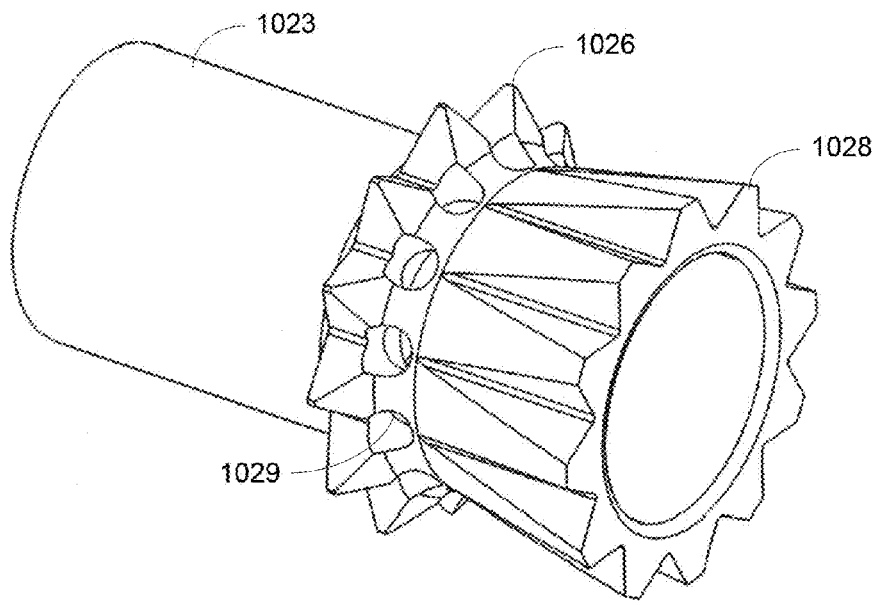

FIG. 10B shows an enlarged view of the components of the system 1000 that are near the combustion chamber including outward opening fuel control valve 1002, valve seat and electrode component 1023 including electrode tips such as 1026 and various swirl or straight electrodes such as 1028. Also shown in FIG. 10B is an exemplary embodiment of an engine adapter 1025 that is threaded into a suitable port to provide secure support for the seal 1064 and to serve as a replaceable electrode 1030. FIG. 10B shows sensors 1031A and 1031B configured with the fuel control valve 1002, which are described in further detail later. FIGS. 10C and 10D show additional views of an illustrative version of the valve seat and electrode component 1023. FIGS. 10E and 10F show additional views of an illustrative version of the valve seat and electrode component 1023 featuring various swirl and straight electrodes such as the electrode 1028. Referring to FIG. 10B, during the normally closed time that fuel flow is prevented by the valve 1002, ionization of an oxidant (e.g., such as air) may occur according to process instructions provided from computer 1070. During intake and/or compression events in combustion chamber 1024, air admitted into the annular space between electrodes 1026/1028 and electrode 1030 is ionized to form an initial current between electrode tips 1026 and electrode 1030. This greatly reduces the impedance, and much larger current is produced along with Lorentz force to accelerate the growing population of ions that are thrust into combustion chamber 1024 in controllable penetration patterns 1022.

Similarly, at times that valve 1002 is opened to allow fuel to flow through ports 1029 into the annular space between electrodes 1026/1028 and electrode 1030, fuel particles are ionized to form an initial current between electrode tips 1026 and 1030. This greatly reduces the impedance, and much larger current can be controllably produced along with greater Lorentz force to accelerate the growing population of ions that are thrust into combustion chamber 1024. Such ions and other particles are initially swept at sub-sonic or at most sonic velocity, e.g., because of the choked flow limitation past valve 1002. However Lorentz force acceleration along electrodes 1030 and 1028 can be controlled to rapidly accelerate the flow to sonic or supersonic velocities to overtake slower populations of oxidant ions in combustion chamber 1024.

High voltage for such ionization and Lorentz acceleration events may be generated by annular transformer windings in cells 1016, 1017, 1018, 1019, 1020, etc., starting with current generation by pulsing of inductive coils 1012 prior to application of increased current to open armatures 1014A and 1014B and valve 1002. One or more capacitors 1021 may store the energy produced during such transforming steps for rapid production of initial and/or thrusting current levels in ion populations between electrodes 1026/1028 and 1030.

In some implementations, corona discharge may be produced by a high rate of field development delivered through conductor 1050 or by very rapid application of voltage produced by the transformer (e.g., via annular transformer windings in cells 1016 1017, 1018, 1019, 1020, etc.), and stored in capacitor 1040 to present an electric field to cause additional ionization within combustion chamber 1024 including ionization in the paths established by ions thrust into patterns by Lorentz acceleration.

High dielectric strength insulator tube 1032 may extend to the zone within capacitors 1021 to assuredly contain high voltage that is delivered by a conductive tube 1011 including electrode tips 1026 and tubular portion 1028 as shown. Thus the dielectric strength of the glass case 1042 and the insulator tube 1032 provides compact containment of high voltage accumulated by the capacitor 1040 for efficient discharge to produce corona events in combustion chamber 1024. In some implementations, selected portions of glass tube 1042 may be coated with a conductive layer of aluminum, copper, graphite, stainless steel or another RF containment material or configuration including woven filaments of such materials.

In some implementations, the system 1000 includes a transition from the dielectric glass case 1042 to a steel or stainless steel jacket 1044 that allows application of the engine clamp 1046 to hold the system 1000 closed against the gasket seal 1064. For example, the jacket 1044 can include internal threads to hold externally threaded cap assembly 1010 in place as shown.

System 1000 may be operated on low voltage electricity that is delivered by cable 1054 and/or cable 1056, e.g., in which such low voltage is used to produce higher voltage as required including actuation of piezoelectric, magnetostrictive or electromagnet assemblies to open valve 1002 and to produce Lorentz and/or corona ignition events as previously described. Alternatively, for example, the system 1000 may be operated by a combination of electric energy conversion systems including one or more high voltage sources (not shown) that utilize one or more posts such as the conductor 1050 insulated by a glass or ceramic portion 1052 to deliver the required voltage and application profiles to provide Lorentz thrusting and/or corona discharge.

This enables utilization of Lorentz-force thrusting voltage application profiles to initially produce an ion current followed by rapid current growth along with one or more other power supplies to utilize RF, variable frequency AC or rapidly pulsed DC to stimulate corona discharge in the pattern of oxidant ion and radical and/or swept oxidant injection into combustion chamber 1024, as well as in the pattern of fuel ions and radicals and/or swept fuel particles that are injected into combustion chamber 1024. Accordingly, the energy conversion efficiencies for Lorentz and/or for corona ignition and combustion acceleration events are improved.

Figure 11A:
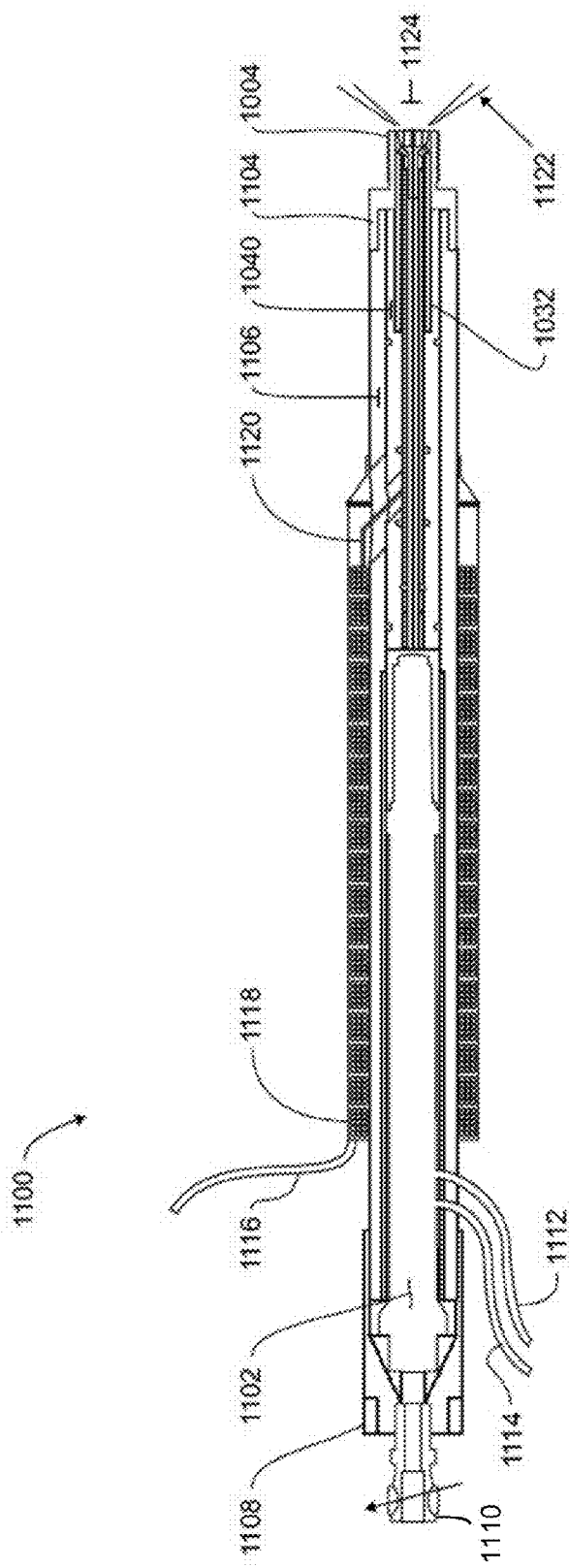
FIGS. 11A-11C show schematics of another embodiment of a system for converting heat engines.

FIG. 11A shows a schematic of another embodiment of a system 1100 for converting heat engines that includes features and components similar to those of the system 1000 introduced by FIGS. 10A and 10B. In the exemplary embodiment of system 1100, a suitable metal alloy terminal component 1104 is provided that forms a cylindrical shape of dimensions to replace a diesel fuel injector, or in other versions, the component 1104 may be threaded to allow replacement of a sparkplug as shown. The system 1100 includes an insulator glass sleeve 1106 that provides insulation of one or more capacitors 1040 in the annular spaces within the insulator glass sleeve 1106. The system 1100 includes a piezoelectric driver assembly 1102 that actuates a valve assembly 1004. Portions of the valve assembly 1004 are shown in more detail in the section view in FIG. 11B, including the valve seat and electrode 1023, the insulator sleeve 1032, the conductor tube 1011, and one of the capacitors 1040.

Figure 11B:
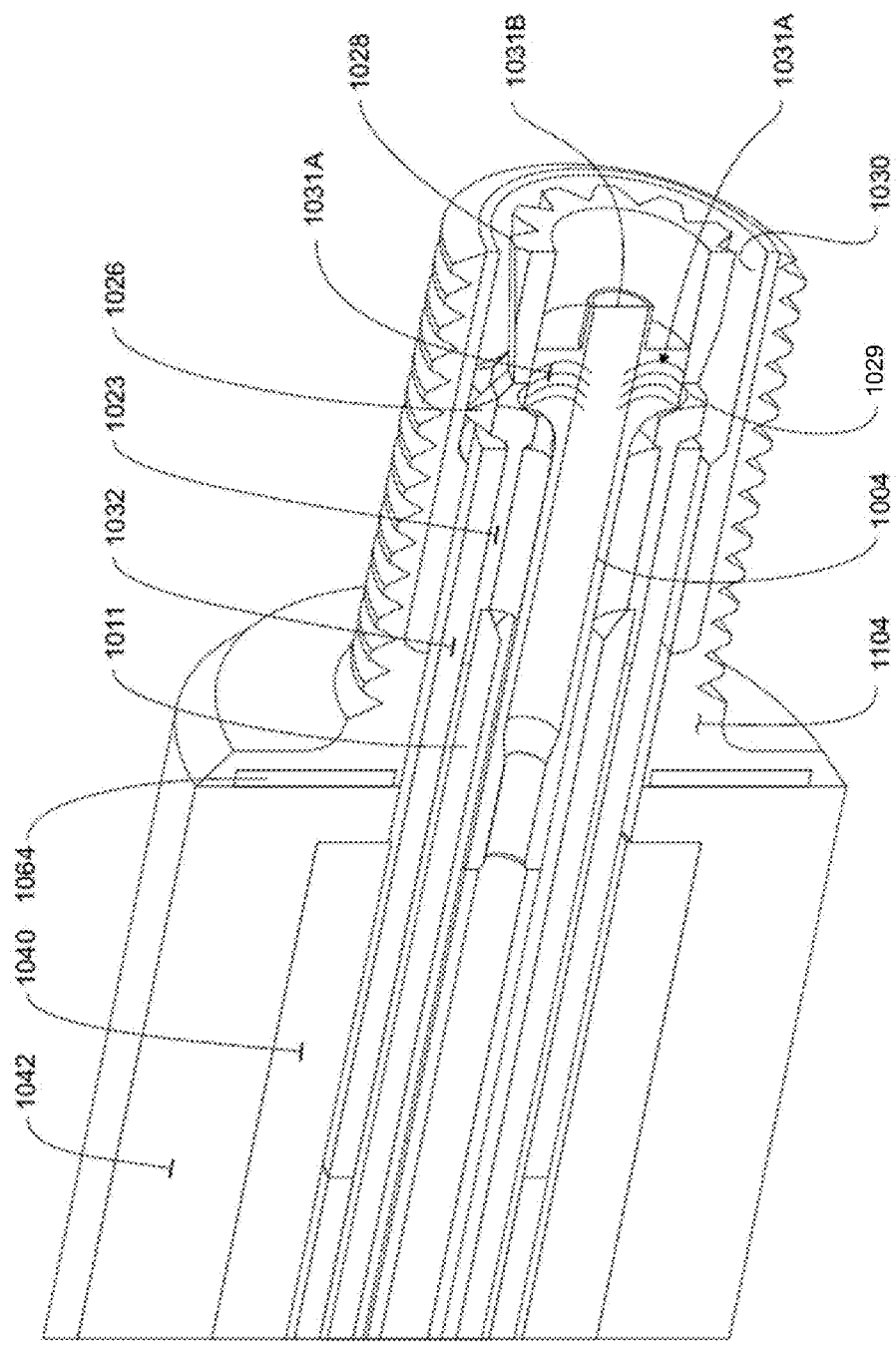

Pressurized fuel is connected to a variable pressure regulator 1110 of the system 1100 and delivered for flow through axial grooves surrounding the exemplary hermetically sealed piezoelectric assembly 1102, e.g., including bellows sealed direct conveyance of push-pull actuation by the valve actuator 1102 and the valve assembly 1004, which can include, for example, an electrically insulative valve stem tube such as silicon nitride, zirconia or composited high strength fiber optics, e.g., such as glass, quartz or sapphire as shown including a representative portion of sensors 1031A and 1031B in FIG. 11B.

For example, such fuel flow cools the exemplary piezoelectric actuator 1102 and valve train components along with the valve seat and guide electrode component 1023 and related components to minimize dimensional changes due to thermal expansion mismatches. The system 1100 includes a controller 1108 for system operations including operation of the exemplary piezoelectric actuator 1102. The controller 1108 (as well as the controller 1008 of FIG. 10A and other controllers of the disclosed technology) can be configured to overcome any flow error due to any elastic strain and such thermal expansion mismatch, e.g., as detected by instrumentation as relayed by sensor 1031A filaments to monitor the various positions from closed to various voltage proportional valve to seat gap positions or measurements and/or in response to flow monitoring instrumentation in the insulator sleeve 1032 and/or fuel injection and combustion pattern detection in the combustion chamber by instrumentation and fiber optic relay 1031B. For example, any error in actual compared to commanded fuel flow including ion induced oxidant flows can be immediately compensated by adaptive pressure control and/or voltage control adjustments of the exemplary piezoelectric driver 1102, e.g., including adaptive adjustment and application of negative voltage to positive voltage bias as may be needed.

Figure 11C:
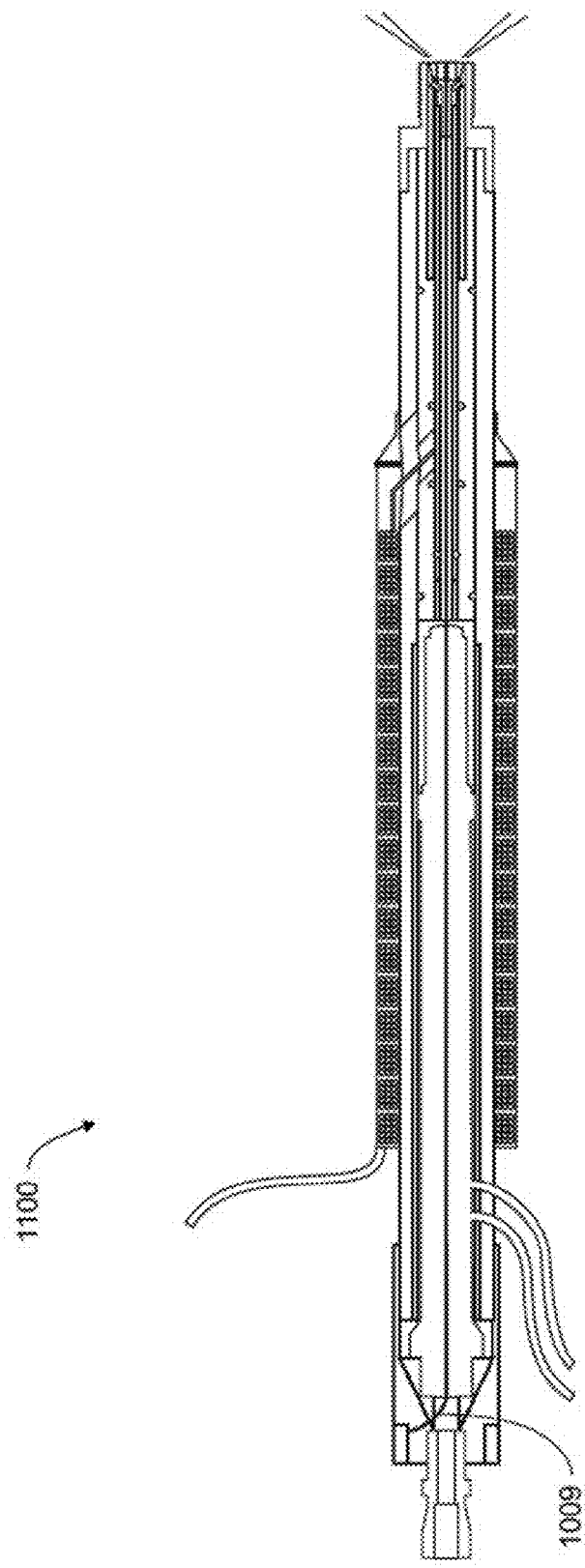

The system 1100 includes a controller 1108 for operation of the exemplary piezoelectric actuator 1102, in which can be configured to be in communication with the controller 1108 by a suitable communications path. For example, in some applications, fiber optic filaments are routed through the hermetically sealed central core of the valve assembly continuing through the hermetically sealed core of the piezoelectric assembly and axial motion is compensated by slight flexure of the fiber optics in a path to the controller (e.g., such as controller 1108 or 1008) and/or some or all of the fiber optic filaments may be routed from the controller through one or more of the grooves that fuel flows through to slightly flex to accommodate for reciprocation of the fuel valve assembly. FIG. 11C shows a schematic view of the system 1100 including an optical fiber path 1009 to/from the controller and the piezoelectric actuator assembly.

For example, the system 1100 can be operated using commands from the controller 1108 to operate the exemplary piezoelectric actuator 1102 by application through insulated cables 1112 and 1114 of adaptively variable voltage ranging from, for example, −30 VDC to about +220 VDC. For example, voltage applied to the piezoelectric actuator 1102 can be adaptively adjusted to compensate for thermal expansion differences between stationery components and dynamic components, e.g., such as the valve stem and other components of valve assembly 1004. For example, such adaptive adjustments can be made in response to combustion chamber fuel pattern and combustion characterization detection by various sensors, e.g., such as sensors 1031A and 1031B within the system 1100, and/or sensors in the head gasket and/or fiber optic position sensors within insulator sleeve 1032 of the valve 1004 that detect the distance of separation between the valve seat and electrode component 1023 and the valve 1004, along with flow through ports 1029 to the combustion chamber 1024.

The controller 1108 also provides control and excitation through the cable 1116 of coil assembly 1118 to produce high voltage that is delivered through insulated conductor 1120 to the conductor tube 1011, the one or more capacitors such as the capacitor(s) 1040 in the annular space within the insulator glass sleeve 1106, and subsequently to the valve seat and electrode 1023 to energize electrodes 1026 and/or 1028 and 1030 for production of spark, Lorentz-thrusted ions, and/or corona ignition discharge in the fuel injection penetration pattern within combustion chamber 1124. In some implementations, for example, the controller 1108 can utilize at least one of the circuits disclosed in U.S. Pat. Nos. 3,149,620; 4,122,816; 4,402,036; 4,514,712; 5,473,502; US2012/0180743 and related references that have cited such processes, and all of these documents are incorporated by reference in their entirety.

The disclosed systems, devices and methods can be implemented to provide Lorentz-thrusted ion characterized penetration patterns in the combustion chamber to adaptively adjust the timing including repeated occurrences of corona discharge in one or more patterns established by Lorentz initiated and launched ions. Such target or pilot ions greatly reduce the corona energy requirements and improve the efficiency of corona discharge ignition including placement of corona energy discharges of ultraviolet radiation and/or production of additional ions in the patterns of fuel and air mixtures to accelerate initiation and completion of combustion events. Additional exemplary techniques, systems, and/or devices to produce corona discharge is described in U.S. patent application Ser. No. 13/844,488 entitled "FUEL INJECTION SYSTEMS WITH ENHANCED CORONA BURST", filed on Mar. 15, 2013, which is incorporated by reference in its entirety as part of the disclosure in this patent document.

Figure 12A:
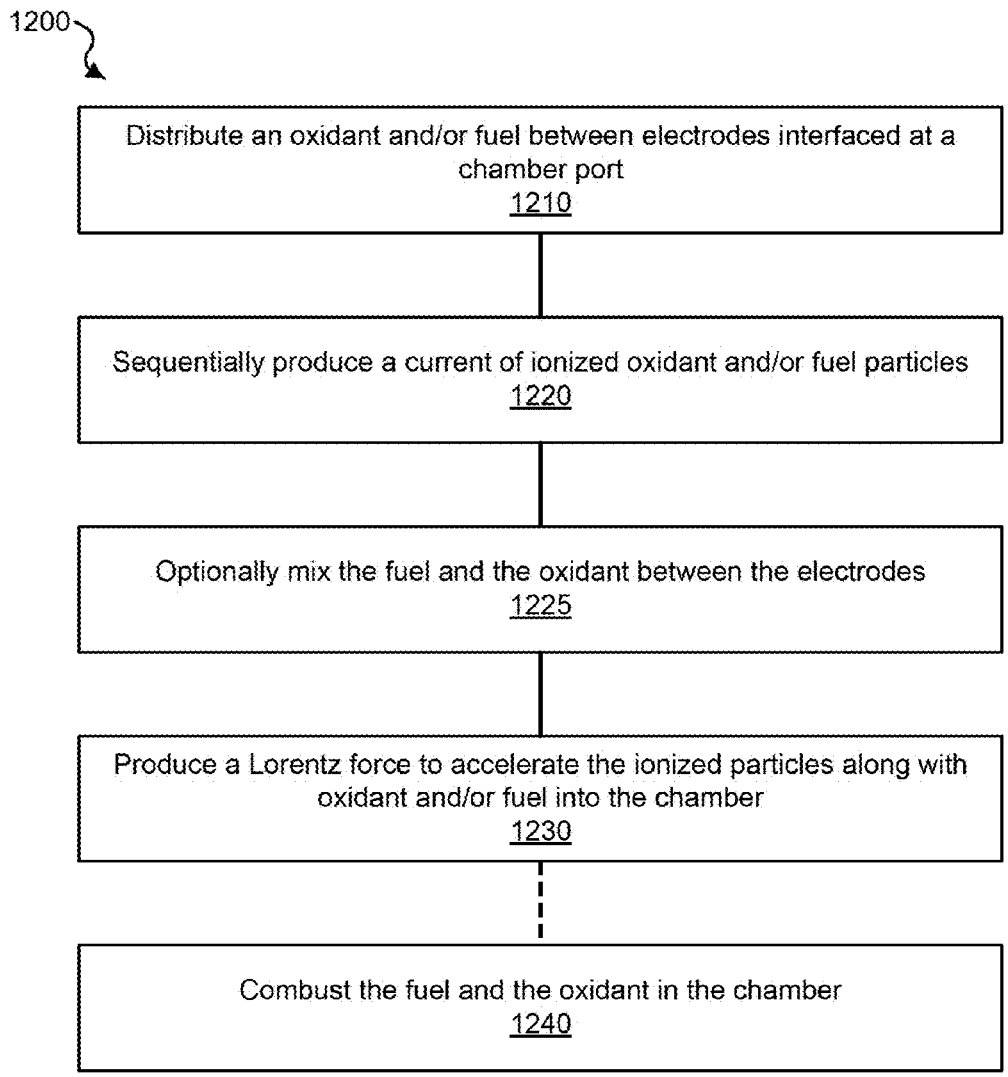
FIG. 12A shows a block diagram of a process to inject and/or ignite a fuel in a chamber using Lorentz force.

FIG. 12A shows a block diagram of a method 1200 to inject a fuel and/or an oxidant in a combustion chamber using Lorentz force. The exemplary method 1200 can be implemented using any of the described fuel injection and ignition devices and systems as described in this patent document. In one example, the method 1200 includes a process 1210 to distribute an oxidant and/or a fuel between electrodes interfaced at a port of a chamber, e.g., such as a combustion chamber of an engine. For example, the process 1210 can include dispersing air having oxidant particles (e.g., $O_2$) in a space formed between a first electrode and a second electrode of an integrated fuel injector and ignition device or system (e.g., such as, but not limited to, the system 100, 200, 300, 300C, 800, 900, 1000, and 1100). For example, the air and/or fuel can be dispersed into the integrated fuel injector and ignition system with a particular velocity or pressure in the spacing between the electrodes. The method 1200 includes a process 1220 to produce a current of ionized oxidant and/or fuel particles of the distributed oxidant and/or fuel, respectively. For example, the process 1220 can include applying an electric potential at a controllable time, magnitude, duration, and/or frequency across the electrodes to create an electric field that produces a current of a plasma of ionized oxidant particles. The controllable timing can include first producing one or more times and thrusting one or more oxidant inventories of ions into the combustion chamber, followed by another event of producing one or more times and thrusting one or more fuel inventories of ions into the combustion chamber. The controllable timing can include producing one or more times and thrusting one or more inventories of mixed fuel and oxidant ions and/or products of partial or complete combustion into the combustion chamber. The method 1200 includes a process 1230 to produce a Lorentz force to accelerate the ionized oxidant and/or fuel particles and/or oxidant and/or fuel into the chamber. For example, the current produced by the process 1220 can be used to accelerate the particles into the combustion chamber. For example, the current produced by the process 1220 can be used to accelerate ionized particles along with fuel and/or oxidant the particles into the combustion chamber. In some examples, the process 1230 can include generating a magnetic field associated with the current, in which the electric field and the magnetic field generate a Lorentz force to accelerate the ionized oxidant and/or fuel particles into the chamber. For example, the generated magnetic field to produce the Lorentz force can be used in conjunction with the control of the current (e.g., by control of the applied electric field) to produce and control the Lorentz force of ionized particles. The produced Lorentz force can be controlled to accelerate the ionized particles in a striated and/or stratified pattern. Additionally, for example, the method 1200 can further include a process to mix a fuel with the air (including oxidant particles) in the spacing between the electrodes. In some implementations, the optional process 1225 can be implemented prior to or instead of the processes 1220 in which the mixed oxidant and fuel particles are ionized concurrently or consecutively to produce the ion current (e.g., using the applied electric potential across the electrodes) and Lorentz force is produced one or more times to thrust the ionized oxidant and/or ionized fuel particles to combust at the interface or port of the combustion chamber and at controllable depths, extents, or patterns within the combustion chamber. Method 1200 can further include process 1240 to combust the fuel and the oxidant in the combustion chamber including instances that the oxidant and/or the fuel is combusted in a locally homogeneous, striated, or stratified pattern in stoichiometric, surplus oxidant, surplus fuel ratio.

Exemplary Methods of the Disclosed Technology

The following examples are illustrative of several embodiments of the present technology. Other exemplary embodiments of the present technology may be presented prior to the following listed examples, or after the following listed examples.

In one example of the present technology (example 1), a method to inject a fuel into a chamber includes distributing a fuel between electrodes configured at a port of a chamber; generating a current of ionized fuel particles by applying an electric field between the electrodes to ionize at least some of the fuel; and producing a Lorentz force to accelerate the ionized fuel particles into the chamber.

Example 2 includes the method of example 1, in which the accelerated ionized fuel particles initiate a combustion process with oxidant molecules or compounds present in the chamber.

Example 3 includes the method of example 2, in which the combustion process of the ionized fuel particles is completed at an accelerated rate as compared to a combustion process using a spark plug or a direct injection of the fuel.

Example 4 includes the method of example 2, in which the chamber includes a combustion chamber of an engine.

Example 5 includes the method of example 1, in which the Lorentz force accelerates the ionized fuel particles into the chamber in a striated pattern and/or a stratified pattern.

Example 6 includes the method of example 5, further including applying an electric potential on an antenna electrode interfaced at the port or the combustion chamber to induce a corona discharge into the chamber.

Example 7 includes the method of example 6, in which the corona discharge ignites the ionized fuel particles and/or the fuel within the chamber.

Example 8 includes the method of example 6, in which the corona discharge takes a form of the stratified and/or stratified pattern.

Example 9 includes the method of example 1, in which the ion current reduces the resistance to establishing a larger ion current.

Example 10 includes the method of example 1, further including controlling the Lorentz force by modifying a parameter of the applied electric field, the parameter including at least one of a frequency of the applied electric field, the duration of a pulsed application of the electric fields, a magnitude of the applied electric field, or a sequence multiple electric fields applied.

Example 11 includes the method of example 1, in which the method of producing the Lorentz force includes applying a magnetic field to interact with the ionized fuel particles. Example 11.3 includes the method of example 11, in which the method of producing the Lorentz force includes applying a supplemental magnetic field to interact with the current of ionized fuel particles. Example 11.6 includes the method of example 11, in which the method of producing the Lorentz force includes applying a supplemental magnetic field to thrust the current of ionized fuel particles into the chamber.

Example 12 includes the method of example 1, in which the fuel includes at least one of methane, natural gas, an alcohol fuel including at least one of methanol or ethanol, propanol, butanol and/or at least one of butane, propane, gasoline, diesel fuel, ammonia, urea, nitrogen, or hydrogen.

Example 13 includes the method of example 1, further including distributing an oxidant between electrodes; ionizing at least some of the oxidant by generating a different electric field between the electrodes to produce an ion current of ionized oxidant particles; and producing a one or more Lorentz forces to accelerate the ionized oxidant and/or fuel particles into the chamber.

Example 14 includes the method of example 13, in which the method for distributing the oxidant includes pumping air from the chamber into a space between the electrodes.

Example 15 includes the method of example 13, in which the oxidant includes at least one of oxygen gas ($O_2$), ozone ($O_3$), oxygen atoms (O), nitrogen atoms (N), hydroxide ($OH^-$), carbon monoxide (CO), or an oxide of nitrogen ($NO_x$).

Example 16 includes the method of example 13, in which the producing the different Lorentz force includes applying a magnetic field to interact with the ionized oxidant particles.

Example 17 includes the method of example 1, in which the distributing the fuel includes the method of actuating opening and closing of a valve to allow the fluid to flow into a space between the electrodes.

Example 18 includes the method of example 17, in which the method of actuating opening of the valve includes controlling an electromagnet to produce a force on the valve that overcomes an opposing force of at least one of friction, differential pressure on a valve seal area, force exerted by a magnet and/or mechanical spring.

Example 19 includes the method of example 1, in which the electrodes include a first electrode and a second electrode configured in a coaxial configuration at a terminal end interfaced with the port, in which the first electrode is configured along the interior of an annular space between the second electrode and the first electrode includes one or more points protruding into the annular space.

Example 20 includes the method of example 19, in which the second electrode includes one or more points protruding into the annular space and aligned with the one or more points of the first electrode to reduce the space between the first and second electrodes.

Example 21 includes the method of example 1, in which the applying the electric field includes applying a first voltage to create an electrical current in electromagnet coils, in which the electrical current generates a second voltage in a transformer, the transformer including a series of annular cells to step up the second voltage to a subsequent voltage in a subsequent annular cell, in which one of the second voltage or the subsequent voltage is applied across the electrodes.

Example 22 includes the method of example 21, in which the first voltage is in a range of 12 V to 600 V.

Example 23 includes the method of example 21, in which the subsequent voltage is in a range of 60 kV or less.

In one example of the present technology (example 24), a method to combust a fuel in an engine includes distributing an oxidant between electrodes interfaced at a port of a combustion chamber of an engine; ionizing the oxidant by generating an electric field between the electrodes to produce a current of ionized oxidant particles; producing a Lorentz force to accelerate the ionized oxidant particles into the combustion chamber; and injecting a fuel into the combustion chamber, in which the ionized oxidant particles initiate and/or accelerate combustion of the fuel in the combustion chamber. Example 24.3 comprising the method of example 24 in which the ionized oxidant particles provide a pattern for corona discharge to accelerate initiation and/or completion of combustion of the fuel and oxidant in the combustion chamber.

In one example of the present technology (example 25), a method to combust a fuel in an engine includes distributing a fuel between electrodes configured at a port of a combustion chamber of an engine; ionizing at least some of the fuel by generating an electric field between the electrodes to produce a current of ionized fuel particles; and producing a Lorentz force to accelerate the ionized fuel particles into the combustion chamber, in which the ionized fuel particles initiate and/or accelerate combustion with oxidant compounds present in the combustion chamber. Example 25.3 comprising the method of example 25 in which the ionized fuel particles provide a pattern for corona discharge to accelerate initiation and/or completion of combustion of the fuel in the combustion chamber.

In one example of the present technology (example 26), a method to inject a fuel into an engine includes distributing an oxidant between electrodes configured at a port of a combustion chamber of an engine; ionizing at least some of the oxidant by generating an electric field between the electrodes to produce a current of ionized oxidant particles; producing a Lorentz force to accelerate the ionized oxidant particles into the combustion chamber; distributing a fuel between the electrodes; ionizing at least some of the fuel by generating a second electric field between the electrodes to form a current of ionized fuel particles; and producing a second Lorentz force to accelerate the ionized fuel particles into the combustion chamber.

Example 27 includes the method of example 26, in which the ionized fuel particles accelerated by the second Lorentz force initiate and/or accelerate combustion processes in the combustion chamber.

Example 28 includes the method of example 27, in which the combustion process of the ionized fuel particles is completed at an accelerated rate as compared to a combustion process using a spark plug ignition or a direct injection of the fuel.

Example 29 includes the method of example 27, in which the ionized fuel particles are accelerated by the second Lorentz force at velocities to overtake the previously accelerated ionized oxidant particles in the combustion chamber.

Example 30 includes the method of example 26, in which the Lorentz force causes the ionized oxidant particles and/or the second Lorentz force causes the ionized fuel particles to enter the combustion chamber in a striated pattern.

Example 31 includes the method of example 26, in which the distributing the oxidant and the generating the electric field are implemented at any period of the engine's operating cycle including an intake period, compression period, a power production period and an exhaust period.

Example 32 includes the method of example 26, in which the distributing the fuel includes actuating opening and/or closing of a valve to allow the fluid to flow between the electrodes.

Example 33 includes the method of example 32, in which the actuating opening of the valve includes controlling an electromagnet to produce a force on the valve that overcomes a force including friction drag, differential pressure on a valve seal area, and an opposing force exerted by a magnet or mechanical spring.

Example 34 includes the method of example 32, in which the actuating the opening and/or closing of the valve distributes the fuel between the electrodes, and the ionized fuel particles are subsequently thrust into the combustion chamber during one of before top dead center (BTDC), at top dead center (TDC), or after top dead center (ATDC) of a piston cycle in the combustion chamber.

Example 35 includes the method of example 26, in which the electrodes include a first electrode and a second electrode configured in a coaxial configuration at a terminal end interfaced with the port, in which the first electrode is configured along the interior of an annular space between the second electrode and the first electrode includes one or more points protruding into the annular space.

Example 36 includes the method of example 35, in which the second electrode includes one or more points protruding into the annular space and aligned with the one or more points of the first electrode to reduce the space between the first and second electrodes.

Further Embodiments of the Disclosed Technology

Devices, systems, and techniques are disclosed for injecting and/or igniting a fluidic substance using Lorentz forces and/or Lorentz-assisted corona discharges based on electrode configurations of the present technology that utilize low work function material coatings and/or high work function material coatings on electrodes, and electrode structural designs.

In some aspects, multi-functional injector/igniter devices and systems are structured to include electrodes formed of or coated by a high work function material to advantageously produce a corona discharge to ignite fuel and oxidant and/or ionized particles (e.g., such as ionized fuel particles and/or ionized oxidant particles) in a chamber where the ionized particles are injected.

In some aspects, multi-functional injector/igniter devices and systems are structured to include electrodes formed of or coated by a low work function material to advantageously produce a Lorentz force to inject the ionized particles into the chamber, where the Lorentz force is produced using a relatively lower voltage signal to generate a current of the of the ionized particles at a location including at least one low work function electrode region. Additionally, or alternatively, for example, the multi-functional injector/igniter devices and systems are structured to include smooth-surface and/or parallel electrodes including coaxial wire patterns with one or more lower work function zones to initiate current that is thrust into combustion chamber penetration patterns.

The work function of the exemplary materials used in the disclosed electrode configurations refers to a surface property of the material in which the minimum thermodynamic work or electropotential energy needed to remove an electron from the material to a point or distance immediately outside the material surface, where the final electron position is relatively far from the surface on an atomic scale while relatively close to the material on a larger-than-atomic scale. In the context described herein, a high work function material can refer to a material capable of producing a corona discharge at a distance instead of a more localized spark discharge. A low work function material can refer to a material capable of producing a Lorentz force on a current that is produced at a lower voltage than to produce a corona discharge. In some implementations of the disclosed technology, for example, high work function materials can include materials having a work function greater than approximately 5 eV (e.g., including 4.95 eV etc.); and, for example, low work function materials can include materials having a work function less than approximately 4.95 eV. Notably, some materials, for example, can possess a work function within a range spanning both that of a low and high work function material, e.g., such as tungsten (W) or copper (Cu).

In one aspect, a method to accelerate particles into a chamber includes distributing a fluidic substance between electrodes configured at a location proximate a chamber, in which at least one of the electrodes includes a region of low work function material; generating a current of ionized particles by applying an electric field between the electrodes to ionize at least some of the fluidic substance; and producing a Lorentz force to accelerate the ionized particles into the chamber.

Implementations of the method can include one or more of the following exemplary features. In some implementations, for example, the electrode can include a coating formed of the low work function material coated over an underlying material such as a semiconductor, metal or another electrically conductive material. For example, the underlying electrically conducive material can include, but is not limited to, carbon, copper, tungsten, gold, platinum, and tantalum along with alloys such as Haynes 230, Invar and Carpenter MP35N. For example, the low work function material coating can include, but is not limited to, an intermetallic or solid solution material or other material including compounds, e.g., including calcium, aluminum, barium, thorium, titanium and/or zirconium (e.g., zirconium carbide). In some examples, the low work function material coating can include titanium carbide (TiC), zirconium carbide (ZrC), $LaB_6$, BaW, and/or more complex compositions such as $Ca_{12}Al_7O_n$.

In some implementations of the method, for example, the electrodes can be composites or have hybridized functions such as arrangements that include a permanent magnetic material or a subsystem such as an electrode support or adjacent feature that is a magnetic material to provide a magnetic field to force at least the initial ion current to travel towards the combustion chamber. For example, the permanent magnetic material can include rare earth magnetic materials that provide high magnetic strength with reduced work functions, e.g., such as $Nd_2Fe_{14}B$, GdCo, SmGdCo, and/or $Sm_2Co_{17}$, including embodiments that may be coated in selected regions with materials such as TiC, ZrC, $LaB_6$, BaW, and/or $Ca_{12}Al_7O_n$ and in other regions with relatively high work function materials such as Ni, Co, W, Ir, Pd, Au, and/or Pt.

In certain implementations, for example, the underlying electrically conductive material can include the permanent magnetic material. Also, for example, in implementations where the electrodes include the permanent magnetic material, the Lorentz force can be produced at least in part as a force that is supplemented by a magnetic field generated from the magnetic material that interacts with the generated current of the ionized particles. For example, this force can include a self-induced Lorentz force that thrusts the ionized particles into the chamber, as well as indirectly thrust non-ionized particles, e.g., such as by secondary effects of the ionized particles colliding and thereby thrusting non-ionized particles into the chamber. In some implementations, the exemplary rare earth magnets may be shaped and polled in various ways to achieve such supplementary Lorentz force production. For example, a toroidal magnet can be shaped like a right circular cylinder with a hollow core or donut, which may have the North magnetic pole on one face and the South magnetic pole on the opposite face; or, such a shape may have alternating North and South poles around the circumference such as one or more North and an equal number of South poles.

In some implementations of the method, for example, the method of producing the Lorentz force can include applying a magnetic field to interact with the generated current of the ionized particles. For example, the magnetic field can be applied by an electromagnet located at a second position proximate to the chamber, or in some examples, the magnetic field can be applied by a permanent magnet located at a second position proximate to the chamber.

In implementations of method, for example, the ion current reduces the fluidic substance resistance to establishing a larger ion current. For example the method can include controlling the Lorentz force by modifying a parameter of the applied electric field, in which the parameter can include, but not limited to, a frequency of the applied electric field, a magnitude of the applied electric field, or a sequence in which multiple electric fields are applied.

In some implementations of the method, for example, the generating the current of the ionized particles can include applying an adaptively-adjusted voltage regime in an exemplary range of 10 to 40,000 volts (and in some implementations, in a range of 10 to 60,000 volts or more depending upon the combustion chamber temperature, pressure, and gas composition), in which the initial voltage applied is a larger voltage and the subsequent applied voltage(s) are substantially lower than the initial voltage to initiate a current as shown in FIGS. 5, 6, and 7.

In some implementations of the method, for example, the electrodes can include a first electrode and a second electrode configured in a coaxial configuration at a terminal end of a device interfaced with the chamber at the port. For example, as shown in FIGS. 1, 3, 13 and 15A-C exemplary embodiments of the device, which can include a multi-functional injector and ignition device, the first electrode is configured along the interior of an annular space between the second electrode and the first electrode includes one or more points protruding into the annular space.

In some implementations of the method, for example, the fluidic substance can include an oxidant and/or a fuel and the ionized particles include ionized oxidant and/or fuel particles, where the accelerated ionized particles initiate a combustion process with oxidant compounds that are present in the chamber (e.g., such as a combustion chamber of an engine). For example, the combustion process of the ionized fuel particles can be completed at an accelerated rate as compared to a combustion process using a direct injection of the fuel without ionization of the fuel or the oxidant. For example, the fuel may include at least one of methane, natural gas, carbon monoxide, hydrogen and an alcohol fuel including at least one of methanol, propanol, or butanol or other selections such as ethanol, butane, propane, gasoline, diesel fuel, ammonia, urea, nitrogen, or hydrogen.

In some implementations of the method, for example, the Lorentz force can be implemented to accelerate the ionized particles into the chamber in a predetermined pattern. For example, the predetermined pattern of the Lorentz force that accelerates the ionized particles into the chamber can include a striated pattern and/or an expanding stratified pattern.

Moreover, the method can further include applying an electric potential at another electrode interfaced at the port to induce a corona discharge into the chamber, in which this electrode may include a high work function material. For example, the electrode implemented to induce the corona discharge can be configured as an antenna electrode, in which the induced corona discharge is produced at a distance away from the surface of the antenna electrode, e.g., based on a generated field that emanates from the antenna electrode based on the applied electric potential that is applied at the antenna electrode. The corona discharge can be produced in multiple locations toward and into the chamber based on the electropotential field strength, presence of ions including distributions such as a pattern of ions in the combustion chamber, temperature of gases in the combustion chamber, the size and shape of antenna and positions of the exemplary antenna electrode. In some implementations, for example, the antenna electrode can be configured as an antenna electrode group including a plurality of electrodes, e.g., where at least some of the electrodes may include the high work function material and/or may be blunt, recessed or encapsulated within dielectric material.

For example, the antenna electrode can be structured to include a coating formed of the high work function material coated over an underlying electrically conductive material. For example, the high work function material coating can include platinum (Pt), gold (Au), tungsten (W), rhodium (Rh), iridium (Ir), beryllium (Be), osmium (Os), tellurium (Te), and/or selenium (Se); and the underlying electrically conducive material can include carbon, tungsten (W), gold (Au), platinum (Pt), and/or tantalum (Ta) or various semiconductor or metal alloys.

In implementations of the method, for example, the corona discharge can be a positive corona or a negative corona, which can be determined by the polarity of the applied antenna electrode voltage and the ground voltage. In some instances the electrode may be structured e.g., based on the curvature and/or aspect ratio of the terminal end of the electrode. Generally, a negative corona stimulates a higher density of free electrons that make up the corona discharge as compared to a positive corona, which may be constituted by more positive charge carriers (e.g., such as positively charged ions). The ions of oxygen, nitrogen, argon, neon, xenon, krypton, etc., and/or radicals such as $O_3$, OH, oxides of nitrogen NOx, in a positive corona may be configured closer to the surface of the electrode that initiates the corona discharge, e.g., in a region of high potential gradient (and therefore the electrons have a high energy. The electrons present in the negative corona are typically in the outer, lower-field locations of the corona discharge. The positive corona and the negative corona produced can be controlled to exhibit different functionalities and resultant effects when implemented according to the field polarity, strength, timing of initiation and duration of field application including DC, pulsed DC, AC and RF fields.

In some configurations of the antenna electrode, for example, at least some of electrodes of the antenna electrode group can be structured to include at its/their terminal end(s) projected toward the port a circular, curvilinear, or pointed end that provides a high aspect ratio capable of producing a negative corona. In some configurations of the antenna electrode, for example, at least some of electrodes of the antenna electrode group can be structured to include at its/their terminal end(s) projected toward the port a blunt end that provides a lower aspect ratio capable of producing a positive corona.

For example, in implementations including the method for applying the electric potential to induce the corona event, the fluidic substance can include oxidant and/or the fuel and the ionized particles can include the ionized oxidant and/or fuel particles, e.g., such that the corona discharge ignites fuel and/or the ionized fuel particles within the oxidant in the chamber. In some implementations of the method, for example, the corona discharge can be initiated to take a form of a predetermined pattern (e.g., ignite the fuel and/or ionized fuel particles in the predetermined pattern). For example, the predetermined pattern of the corona discharge can include a striated and/or a stratified pattern.

In some implementations of the method, for example, the fluidic substance can include an oxidant and the ionized particles include ionized oxidant particles, where the accelerated ionized particles initiate a combustion process with a fuel substance that is present in the chamber (e.g., such as may be delivered before or after the ionized oxidant is delivered to a combustion chamber such as may be found in an engine). For example, in some implementations of the method using the Lorentz force to accelerate ionized fuel particles, the accelerated ionized oxidant particles can initiate a combustion process with fuel and/or the ionized fuel particles that are accelerated into the chamber prior to or subsequent to the ionized oxidant particles being accelerated into the chamber. In some implementations of the method where the fluidic substance includes a fuel and the first ionized particles accelerated into the chamber include ionized fuel particles, the method can further include providing an oxidant between the electrodes; ionizing the oxidant by generating a different electric field between the electrodes to produce an ion current of ionized oxidant particles; and producing a different Lorentz force to accelerate the ionized oxidant particles into the chamber. For example, the method providing the oxidant can include pumping air from the chamber into a space between the electrodes. Examples of the oxidant can include, but are not limited to, oxygen gas ($O_2$), ozone ($O_3$), oxygen atoms (O), hydroxide ($OH^-$), carbon monoxide (CO), and/or oxides of nitrogen ($NO_x$).

Figure 12B:
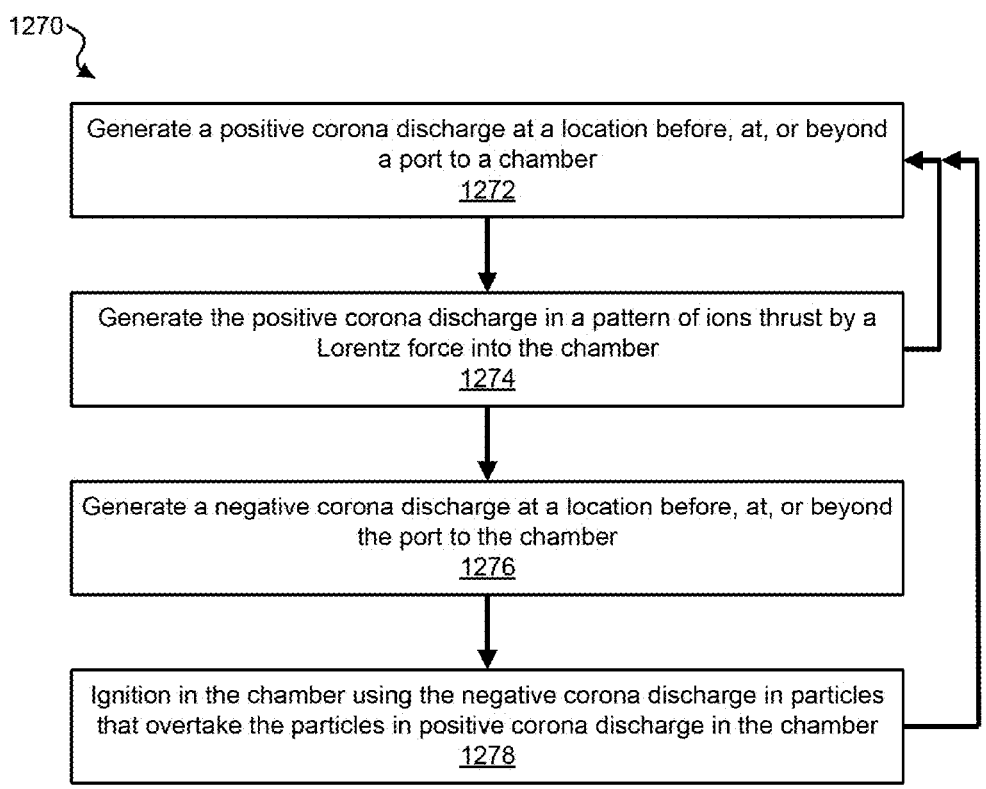
FIG. 12B shows a block diagram of a process to inject and ignite fluidic particles using Lorentz force and positive and negative corona discharges.

FIG. 12B shows a block diagram of a method 1270 to inject and ignite fluidic particles using Lorentz force and positive and/or negative corona discharges. The method 1270 includes a process 1272 to generate a positive corona discharge at a predetermined location before or at a port of a chamber (e.g., combustion chamber), or beyond the port and into the chamber, e.g., where a fluidic substance may be present in the chamber. For example, the fluidic substance can include a fuel and/or oxidant. For example, the process 1272 to generate the positive corona discharge at the predetermined location can include applying an electric field at a corona-generating electrode configured as part of a device to inject and/or ignite fluidic substances, in which the exemplary corona-generating electrode is positioned proximate to the port of the chamber. In some implementations, for example, the corona-generating electrode can comprise a high work function material. Additionally or alternatively, in some implementations, for example, the corona-generating electrode can include a plurality of electrodes having at least two different structural configurations, in which one exemplary electrode configuration includes a blunt end that provides a low aspect ratio more favorable of producing a positive corona and another exemplary electrode configuration includes a circular, curvilinear, or pointed end that provides a high aspect ratio more favorable of producing a negative corona. For example, the generated positive corona discharge burst may be characterized by a closer, smaller, and slower-emanating field.

The method 1270 includes a process 1274 to generate the positive corona discharge in a pattern of ions thrust by a Lorentz force into the chamber. For example, the process 1274 can include initiation and/or acceleration of the positive corona generation in a pattern of ions thrust by Lorentz force on a current of ionized particles (e.g., of a fluidic substance, such as the fuel and/or the oxidant) in a region of the exemplary device before or at the port by applying an electric field between the Lorentz-producing electrodes to ionize at least some of the fluidic substance; and the process 1274 can include producing the Lorentz force to accelerate the ionized particles into the chamber by applying and/or supplementing a magnetic field to interact with the generated current of the ionized particles. For example, the magnetic field can be applied by an electromagnet and/or a permanent located at a position proximate the chamber (e.g., such as in a specialized ion thrust region of the exemplary device), or in some examples, the magnetic field can be applied by a permanent magnet material included as part of at least one of the Lorentz-producing electrodes to supplement or self-generate the Lorentz force to accelerate the projection of the ion pattern for positive corona discharge burst toward and/or in the chamber.

The method 1270 includes a process 1276 to generate a negative corona discharge at a predetermined location before or at the port or beyond the port and into the chamber. For example, the process 1276 to generate the negative corona discharge at the predetermined location can include applying another electric field at the corona-generating electrode subsequent to the applied electric field at this corona-generating electrode to generate the positive corona, or, for example, by applying the other electric field at a second corona-generating electrode also positioned proximate to the port of the chamber. In such implementations including the second corona-generating electrode, for example, the second corona-generating electrode can comprise a high work function material. Additionally or alternatively, in such implementations including the second corona-generating electrode, for example, the second corona-generating electrode can be configured as a circular, curvilinear, or pointed end that provides a high aspect ratio more favorable of producing the negative corona. For example, the generated negative corona discharge burst is characterized by a wider, larger, and faster-emanating field.

Implementation of the method 1270 can cause ignition in the chamber when the negative corona discharge overtakes and/or combines with the positive corona discharge in a process 1278. Because the location of the positive and the negative corona discharges can be controlled by the method 1270, the location and timing of initiation and/or acceleration of the ignition is thereby controlled. Implementations of the method 1270 can be performed such that the generation of the positive and/or negative corona discharges occurs where the electric field is applied (e.g., at DC pulse duration or an AC frequency) that does not locally produce an ion current or spark on the exemplary electrode.

In another aspect, a system for accelerating particles into a chamber includes a container to contain a fluidic substance; a chamber including a port; and an injection and ignition device fluidically coupled to the container and interfaced to the port of the chamber, in which the fuel injection and ignition device structured to include: a flow channel to provide a fluid path for the fluidic substance to enter the chamber via the port, electrodes configured at one end of the injection and ignition device proximate the chamber, in which the electrodes include a zone of low work function material, and a control unit to monitor the device (e.g., including flow of the fluidic substance in the device, electrode conditions, and/or chamber conditions), and to control the application of an electrical signal to the electrodes. In the system, the injector and ignition device is operable to provide the fluidic substance between the electrodes, and generate a current of ionized particles by applying an electric field between the electrodes to ionize at least some of the fluidic substance based on a control signal from the control unit, and the injector and ignition device produces a Lorentz force to accelerate the ionized particles into the chamber.

Implementations of the system can include one or more of the following exemplary features. In some implementations, for example, the electrode can include a coating formed of the low work function material coated over an underlying material such as a semiconductor or electrically conductive material. For example, the underlying electrically conducive material can include, but is not limited to, various ceramics, cermets, intermetallics, carbon, silicon, tungsten, gold, platinum, and/or tantalum. For example, the low work function material coating can include, but is not limited to, an intermetallic material or other material including compounds, e.g., including calcium, aluminum, barium, thorium, and/or zirconium (e.g., titanium or zirconium carbide). In some examples, the low work function material coating can include zirconium carbide (ZrC), $LaB_6$, BaW, and/or $Ca_{12}Al_7O_n$.

In some implementations of the system, for example, the electrodes can include a permanent magnetic material. For example, the permanent magnetic material can include rare earth magnetic materials that provide high magnetic strength with reduced work functions, e.g., such as $Nd_2Fe_{14}B$, GdCo, SmGdCo, and/or $Sm_2Co_{17}$. In such implementations, for example, the underlying electrically conductive material can include the permanent magnetic material. Also, for example, in implementations where the electrodes include the permanent magnetic material, the Lorentz force can be produced at least in part as a force based on a magnetic field generated from the magnetic material that interacts with the generated current of the ionized particles. For example, this force can include a self-induced Lorentz force that thrusts or sweeps the ionized particles into the chamber, as well as indirectly thrust non-ionized particles, e.g., such as by secondary effects of the ionized particles colliding and thereby thrusting non-ionized particles into the chamber.

In some implementations of the system, for example, the injector and ignition device can further include a fuel control valve to regulate the flow of the fluidic substance through the fluid path.

In some implementations of the system, for example, the electrodes can include a first electrode and a second electrode configured in a coaxial configuration at a terminal end of a device interfaced with the chamber at the port. For example, in one exemplary embodiment of the device, which can include a multi-functional injector and ignition device, the first electrode is configured along the interior of an annular space between the second electrode and the first electrode includes one or more points protruding into the annular space.

Figure 13A:
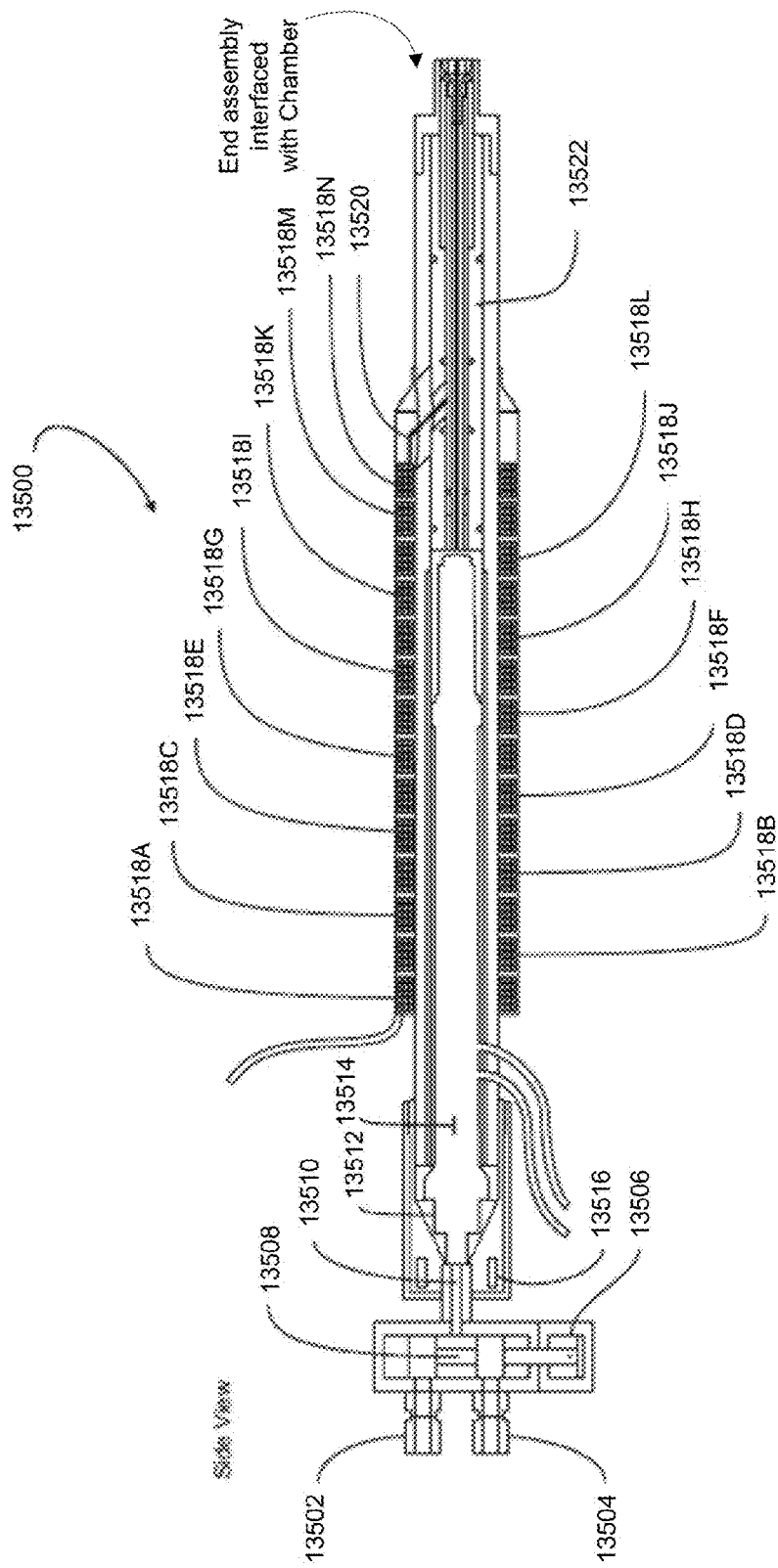
FIG. 13A shows a cross-sectional side view of an exemplary injection and/or ignition device including the disclosed electrode configurations to produce a Lorentz force and/or a corona discharge.
Figure 13D:
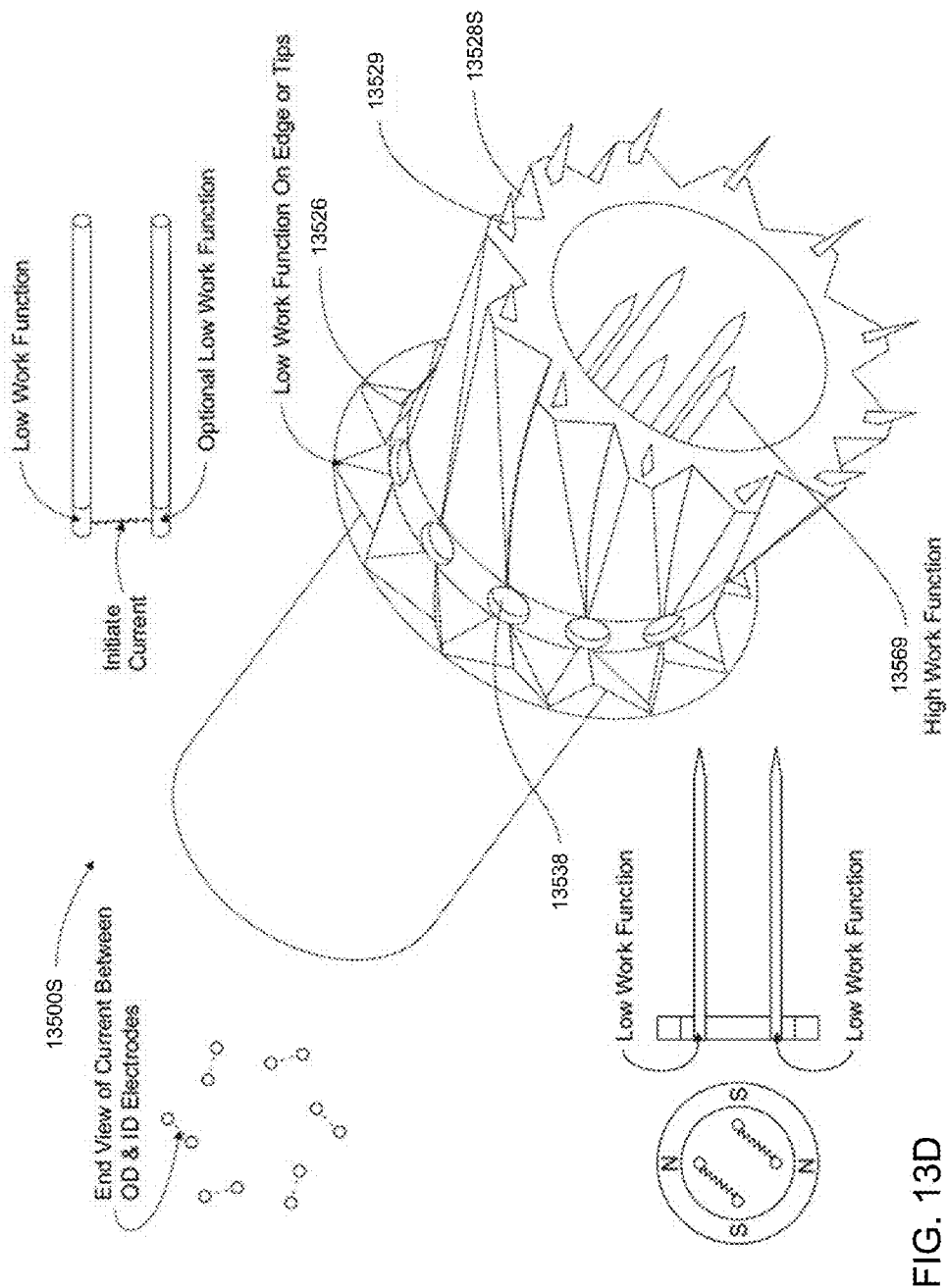
FIG. 13D shows a perspective view of an exemplary electrode of the exemplary assembly shown in FIGS. 13B and 13C.

Referring to the drawings of FIGS. 13A-13D, FIG. 13A shows a cross-sectional side view of an exemplary injection and/or ignition device including the disclosed electrode configurations to produce a Lorentz force and/or a corona discharge. FIG. 13B shows an enlarged and partial cross-sectional perspective view of an exemplary end assembly shown in FIG. 13A that interfaces with a chamber. FIG. 13C shows a partial cross-sectional side view of the exemplary assembly shown in FIG. 13B. FIG. 13D shows a perspective view of an exemplary electrode of the exemplary assembly shown in FIGS. 13B and 13C.

FIG. 13A shows an exemplary injection and/or ignition device 13500 capable to delivery, and in some implementations, ignite a fluidic substance, e.g., such as a fuel and/or oxidants, into a chamber (e.g., such as a combustion chamber) using a Lorentz force to thrust ionized particles and/or corona discharge to initiate ignition and/or acceleration of combustion of the ionized particles and/or fuel particles. The production of an adaptively-adjustable voltage (e.g., pulse period, frequency, and/or voltage magnitude) for such operations can be provided by circuit including a coil assembly 13518A-13518N, and a conductor 13520 that can be used to deliver the resultant high voltage to one or more capacitors of respective circuits for such Lorentz and/or corona ignition events. For example, with further reference to FIGS. 13B to 13D, a corona ignition can be accomplished by a suitable circuit that includes capacitor 13522 within a conductive or non-conductive case 13532-13534 very near a corona field shaping electrode 13528 and/or antenna structures 13529 of the corona field shaping electrode 13528 at the interface to a chamber 13548 (e.g., a combustion chamber of an engine). Exemplary materials for the exemplary embodiments of the conductive case 13532, 13534 can include, but are not limited to, steel, stainless steel, aluminum and copper alloys. Exemplary materials for the exemplary embodiments of the non-conductive case 13532, 13534 can include, but are not limited to, high strength glass, glass-ceramics, and ceramic compositions along with various composite assemblies.

The exemplary antenna of the antenna electrode assembly 13529 may be configured to be of any suitable shape and/or presented at angles depending upon the combustion chamber geometry and/or based on a predetermined pattern that ionized particles are presented in the chamber 13548. In some implementations, the antenna electrode assembly 13529 can be adaptively adjusted by to affect the produced corona discharge by, for example, fuel pressure, magnetic force, or other mechanical linkages depending upon fuel pressure and temperature, combustion chamber swirl, piston speed, etc. The exemplary antenna electrode assembly 13529 may be protected by suitable coatings or layers to maximize corona ignition efficiency and antenna performance life. Examples of such coatings or layers of the antenna electrode assembly 13529 can include ceramic coatings to protect the underlying electrode, and high work function material coatings to affect the production of the corona discharge.

Occasional or cyclic production of corona ignition may be used independently and/or in conjunction with ions or ion patterns previously produced in oxidant and/or fuel particles for purposes such as improving ignition or oxidant utilization efficiencies along with reduction or elimination of undesirable exhaust emissions. For example, Lorentz and/or corona event pathways or patterns include types that are produced by laser or radiofrequency or microwave impetus and radiative ignition such as frequencies including, but not limited to infrared ultraviolet, visible, and 3 kilohertz to 300 gigahertz.

Lorentz thrust and/or corona stimulated ion patterns may be controlled by DC and/or AC bias that is established by the electrodes of the injection and/or ignition device. In some examples, the Lorentz force and/or the corona discharge can be produced in the predetermined pattern and controlled based on antenna electrode structures incorporated in a head gasket and/or piston assembly of an exemplary host engine. This provides adaptive adjustments of such patterns to optimize oxidant-utilization efficiency in response to variations such as piston speed, oxidant swirl, and dynamic compression.

As shown in FIGS. 13A-13D, fuel and/or other fluidic substances can be received into the device 13500 from ports 13502 and/or 13504, which is conveyed through valve assembly based on implementation of an actuator (not shown) to control delivery of the fluidic substance through passage ways 13510 to 13512 and connecting internal passageways around a suitable actuator, e.g., such as a solenoid or piezoelectric actuator assembly 13514, to fuel control valve 13524 which closes on the corresponding seat within electrode 13526, 13528 to meter fuel and/or other fluid flow bursts through ports 13538 into the chamber 13548.

As shown by the exemplary electrode configuration 13500S of FIG. 13D, ports 13538 can provide (e.g., deliver and/or distribute) the fluidic substance (e.g., the fuel, oxidant, etc.) at any particular, desired angle, e.g., including angles that contribute angular velocity to swirl the fluidic substance, and which may be combined with straight, progressively curved, or helical passageway. For example, as shown in FIG. 13D, electrode regions 13528S are configured to provide an exemplary passageway between electrode peaks of the electrode 13528. Further acceleration of the fluidic substance passing along the electrode 13528 from tips 13526 along features of region 13528S into the chamber can be provided by Lorentz thrust forces that are developed by application of pulsed voltage applications (e.g., including adaptively-adjusted voltages beginning higher and lowering pulse-to-pulse) to initiate small currents between the tips 13526 and coaxial electrode surfaces 13540 (shown in FIG. 13C), which allow applications of relatively lower continuing voltage to adaptively control much larger currents and resulting subsonic or supersonic launch velocities into the chamber 13548.

In some embodiments, antenna electrode tips 13526 are configured to be considerably sharper (e.g., to have a higher aspect ratio), in which many more electrode tips 13526 may be placed in each of one or more concentric rings to produce sufficiently strong DC or AC fields including high frequency operations to cause the fluidic substance (e.g., fuel, such as hydrogen) flowing in the region to produce a sufficient population of ions to cause ignition of injected ionized fluidic substance particles (e.g., ionized fuel particles, such as ionized hydrogen population) upon reaching oxidant in the chamber 13548 (e.g., combustion chamber) at a velocity that initially or subsequently exceeds the sonic velocity of the oxidant. In some applications, for example, this may be provided in conjunction with flowing heated hydrogen and/or ion producing additives to the hydrogen such as helium, argon, neon, dimethylether (DME), diethylether (DEE), and various active metal ion donor substances including organic and inorganic compounds.

In certain other embodiments, the electrode tips 13526 can be configured to be considerably-rounded, e.g., as compared to the exemplary sharp-tipped antenna electrode assembly 13529 depicted in FIG. 13D, which can provide assured corona discharges into the ionized particle pattern that is accelerated (e.g., launched or thrusted) by the Lorentz force into the chamber 13548. In addition to assuring efficient utilization of corona energy in the injected ionized particle patterns, the substantially rounded electrode tips 13526 can provide much longer life by dissipating heat and reducing or eliminating oxidation damage and discharge erosion. Similarly to the exemplary considerably-rounded structure, the electrode tips 13526 can be configured as a continuous ring structure around the peripheral of the electrode configuration end assembly 13500S.

Also, for example, further adjustments of the included angle and penetration patterns of fluidic substance (e.g., fuel and/or oxidant) that are directly injected can be provided by adjustment(s) of the pressure at which that fluidic substance is supplied from ports 13502 or 13504 to valve 13524, the geometrical design of the electrodes 13528 and/or 13540 (shown in FIG. 13C), and/or operation of permanent or electromagnets, e.g., such as magnets 13542A, 13542B, and 13542C (shown in FIG. 13B). For example, the magnetic fields produced by such magnets can cancel, reverse, or supplement and increase the angular velocity to swirl ion currents and swept particles that may be initially imparted with angular velocity by the angles of ports 13538. In some embodiments, for example, magnetic forces are varied by controller 13516 to change the patterns that injected fluids produce as they penetrate into combustion chamber 13548. In other embodiments, for example, the electrodes can provide fluid flow passageways that induce swirl that supplement or encounter combustion chamber swirl to accelerate the rates that oxygen and/or other oxidants encounter fuel particles. The magnetic field provided by the exemplary magnets 13542A, 13542B, and/or 13542C can be adaptively adjusted to add or subtract from such swirl patterns and presentations.

Suitable magnet wires and circuits for the exemplary embodiments having high temperature electromagnets 13542A, 13542B, and/or 13542C include copper, nickel, and high conductivity forms of carbon wire including nano-wire assemblies. Suitable sensors such as pressure sensitive sensors (e.g., piezoelectric), thermoresistive, thermovoltaic, photovoltaic, or other sensors or detection units, including an exemplary fiber optics 13530 (e.g., such as Fabry Perot sensors) may be comprised of or protected by sapphire or quartz material. Such exemplary sensor instrumentation and/or sensory fiber optics detect and relay combustion chamber events including camera monitoring of combustion chamber fluid injection patterns, combustion patterns along with peak temperature and pressure measurements to a controller 13516 (depicted in FIG. 13A) for adaptive adjustments to optimize fuel efficiency, performance, and minimization of objectionable exhaust emissions.

In some embodiments, the exemplary optic fiber sensors 13530 can include photovoltaic detectors that monitor emissions at selected frequencies such as corresponding to temperatures approaching and/or surpassing about 2200° C. (4000° F.) to enable adaptive fuel metering adjustments to avoid production of oxides of nitrogen or to promote production of oxides of nitrogen at crank angles such as between about TDC and 30° after TDC to produce activated oxidants to accelerate combustion. Engine operation with stratified heat production at temperatures exceeding 2200° C. (4000° F.) improves thermal efficiency and produces highly activated stratified oxidants such as ozone, and oxides of nitrogen along with hydroxyl radicals and ions i.e. O, N, $OH^-$ etc., that are subsequently eliminated by oxidation of subsequent injections of fuel that are metered to produce peak combustion temperatures below 2200° C. (4000° F.).

In some implementations of the injection and ignition device 13500, hydrogen is used as a fuel to be injected and ignited in the exemplary combustion chamber 13548. Plasma or spark ignition of hydrogen in air requires only about 0.02 mJ at atmospheric pressure which is about 10% of the energy needed for hydrocarbons such as methane, propane, gasoline and air mixtures. A virtually invisible spark represents this relatively small ignition energy value. Thus, by launching an efficiently generated substantial quantity of hydrogen ions into high velocity penetration patterns that quickly convert the oxygen available in the compressed air to high temperature steam the following is accomplished. For example, the kinetic and/or electrical energy requirement for hydrogen ignition can be far less than the magnitude required for hydrocarbon ignition to greatly reduce spark erosion of ignition electrodes and extend service life. Also, for example, accelerated ignition and completion of combustion of high-speed hydrogen injection is accomplished as hydrogen impinges available oxygen. In some implementations of the device 13500, the high speed hydrogen can be injected at elevated temperature and/or oxidant can be accelerated using Lorentz thrust at elevated temperature. Such elevation in temperature can provide higher speed of sound for either or both gases and higher shock and/or higher chemical activation and thus higher reaction rates. In such implementations, for example, accelerated ignition and completion of combustion of other fuels such as CO, $CH_4$, $NH_3$, $CH_4N_2O$, $C_xH_y$, $CH_3OH$, and various other compounds by kinetic energy, heat, radiative, and shock wave energy transfers from hydrogen penetration and combustion can be accomplished.

Figure 14A:
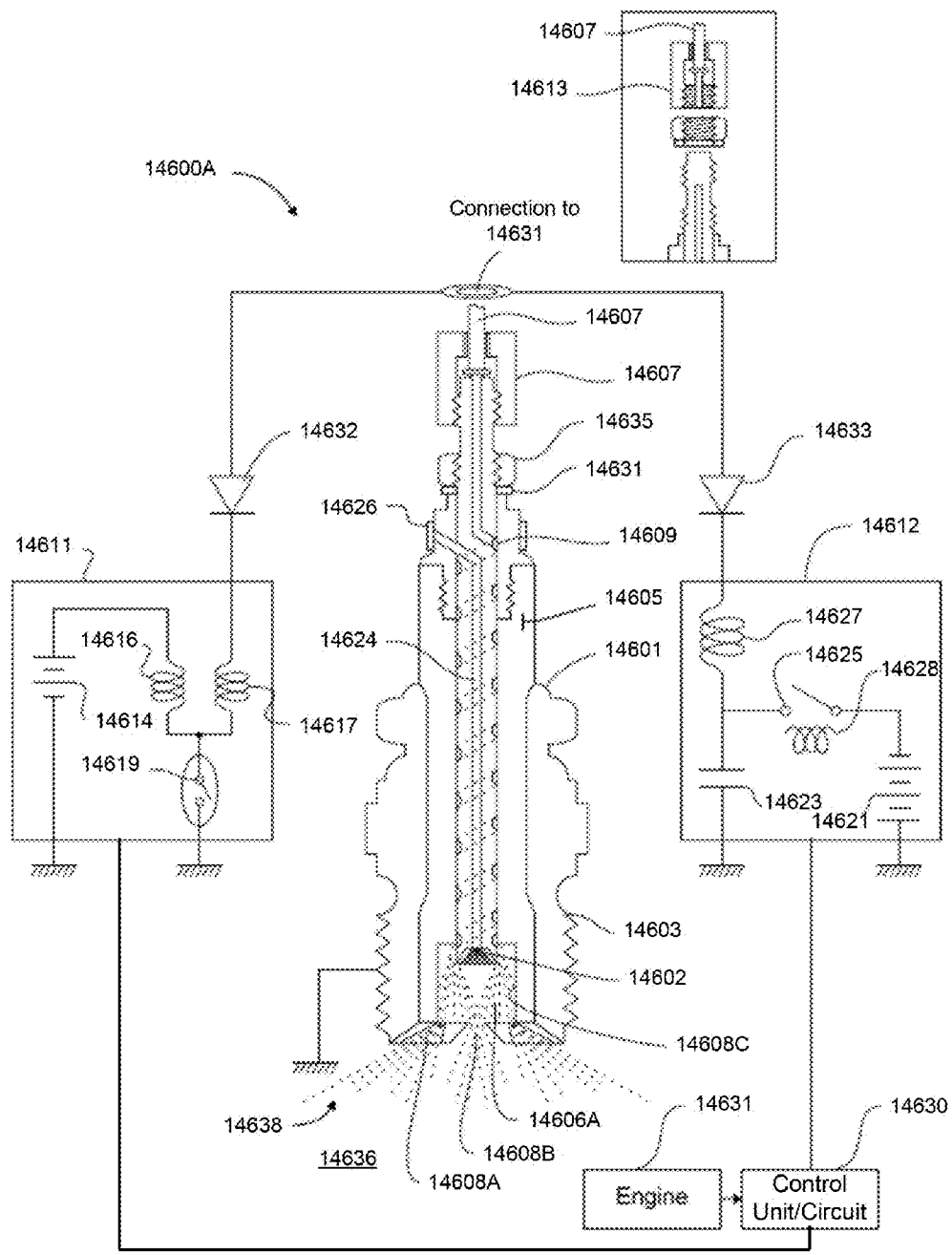
FIG. 14A shows a cross-sectional side view of an exemplary injection and/or ignition device including the disclosed electrode configurations to produce a Lorentz force and/or a corona discharge.
Figure 14B:
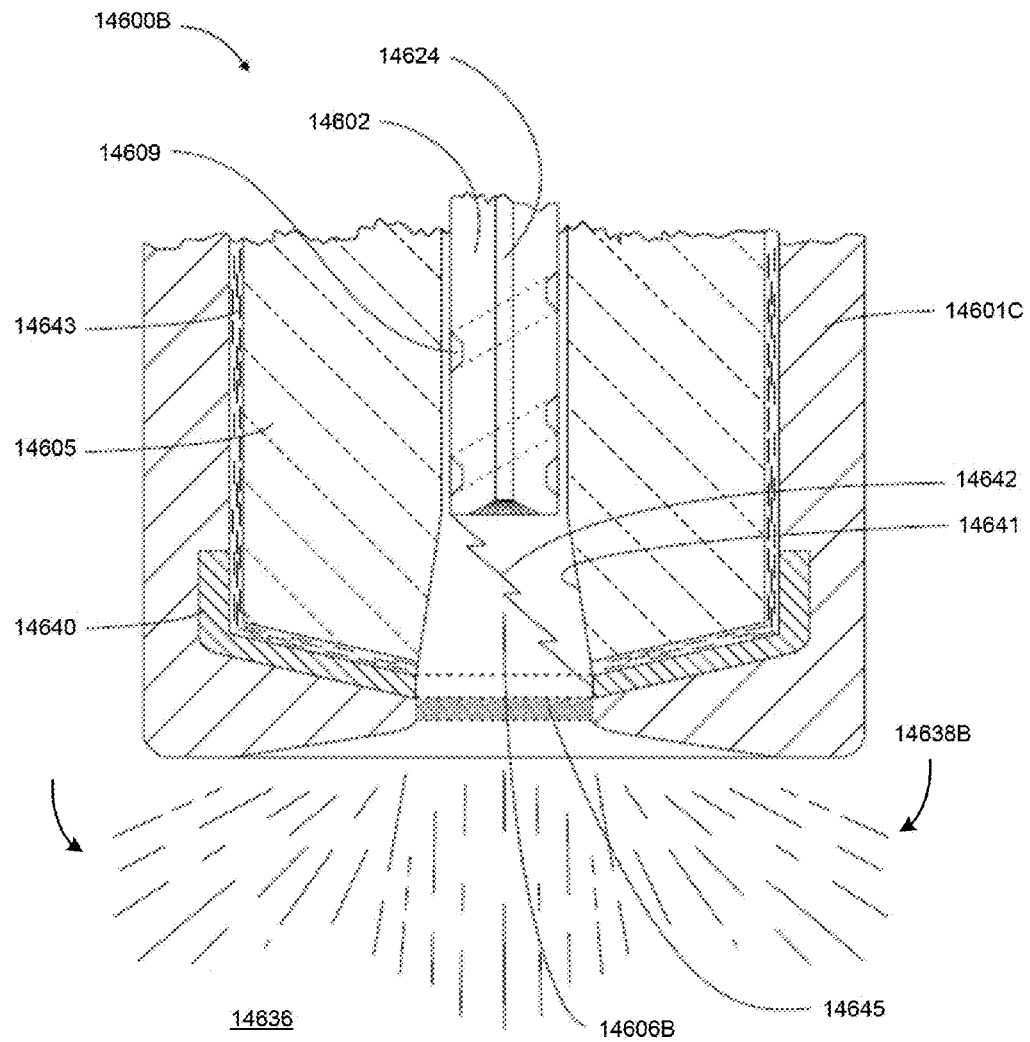
FIG. 14B shows a partial cross-sectional view of an exemplary embodiment of an end assembly of an exemplary injection and/or ignition device.
Figure 14C:
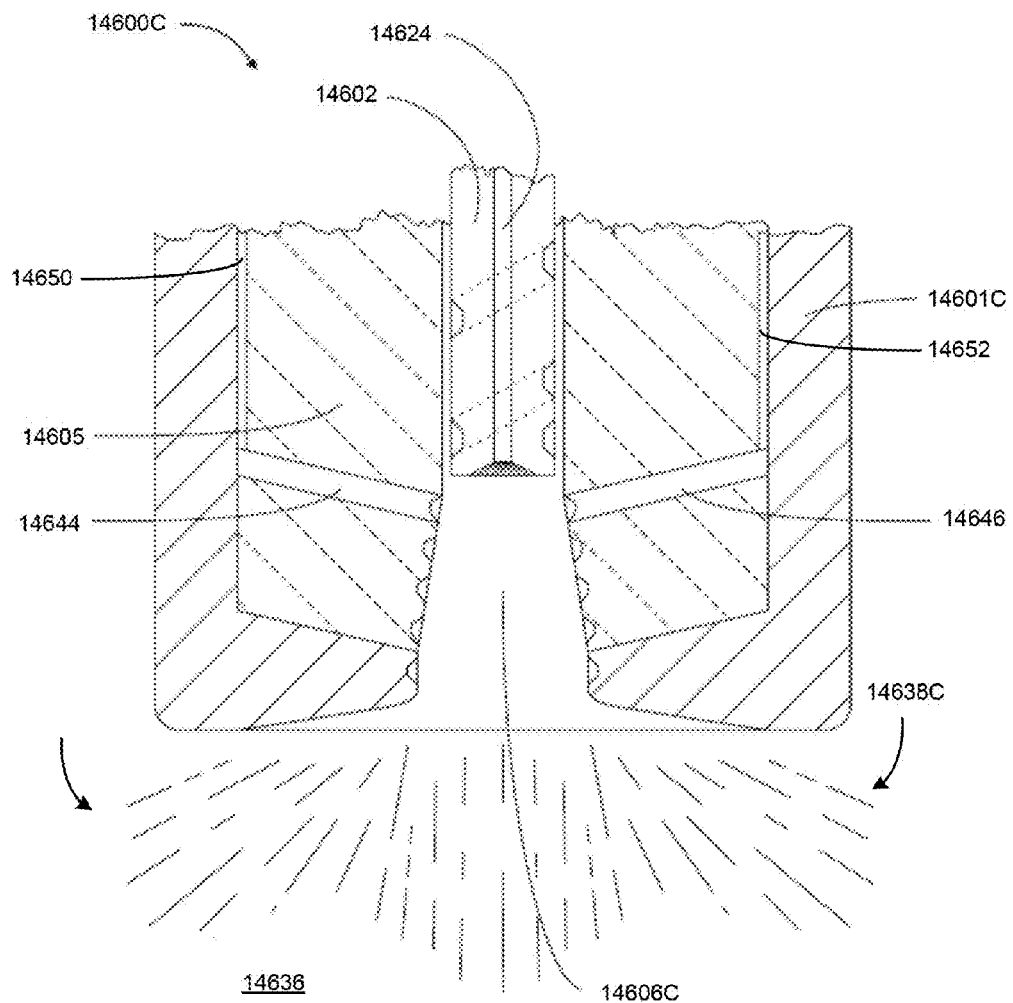
FIG. 14C shows a partial cross-sectional view of an exemplary embodiment of an end assembly of an exemplary injection and/or ignition device.
Figure 14D:
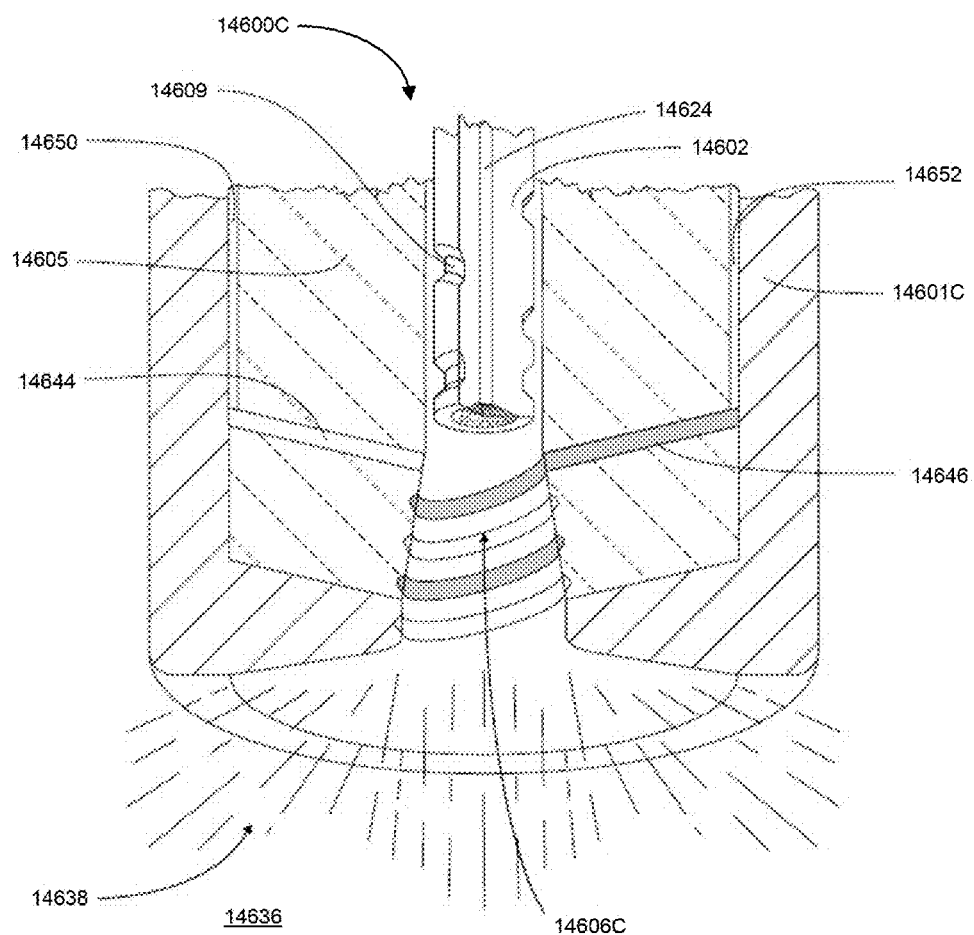
FIG. 14D shows a partial three dimensional cross-sectional view of an exemplary embodiment of the end assembly.

Referring to the drawings of FIGS. 14A-14M, FIGS. 14A-14D show diagrams of various embodiments of an exemplary multi-functional injection and ignition devices 14600 capable of producing Lorentz force and corona discharge for implementing fuel ignition and cleaning applications in a chamber. FIG. 14A shows a cross-sectional side view of an exemplary injection and/or ignition device 14600A including the disclosed electrode configurations to produce a Lorentz force and/or a corona discharge, which utilize an exemplary launch chamber portion 14606A. FIG. 14B shows a partial cross-sectional view of an exemplary embodiment of an end assembly 14600B of an exemplary injection and/or ignition device 14600. FIG. 14C shows a partial cross-sectional view of an exemplary embodiment of an end assembly 14600C of an exemplary injection and/or ignition device 14600. FIG. 14D shows a partial three dimensional cross-sectional view of an exemplary embodiment of the end assembly 14600C.

FIG. 14A shows a cross sectional view of an exemplary embodiment of the multi-functional injection and ignition device 14600, including control circuits 14611 and 14612 communicatively coupled to the injector and igniter apparatus 14600A. The device 14600 can include and utilize an ion launch chamber portion 14606, shown in several exemplary embodiments 14606A, 14606B, etc. in FIGS. 14A-14D, for receiving compressed oxidant (e.g., such as air) during the intake and/or compression stroke and subsequently injecting and igniting a fluid fuel. Exemplary fuel selections can include hydrocarbons, ammonia, ammonia and fuel alcohol blends (e.g., including dissolved urea, formic acid, etc.), which can be obtained from storage in a conventional fuel tank or from pressure rated tank. For example, in some implementations, hydrogen can be utilized in the device 14600, e.g., obtained from a conventional cryogenic or pressurized gas storage tank and/or hydrogen that may be produced and/or pressurized.

Fuel selections, e.g., including types that are difficult to ignite by conventional compression or spark ignition, are also ignited by providing activated oxidant that is produced and presented in the exemplary ion launch chamber 14606 of the device 14600 to assure ignition and/or to accelerate the combustion process. Examples of the ion launch chambers 14606 can include vented types 14606A and relatively open types 14606B, which are provided with suitable ion generating circuits such as 14611 and 14612 to produce ionizing electrical fields and/or various magnitudes of plasma in oxidant such as air or other oxidants that enter such ion launch chambers during intake and/or compression strokes of cyclic operation. Illustratively, such activation of air with typical moisture content produces radicals and ions that may include $O_3$, $O^-$, $OH^-$, $N_2O$, $NO$, $NO_2$, etc., that are substantially retained in the ion launch chamber to remove debris and/or to improve the rate of ignition and/or to accelerate combustion of fuel that is subsequently introduced by injection through one or more suitably shaped orifices of electrode 14602 and/or by compression into the ion launch chamber from previously delivered fuel into the combustion chamber 14636. Concentration of oxygen and/or activated oxidant in an ion launch chamber produces local pressurization and improves the initial ignition and subsequent projection of ionized oxidant, fuel, and/or combustion product patterns to accelerate ignition and/or combustion events in the combustion chamber that is served.

Production of the ions can occur in chambers 14606 by generating a current using the exemplary electrode configurations of the device 14600 (e.g., such as electrode configurations 14602, 14601, and/or 14640), e.g., including direct current (DC), pulsed DC, alternating current (AC) of low, medium, or high frequency electric field generation at voltage magnitudes ranging from a few hundred volts (V) to more than one hundred kilovolts (KV). For example, the polarity of electrode 14602 may be constant or reversed as may be the polarity of electrode 14601 and/or 14640. Ion currents that are produced may be a few amps to hundreds or thousands of amps during periods of time that range from nanoseconds to seconds.

The exemplary injection and/or ignition devices 14600A, 14600B, 14600C, and 14600D shown in FIGS. 14A-14D can be implemented in systems for operation of engines with homogeneous or stratified combustion using throttled or unthrottled intake of oxidant such as air. In such embodiments, for example, an electrically conductive case 14601 (e.g., such as a steel alloy) can provide suitable attachment and provisions for forming a seal with a chamber 14636, e.g., such as a combustion chamber. In some examples, the seal can be formed by threaded engagement 14603, and/or by a compression clamp, to withstand combustion chamber pressure. The size, shape, mounting and sealing configuration of the exemplary case 14601 can be provided as a substitute for the spark plug of a low compression engine or as the diesel fuel injector of a diesel engine, for example. The device 14600 can include a ceramic insulator body 14605 that provides electrical insulation, and in some embodiments containment of pressurized fuel, which is conveyed from a supply 14607 through one or more helical or threaded passageways 14609 to an injection spray/electrode interface 14602 of the exemplary device 14600.

In some embodiments, for example, the inside diameter of ceramic body 14605 is metalized or otherwise activated for braze assembly with the inlet and electrode fitting 14602 to provide a permanent assembly. For example, suitable metallization and braze materials can include silver alloys or electroless plating preparations of nickel and copper on the electrode fitting 14602 for assembly with the ceramic body 14605, as shown in FIG. 14A. The ceramic body 14605 also electrically insulates the ion launch chamber 14606 and provides a spark gap from suitable features of the electrode 14602 to features of electrode 14608A, 14608B, and/or 14608C, as shown in FIG. 14A.

In some embodiments, the exemplary electrodes 14608A, 14608B, and/or 14608C are configured in selected configurations and patterns within the ion initiation or launch chamber 14606 and insulated by the lower portion of the exemplary ceramic body 14605 such that it is provided with catalysts. For example, the electrodes 14608A and/or 14608B may include porous structures such as compacted wires (e.g., wool-like forms of silicon carbide, molybdenum disilicide, and/or platinum metal group filaments), powder metallurgy forms, and/or one or more layers of wire screens of selected weave designs to present one or more catalysts. For example, additional selections of suitable catalysts and/or catalyst supports can include, but are not limited to, di-aluminum tri-oxide, silicon di-oxide, various refractory and transition metals such as tungsten, molybdenum, tantalum, zirconium, titanium, tungsten carbide, molybdenum carbide, tantalum carbide, zirconium carbide, titanium carbide, and/or nitrides and/or oxy-nitrides of such metals. Such exemplary catalysts or catalysts on support holders may be presented before, within, or after pattern forming features, e.g., such as windows or orifices of the electrodes 14608A and/or 14608B or by the shape of the opening into the chamber 14636 (e.g., combustion chamber) by the ion launch chamber 14606B regarding catalyst 14645.

Such pattern forming features can provide for launching striated streams of oxidant ions and subsequent launches of striated fuel ions along with swept fuel to produce high surface to volume mixtures of fuel and oxidant ions to achieve rapid completion of combustion. Further acceleration of combustion may be provided by corona generated in or near such striated and/or stratified ion patterns by electric field production from antenna electrodes such as 14602, 14644, 14646, 15762, 15764, 15780, 15772, 15782, 16262, 16266, 16282, 16283, or 16285. Such accelerated initiation and/or completion of combustion enables adaptively timed production of stratified heat to further improve air utilization efficiency, fuel economy and engine performance. One multifunction power supply circuit can provide events selected from adaptively timed Lorentz ion launches of expanding patterns of oxidant ions and/or fuel ions followed by generation of positive and/or negative corona discharges in such patterns of ion penetration into the combustion chamber. Alternatively two or more separate power supply circuits such as generally depicted in simplified FIG. 14A i.e. 14611 and 14612 which may be used for such Lorentz ion launching and corona generation events. For example, one power supply produces Lorentz ion launches and another power supply provides positive corona and another power supply produces negative corona in the ion launch patterns expanding into the combustion chamber.

The exemplary catalysts can more rapidly produce ions by promoting reactions between oxidants (e.g., such as air or oxygen), and feedstocks such as ($C_xH_y$), fuel alcohols and various compounds containing nitrogen in conjunction with ionization initiation by electrical impetus including sparks and corona. In an illustrative operation, for example, a piston engine may be operated with pressurized feedstock injection and ignition timing before, at, or after TDC by combining electrical ionization initiation and catalytic reaction ionization impetus and/or operation with reduced pressurization of the feedstock for lower velocity injection and ignition earlier before TDC without electrical ionization initiation. In many combustion chamber designs, greater fuel efficiency and engine performance can be achieved using the exemplary device 14600 with injection and ignition at or after TDC as may be achieved with greater electrically induced ionization or with combined catalytic and electrically induced ionization at lower electrical power or by providing greater catalytic surface areas, e.g., such as filling considerably more of the space within the ion generation chamber such as 14606B with porous materials to present catalytic surface. Thus in such exemplary embodiments, engine satisfactory operation may be provided by loading oxidant such as air and/or supplemental oxygen and/or oxidant containing products of combustion into the chamber 14606A within the exemplary insulator body 14605, during exhaust, intake, and/or compression strokes and subsequently adding one or more feedstocks such as selected $C_xH_y$, alcohols, and/or nitrogen containing substances to produce ions by catalytic and/or electrical impetus that are directly launched into the chamber 14636 (e.g., combustion chamber) in suitable patterns by such ion generating chambers. Accordingly engine operation is assured even in case of electrical ignition system malfunction to provide fail-safe benefits.

FIG. 14C shows selected components in a quarter section view of the lower portion of another exemplary embodiment of the end assembly including the ion launch chamber 14606C, in which the case 14601 (shown as 14601C in FIG. 14C) is configured as an electrically insulating material, e.g., such as compositions containing silicon nitride ($Si_3N_4$), stabilized zirconia ($ZrO_2$), or alumina ($Al_2O_3$). The exemplary electrode fitting 14602 is housed in the insulator body 14605 along with two or more electrodes 14644 and 14646 that are supported and separated from electrode fitting 14602 and from each other, as shown in FIG. 14C. For example, suitable ceramic insulator materials for the body 14605 can include boron nitride, porcelain, alumina or glass-ceramic compositions with high dielectric strength. The exemplary case 14601C may be of suitable size and shape, e.g., ranging from 14 mm or 18 mm threaded spark plug shapes to larger embodiments for applications in larger combustion chamber ports to serve rail locomotives and heavy marine propulsion engines.

In implementations of the device 14600 including the end assembly 14600C, for example, controlled polarity and voltage can be applied by a suitable controller that may include the control circuits 14611 or 14612 to electrode 14644 through conductive strip connection 14650 and to electrode 14646 through conductive strip 14652 to produce selected ionization outcomes. In some exemplary ion production operations, an initial current can be produced between electrode 14602 and electrode 14644 and/or 14646 or between 14644 and 14646 according to management of the voltage gradients across such electrodes by a computer and/or control unit 14630 and control circuits, e.g., such as 14611 and/or 14612. Subsequently the voltage gradient between electrodes 14644 and 14646 is managed by a selected circuit to reduce, maintain, or increase the ion current between electrodes 14644 and 14646 as the ion current 14654 is thrust along the resulting helical path between helical electrodes by the Lorentz force that is produced. In the exemplary embodiment of the device shown in FIG. 14C, the angular velocity of the Lorentz thrust ion current may be adjusted to produce the desired included angle 14638C of the conical surface pattern of injected oxidant and/or fuel ions that enter the chamber 14636. FIG. 14D shows a three-dimensional view of the electrode pair 14644 and 14646 of the device 14600.

Figure 14E:
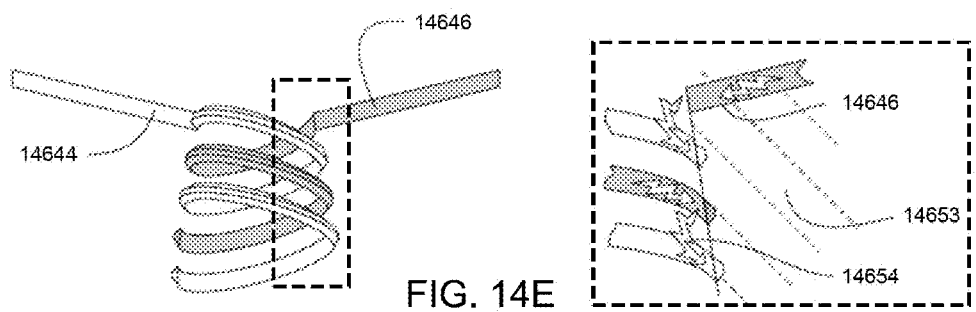

FIG. 14E shows a diagram (with inset diagram) of the exemplary helical electrode configuration capable of (optionally) starting an ion current 14654 between electrode 14602 and 14646. FIG. 14F shows an ion current 14654 between the electrode pair 14644 and 14646. FIG. 14G shows the ion current 14654 traveling as a result of a Lorentz thrust along a helical path between the exemplary helical electrode pair 14644 and 14646. FIGS. 14H-14M show the helical travel path of the ion current 14654 as it is thrust by the Lorentz force that is produced. For example, the current may be built as a result of the computer controlled applied voltage across electrode pair 14644-14646 to produce a launch current of several hundred peak amps. The constantly changing location of the ion current enables long electrode life because the heat generated is dissipated over a large area and because of cyclic cooling by fuel that passes over the electrodes.

For example, adaptive adjustment of fuel pressure delivered from the passageways 14609 along with the angular velocity of the swirling Lorentz thrust ion current can provide further expansion or contraction of the pattern of injected ions to accommodate each application situation, e.g., such as, but not limited to, the fuel selection, operating temperature, combustion chamber design, condition of engine seals, utilization of supercharging, and piston speed. Illustratively, during operation at engine idle conditions, the included angle may range from about 10° to 20° for the minimum fuel delivery rate. During lightly loaded and cruise operations the rate of fuel and/or oxidant ion pattern penetration is increased along with the included angle that may range from about 20° to 90°. For peak torque or full power operation at an increased fuel and/or oxidant ion pattern penetration rate the included angle may range from about 90° to 160°. This can provide improved air-utilization efficiency in which the air supplies oxidant for ignition and combustion within surrounding excess air that performs supplemental work within surrounding air that insulates the combustion chamber surfaces against heat losses to the engine coolant.

As shown in FIGS. 14C and 14D, in the exemplary instances that oxidant (e.g., such as oxygen) enters the ion launch chamber 14606C from passageway 14609 and/or from combustion chamber 14636 before fuel enters the ion launch chamber 14606C, activated oxidant is produced with radicals and/or ions that may include, e.g., $O_3$, $O^-$, $OH^-$, $N_2O$, $NO$, $NO_2$, etc., to oxidize, effectively scrub and clean the surfaces of chamber 14606C. Subsequent delivery of fuel from passageway 14609 and/or the chamber 14636 (e.g., combustion chamber) rapidly participates in production of additional ions including contributions by partial oxidation with the activated oxidant radicals and ions. Additional ions may continue to be contributed by electrical ionization, particularly of fuel delivered through passageway 14609 as sufficiently high voltage is applied between the electrodes 14602 and 14644 and/or 14646 or between 14644 and 14646 including operations that produce considerably larger currents as the ion current is thrust along the helical path by the Lorentz force that is produced on the current between electrodes 14644 and 14646.

In some implementations of the device 14600, for example, fuel emitting from the passageway between the electrode 14602 and the insulator 14605 may be varied from subsonic to supersonic velocity by control of the fuel delivery pressure and/or by the subsequent Lorentz force acceleration that is produced by control of the applied electric field strength on the ion current. This provides control of the pattern and penetration rate that ions are thrust into the exemplary combustion chamber 14636.

The selected fuel can be conveyed through fuel injector and ion generator or igniter 14601 by passage through one or more passageways such as helical channel 14609 around the outside diameter of fitting and electrode 14602 to cool and regulate the temperature of the exemplary ceramic insulator body 14605 and thus overcome tendencies to overheat and damage components of conventional prechamber combustion systems. This feature includes selection between cool fluids (e.g. fuels and/or cooling fluids) and heated fluid fuels which is enabled by operation of individual flow control valves or a suitable selector valve to regulate the temperature of an exemplary fiber optic cable assembly 14624, an exemplary microprocessor 14626, the exemplary insulator ceramic 14605, and/or other components of the exemplary ion launch chamber 14606.

The exemplary embodiments of the end assembly 14600A, 14600B, 14600C of the device 14600 can provide adaptive improvement of the life and performance of the ion generation, ignition and/or plasma thrusting system for launching the activated reactants and/or combusting contents from the ion launch chamber 14606 into the main chamber 14636, e.g., combustion chamber. Adaptive selection of spark with a few amps of current during a short time or continuing plasma with ignition by current of hundreds or thousands of peak amps are provided to meet a wide variation of circumstances and needs. Illustratively, hydrogen and hydrogen-characterized fuel injection through the electrode 14602 can require a very low amount of ion or spark ignition energy, for example, as compared to much larger energy requirements for methane, fuels that are injected as mixed liquid and gaseous phases, and larger molecular weight hydrocarbons.

In some embodiments, for example, oxidant that enters chamber 14606 from suitable sources such as through pathway 14609 and/or from combustion chamber 14636 becomes ionized before fuel is introduced from suitable sources such as through the pathway 14609 and/or the chamber 14636 (e.g., combustion chamber). Thus activated oxidant cleans incipient deposits of varnish and other fouling agents including production of chemical radicals and ions and provides improved oxidation and ion generation in continuing reactions with fuel that may be introduced. Such fuel may be ionized by a DC or pulsed DC electric field of varying intensity to produce one or more Lorentz thrust patterns of ion current that are launched into combustion chamber 14636. In some implementations, for example, an initial ionization and/or heat and pressure produced by combustion including partial combustion and/or further Lorentz ionization in chamber 14606B provides ions, radicals and other products of combustion that are expanded into the desired penetration pattern into chamber 14636.

Referring to FIG. 14B, another exemplary embodiment of the disclosed electrode assembly configurations to produce Lorentz force and corona ignition, e.g., including in predetermined ion patterns and ignition operations, is described. As shown in FIG. 14B, the exemplary end assembly 14600B of the device 14600 is configured for providing a relatively open ion launch chamber, e.g., such as shown by the launch chamber 14606B. The lower portion of an exemplary ion launch chamber 14606B can be utilized for production of ions by any of the exemplary methods and sequences techniques described herein. In one embodiment, for example, compressed oxidant (e.g., such as air) is compressed into the ion launch chamber and fuel such as hydrogen or hydrogen-characterized selections is injected before, at, or after top dead center (TDC) and ignited by a relatively small ion current or spark or plasma current to produce a pattern of ions or ion current that is launched into combustion chamber 14636. In some embodiments, for example, much higher launch velocity and/or larger current plasma may be needed for fuels that are difficult to ignite including solids in suspension with fluids including gases and liquids and/or fuels that may be diluted with relatively inert substances. This is generally depicted for small and large currents by the ion production plasma across the exemplary ion launch zone 14606B. Ignition current can be developed between suitable features on the electrode 14602 and exemplary electrode features presented by suitably configured insert 14640, e.g., such as heat resisting and/or reduced or low work function material selections, e.g., such as, titanium carbide (TiC), molybdenum disilicide ($MoSi_2$), silicon carbide (SiC), tantalum carbide ($Ta_xC$), zirconium carbide (ZrC), graphite, amorphous or diamond like carbon (DLC) coatings on selected substrates. For example, amorphous carbon may be various mixtures of carbon bonds of $sp^3$, $sp^2$, or $sp^1$, with hydrogen. DLC mixtures can include diamond-like ($sp^3$) bonds and may be deposited at room temperature without catalyst or surface pretreatment and the resulting electrode properties can be tuned by variation of the $sp^3$ content, organization of $sp^2$ sites and hydrogen content, and/or by doping. Hydrogen content may be varied during use by hydrogen injection and/or by production of activated hydrogen during injection, ignition and combustion events. DLC coatings may host or be deposited on conductive wires such as carbon nanotube wires, nanostructures, particles of other electrode materials (e.g., such as ZrC) to provide heterogeneous electrode functions including reduced work functions, oxidation resistance and improved thermal stability.

As shown in FIG. 14B, electrode inserts such as 14640 may be configured to be of any suitable shape and may be utilized in ion generation in the exemplary ion launch chambers such as 14606A, 14606B, and/or 14606C. For example, the electrode inserts 14640 can be configured at any suitable location and of any suitable thickness, and may be recessed, flush, or protruded into the ion launch chamber and may present one or more blunt features (e.g., of low aspect ratios) or sharp features (e.g., of high aspect ratios), e.g., such as edges or peaks, which can be designed depending upon fuel selections, the combustion chamber design, compression ratio, and/or duty cycle. Electrode surfaces of the conduit 14602 may also present one or more of the exemplary blunt or sharp features, e.g., such as edges or peaks, depending fuel selections, the combustion chamber design, compression ratio, duty cycle, and desired electrode gap for initial ion current development and/or subsequent Lorentz thrust ion current and pattern of entry into the chamber 14636.

In another exemplary mode of operation of the device 14600, one or more fuel injection events before or after bottom dead center (BDC) can produce a suitable mixture of fuel (e.g., such as methane or other hydrocarbons) and air. For example, a small portion of the fuel-air mixture is compressed into ion launch chamber 14606B, shown in FIG. 14B, for spark or plasma ignition and expansive expulsion into the larger portion of mixed fuel and air for accelerated combustion. In some embodiments, for example, hydrogen or hydrogen-characterized fuel can be injected before, at, or after TDC to provide improved ignition and acceleration of combustion. For example, hydrogen and hydrogen-characterized fuels can be readily ionized and/or ignited in the exemplary ion launch chamber 14606 of the device 14600 throughout a large range of instantaneous fuel-air ratios (e.g., including 5% to 75% fuel to air ratio) by a very small spark current. This enables a very large ignition timing window for ignition at or near the beginning, during or at the end of each fuel injection events.

Suitable spark generation for such hydrogen or hydrogen-characterized fuel combustion, or other fuel, oxidant, and/or fuel-oxidant mixtures, can be supplied by the exemplary control circuit 14611 (shown in FIG. 14A) and/or by a sequence starting with the circuit 14611, and additional energy may be applied by one or more control circuits (e.g., such as control circuit 14612), as may be needed, e.g., if acceleration of the fuel combustion is needed. More difficult fuel ignition situations including methane and diesel fuel selections are met by much larger plasma current ignition using the exemplary one or more control circuits 14612. Examples of other embodiments and operational techniques of such circuits are provided in U.S. Pat. No. 4,369,756 and U.S. Pat. No. 4,122,816 which are incorporated by reference in their entirety as part of the disclosure of this patent document. Also, for example, various improvements to such circuits including process microcontrollers, solid state relays, power supplies, and diodes are known to those skilled in the art and can be included herein as variations that may reduce the cost and/or improve the performance provided by such circuits including new systems for generation of such plasma and/or corona events. Suitable connections of such circuit selections, e.g., such as the circuits 14611 and/or 14612, can be connected to a connector collar 14631 of the device 14600, which can be securely held in place under nut 14635, as shown in FIG. 14A.

In some embodiments, for example, the electrode configuration of the electrode 14608A, 14608B, and 14608C can include a coaxial passages feature 14608A configured annularly in a pattern generator feature 14608B, which is positioned at the end of the ion launch chamber 14606A, where an electrode 14608C is configured on the interior surface within the launch chamber 14606A. In some examples, the coaxial passages electrode feature 14608A is structured to include suitably angled fins or slots that provide a predetermined projected pattern 14638, e.g., for projection into the chamber 14636 for combustion. In an exemplary implementation of the electrode configuration including electrodes 14608A, 14608B, and 14608C, following an injection and ignition event, heated combustion gases including ions thrust from the pattern generator electrode feature 14608B and the exemplary fins or slots of the coaxial passages feature 14608A provide the projected combustion pattern 14638 that may be launched at subsonic to supersonic velocities including the sonic velocity of hydrogen which is about 3.7 times higher than air in the combustion chamber for achieving improved air-utilization efficiency in the combustion process. For example, the hydrogen shock wave produced by the pattern of hydrogen injection along with swept ions and radicals induces ignition and/or accelerates combustion along with creating a pattern for more efficiently produced corona ignition. In addition, for example, hydrogen provides heating on Joule-Thomson expansion to further improve the combustion rate and thermal efficiency. The rapidly expanding pattern of ignition ions improves the efficiency of corona plasma production in such patterns to provide ignition and/or acceleration of combustion. Such corona can be induced by an exemplary corona generation electrode or electrodes, e.g., such as antenna electrodes that can be included in the device 14600. For example, such rapid hydrogen characterized combustion options enables injection and ignition after TDC to further improve brake mean effective pressure (BMEP), torque, drivability, and fuel efficiency.

For example, as shown in FIG. 14A, the device 14600 can include an exemplary fiber optic assembly 14624 including sensors for detecting adherence or deposits of potential varnish or other fouling components to initiate cleaning operations (e.g., implemented using switching via control by the exemplary circuits 611 to 612), production of activated oxidant plasma during intake or compression periods before fuel injection, and/or utilization of a cooling fluid to dislodge and expel deposited material. The device 14600 can include an exemplary microprocessor 14626 that may communicate and coordinate with the exemplary controller 14631 to provide control of such cleaning, fuel injection and ignition operations and/or to consolidate and process engine operations data to enable adaptive improvements including utilization of energy such as regenerative energy to provide or produce fuel, e.g., such as hydrogen and/or other fuels, and oxidants, e.g., such as oxygen, adjustment of oxidant delivery and/or fuel injection pressure, timing of injection events, timing of debris cleaning events, timing of oxidant activation and/or timing of primary or complementary ignition or combustion acceleration events, including detection of favorable or adverse emissions etc.

Figure 15A:
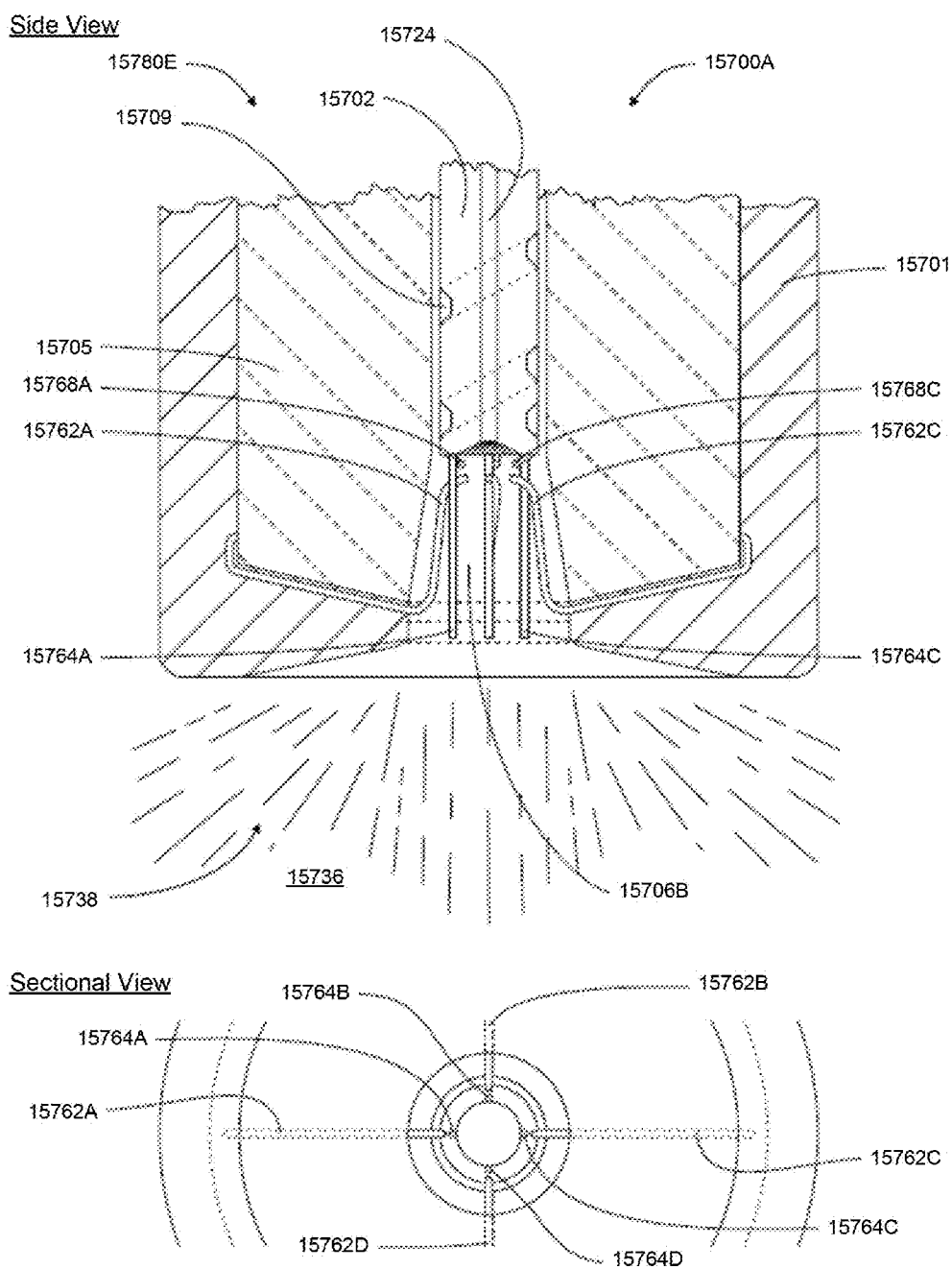
FIG. 15A shows a diagram of an exemplary ion generation and launch assembly that can be employed in an exemplary injection and/or ignition device of the disclosed technology.
Figure 15B:
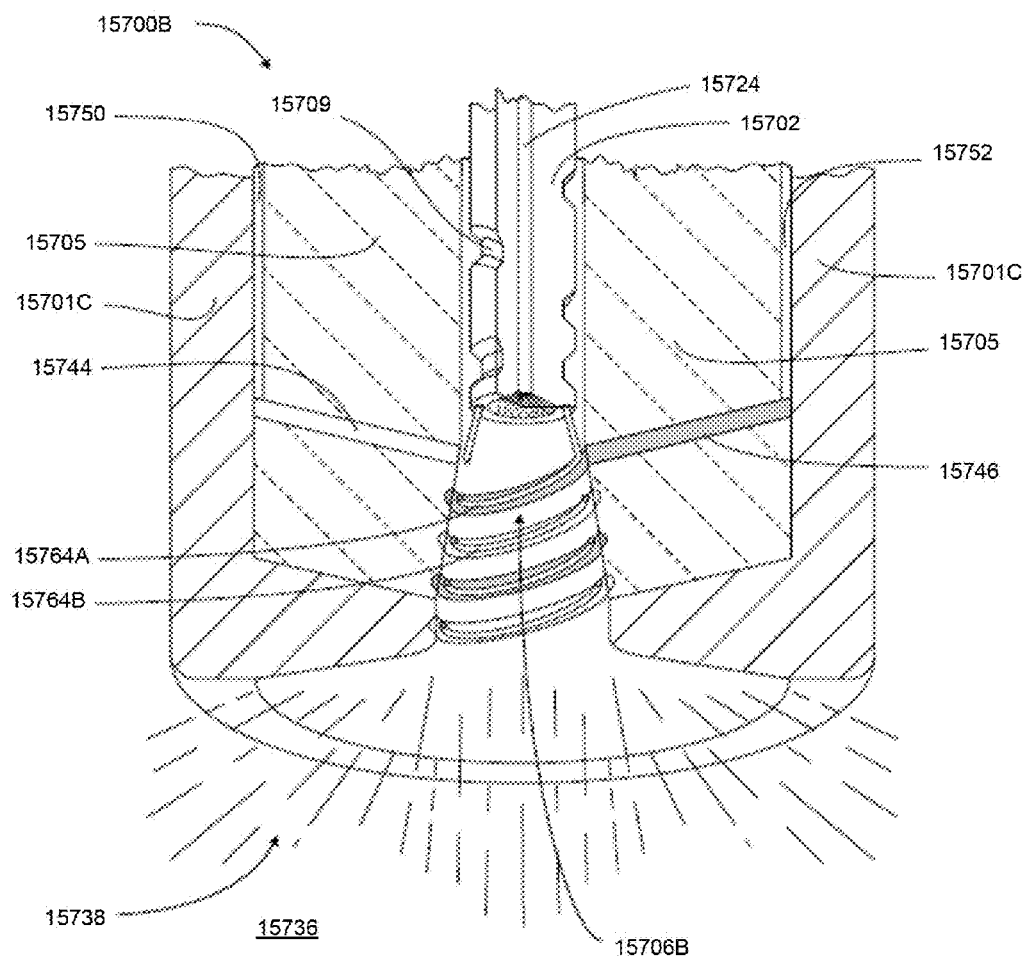
FIG. 15B shows a diagram of another exemplary ion generation and launch assembly that can be employed in an exemplary injection and/or ignition device of the disclosed technology.
Figure 15C:
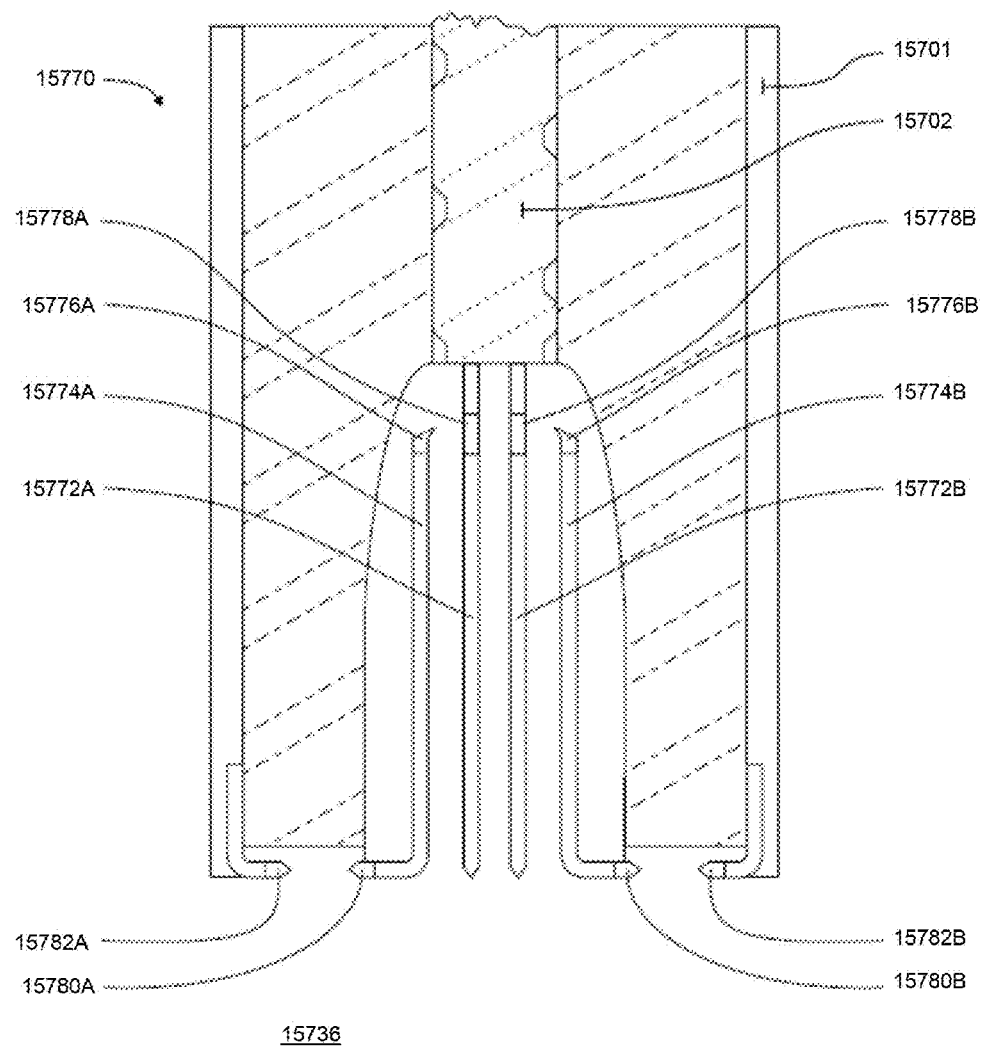
FIG. 15C shows a diagram of another exemplary ion generation and launch assembly that can be employed in an exemplary injection and/or ignition device of the disclosed technology.

Referring to the drawings of FIGS. 15A-15C, FIG. 15A shows a diagram of an exemplary ion generation and launch assembly 15700A, which can be employed in an exemplary injection and/or ignition device described herein. The ion generation and launch assembly 15700A includes one or more electrodes such as 15764A, 15764B, 15764C and 15764D in any suitable pattern are extended from electrode 15702 to create ion currents in the gaps between adjacent electrodes 15762A, 15762B, 15762C and 15762D that are attached to a conductive or semiconductive case 15701. One or more ion currents are generated between adjacent electrodes at times that a control unit or controller, e.g., such as control unit/circuit 14630, activates suitable circuits for DC, pulsed DC, AC or RF voltage gradients across such electrode pairs. Such electrode pairs may be configured of any suitable shape and configuration including curvilinear forms and helical spirals.

For example, a current initiation edge, point, or low work function material can be employed to any one or all of the electrodes 15768A, 15768B, 15768C, and 15768D such that an electrode pair is capable to produce a relatively small current that greatly reduces the impedance to allow current maintenance with reduced voltage or much larger currents to be produced and thrust by Lorentz forces that develop upon continued application of voltage across each gap. In some embodiments the shape of such electrode pairs, e.g., electrode pair 15762A-15764A and 15762B-15764B and 15762C-15764C and 15762D-15764D, etc., can provide Lorentz thrust launch vectors that direct ion patterns to specific zones or that are complementary or counter to swirl and/or tumble flows in the combustion chamber.

FIG. 15B shows a diagram of another exemplary ion generation and launch assembly 15700B, which can be employed in an exemplary injection and/or ignition device described herein. The assembly 15700B includes one or more separate electrodes 15744 and 15746 configured to be of any suitable shape and configuration that are supported and/or attached to the insulator body 15705 within an exemplary insulator case 15701B. In the exemplary embodiment illustrated in FIG. 15B, the electrodes 15744 and 15746 are formed into separate spirals or helical shapes and are connected to suitable control units and/or activation circuits, e.g., such as 630, 611, and 612, through connectors 15750 and 15752 of the assembly 15700B. The assembly 15700B includes electrodes 15764A and 15764B that are attached to electrode 15702 and are shaped to form separated electrode pairs with electrodes 15744 and 15746. This exemplary arrangement enables various timing sequences, applied voltage controls, and outcomes such as development of Lorentz force toward electrode 15702 by one pair such as 15744-15764A and away from electrode 15702 by another pair 15746-15764B to produce ion circulation, multiplication, and/or current manipulation by ion launch chamber of assembly 15706B for control of various launch patterns into the chamber 15736 (e.g., combustion chamber). Similarly, currents may be established between portions of 15744 and 15746 and/or between 15744-15764A and 15746-15764B pairs to form two helical thrust pathways to launch ions toward the chamber 15738.

For example, the exemplary electrodes 15764A and 15764B form pairs with certain portions of the electrodes 15744 and 15746 (e.g., such as the lower portions) to provide for initial ion currents to be produced between adjacent electrodes 15744 and 15746 and subsequently for ion currents to be formed between 15744 and 15764A and/or between 15746 and 15764B. This exemplary configuration can provide additional ion generation impetus in exemplary embodiments that include catalytic surface agents in or on the exemplary ceramic body 15705 in the zones near such electrodes. In some instances a larger portion of the electrode 15744 forms a pair with electrode 15764A, as does the electrode 15746 form a pair with electrode 15764B, e.g., to launch one or more ion currents into the chamber 15736.

FIG. 15C shows a diagram of another exemplary ion generation and launch assembly 15770, which can be employed in an exemplary injection and/or ignition device described herein. The exemplary assembly 15770 is operable to initiate a small current across one or more electrode pairs such as 15772A-15774A and/or 15772B-15774B at a narrowed gap and/or a reduced work function material or coating at a location relatively near the fuel injector and electrical conductor tube 15702.

In some embodiments of the assembly 15700, for example, one or more combustion chamber gaps between electrode segments 15780A-15782A and/or 15780B-15782B is provided in addition to the current initiation gap between segments 15776A-15778A and/or 15776B-15778B. In certain applications such antenna electrodes may be threaded or have other surface features such as straight or curvilinear splines or concentric rings in regions toward the combustion chamber. Upon initiating such current the impedance can be dramatically reduced to allow a lower voltage current source, e.g., such as the exemplary circuits 14611 or 14612 circuit or other suitable circuit, e.g., including a transformer, capacitor and/or battery, to controllably produce a larger current as it is thrust by Lorentz force toward the combustion chamber 15736.

The avalanche current of ions produced can serve as ignition initiators for fuel-oxidant mixtures in the ion launch chamber 15706B within dielectric 15705 and subsequently ignite homogeneous or stratified fuel-oxidant mixtures in combustion chamber 15736. Oxidant that enters ion launch chamber 15706B such as inflow during intake or compression strokes may be ionized during a cleaning cycle and launched into combustion chamber 15736 to initiate combustion of fuel that is present or that is subsequently delivered. The launch velocity of ions and combustants that are injected into combustion chamber 15736 depends upon the fuel type and pressure along with the Lorentz electrode geometry and thrust force that is produced.

Figure 16A:
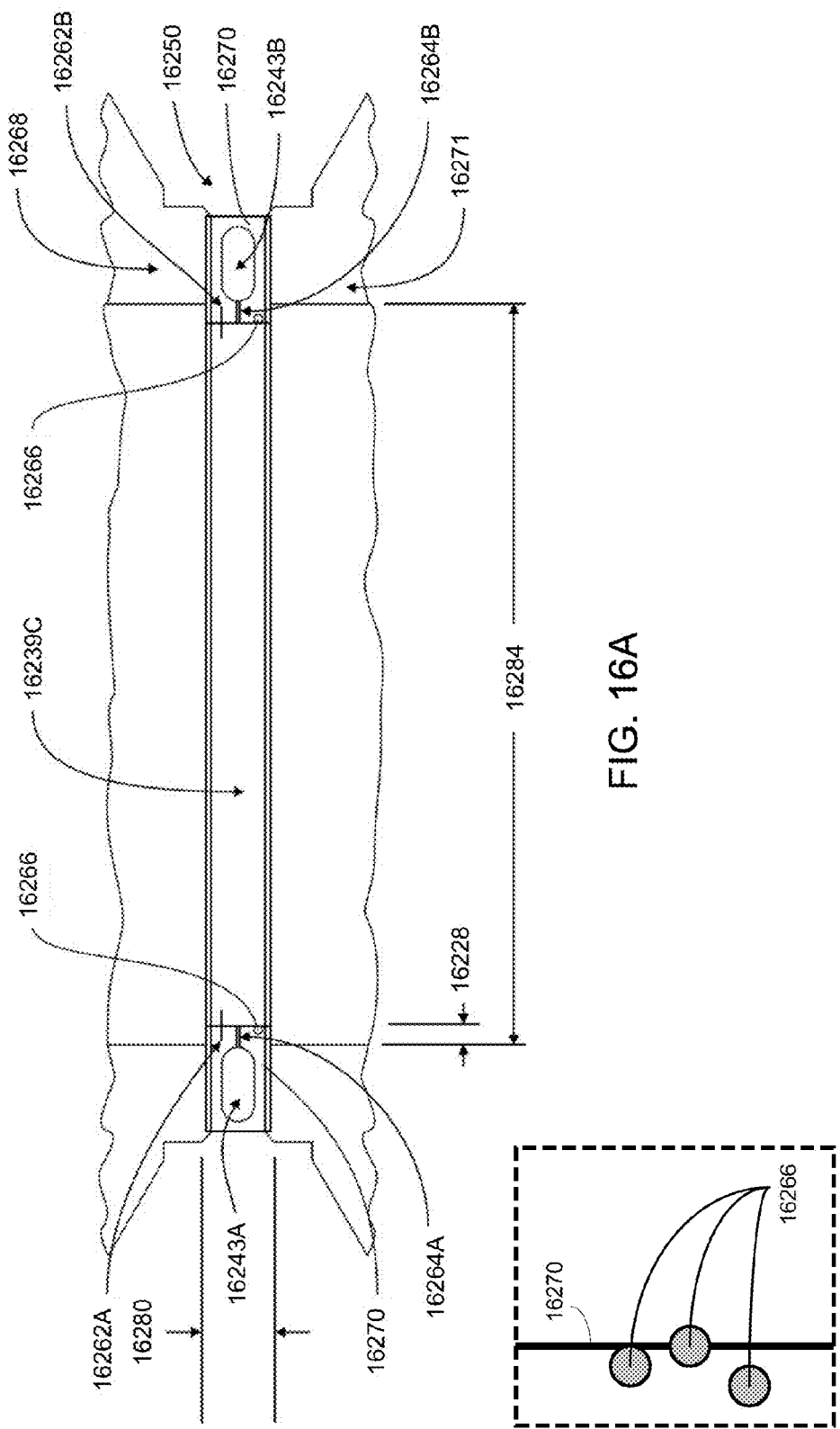
FIG. 16A shows a diagram of an exemplary multifunctional gasket assembly capable of producing Lorentz force and corona discharge for implementing fuel ignition and cleaning applications in a chamber.
Figure 16B:
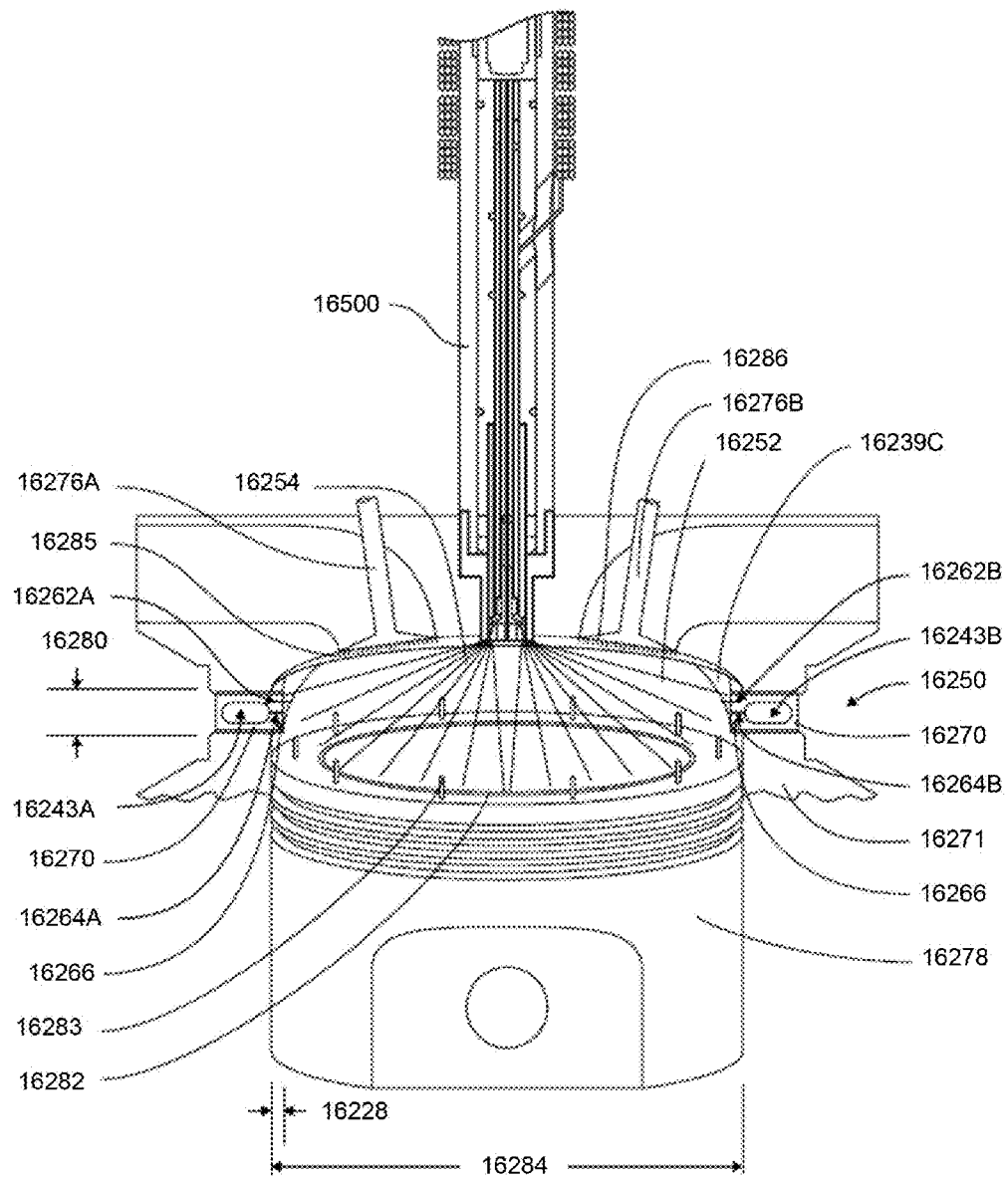
FIG. 16B shows a diagram of the exemplary multifunctional gasket assembly of FIG. 16A implemented in a combustion chamber including an exemplary injector and/or ignition device of the disclosed technology.

Referring to the drawings of FIGS. 16A and 16B, FIG. 16A shows a diagram of an exemplary multifunctional gasket assembly 16250 capable of producing Lorentz force and corona discharge for implementing fuel ignition and cleaning applications in a chamber. FIG. 16B shows a diagram of the exemplary multifunctional gasket assembly 16250 implemented in a combustion chamber including an exemplary injector and/or ignition device of the disclosed technology. In some applications, for example, the gasket assembly 16250 can be implemented in an engine, e.g., including, but not limited to a two- or four-cycle piston engine with direct injection of fuel, to implement the various combinations of Lorentz and/or Corona ignition and/or acceleration of combustion processes. In some examples, fuel may be injected with or without Lorentz ion current thrust and ignition may be produced by positive or negative corona that is induced by an injector that includes corona production antenna 16262, which may be negative or positive or alternating polarity at a suitable frequency. In some embodiments, for example, fuel and/or Lorentz thrust fuel ions can be injected into the combustion chamber, and ignition is provided by corona plasma that is generated in the penetrating fuel pattern as a result of a high voltage electric field that is applied by antenna of the gasket assembly 16250 interfaced in a chamber 16239 (e.g., a combustion chamber), in which the corona discharge can include a duration such as one to a few nanoseconds including a period up to about 60 nanoseconds.

In an exemplary operation, the exemplary antenna of the gasket assembly 16250 (e.g., which can be configured as insulated antenna) can be implemented to apply a negative field to produce ozone and/or oxides of nitrogen from the air in the combustion chamber and a field that also ionizes injected fuel particles. Such exemplary negative antenna electrode structures of the gasket 16250 may be configured to have sharp edges, rods, needles, relatively small wire loops or toroids or other field concentrating features. Positive field production from another exemplary antenna electrode structure that can be implemented at selected times and at applied frequencies, where the positive field is generated by one or more positive corona production antenna 16266. The antenna 16266 can be configured as a blunt edged wire or a ring structure that is embedded within an insulative casing 16270 of the gasket assembly 16250, e.g., ceramic or other dielectric material, e.g., such as boron nitride, aluminum oxide or mica.

An exemplary engine may utilize the multifunctional gasket assembly 16250 to increase, decrease, or maintain the effective compression ratio of the engine, e.g., which can depend upon the selection of dimensions 16280 for the thickness of the gasket assembly 16250, as well as selection of an interior-protruding inset dimension 16228 into the chamber 16239C, as compared to the original cylinder bore dimension 16284 of the chamber 16239C. The multifunctional gasket assembly 16250 may also be configured to receive gases and/or inject fluid such as fuel from the combustion chamber 16239C by transfer through a valve 16264 from a passageway, conduit, and/or accumulator 16243, e.g., shown in cross-sectional view of FIG. 16A as valve 16264A and 16264B to/from passageway 16243A and 16243B. In embodiments of the gasket assembly 16250, the valve 16264 can include a slit valve or a piezoelectric valve.

Exemplary fluid selections that may be dispensed into combustion chamber 16239C from one or more passageways 16243 include fuels such as hydrogen, carbon monoxide, ammonia, methane, ethane, propane etc., and combustion promoters such as dimethylether (DME) and diethylether (DEE). Similarly oxidants such as oxygen, oxides of nitrogen, and hydrogen peroxide may be dispensed at selected times to participate in cleaning and/or combustion events.

In some embodiments, for example, an engine such as a two- or four-cycle piston engine can be converted to unthrottled air entry operation with direct injection of fuel. Fuel may be injected with or without Lorentz ion current thrust and ignition may be produced by positive or negative corona that is induced by an injector that includes corona production antenna electrode(s), illustrated in FIG. 16B as an exemplary injection and/or ignition device 16500.

In some embodiments, for example, fuel and/or Lorentz thrust fuel ions are injected into the combustion chamber, and ignition is provided by corona discharge that is generated in a predetermined penetrating fuel pattern, e.g., as a result of a high voltage electric field that is applied, e.g., for a duration of a few nanoseconds, by one or more of the exemplary corona-generating spaced antenna 16262A, 16262B, ..., 16262x that can be arranged on the inner region of the gasket 16250 interfaced into the chamber 16239. In an illustrative operation, for example, application of a negative field from the exemplary insulated corona-generating antenna 16262A-16262x of the gasket 16250 can produce ozone and/or oxides of nitrogen from the air in the combustion chamber 16239C and a field that also ionizes fuel particles in the injected fuel penetration pattern, e.g., such as hydrogen and/or other fuels such as methane, propane or nitrogenous substances, to accelerate ignition and/or completion of combustion. The positive corona antenna 16266, e.g., such as a wire, ring, or rounded plate, may be mounted to the surface of, protrude from, or be recessed within the exemplary ceramic or dielectric material of the body 16270, as shown in the inset diagram of FIG. 16A.

As shown in FIG. 16B, various combinations of oxidation activation by Lorentz ion thrusting, fuel injection, fuel ion current thrusting in predetermined penetration patterns 16254, along with positive or negative corona production, can be implemented by the exemplary multifunctional injection and/or ignition device 16500 interfaced with the exemplary combustion chamber 16239C containing an exemplary multifunctional gasket 16250 at the top or upper portion of the combustion cylinder. Such configuration of the device 16500 and gasket assembly 16250 with a combustion chamber can be implemented to meet a wide range of operating conditions. For example, an exemplary operation can include positive or negative corona production in the chamber 16239C by the exemplary corona-generating antenna 16262A, 16262B, etc. of the gasket 16250, by one or more other combustion chamber electrode inserts in locations configured on the piston 16278 for positive corona production (e.g., via a ring, circular plate, or wire antenna 16282 on the piston 16278) or negative corona production (e.g., via protruding, sharp-ended antenna 16283 on the piston 16278), and/or by the valve 16276A for negative corona production (e.g., via protruding, sharp-ended antenna 16285 on the valve 16276A) or positive corona production (e.g., via a ring, circular plate, or wire antenna 16286 on the valve 16276B). Illustratively, for example, the electrodes may Lorentz thrust and/or corona generate combustion chamber penetration patterns of positive or negative ions, and the electrodes 16582 may induce positive or negative corona production in such patterns, as well as electrodes 16262 and 16266 of the gasket assembly 16250 may induce positive or negative corona production in such patterns.

In some instances, for example, radiant, thermal or pressure energy produced in the combustion chamber can be converted into electrical energy for such operations. Adaptive combinational selections, timing, duration, and magnitude of such operational events is provided by a controller and may be utilized in combination with other controllers that are co-located with gasket assembly 16250 to optimize fuel efficiency, power production and engine life.

Exemplary Advantages and Applications of the Disclosed Technology

The disclosed devices, systems, and methods for injecting and/or igniting a fluidic substance using Lorentz forces and/or Lorentz-assisted corona discharges based on electrode configurations of the present technology can provide a variety of advantages in various implementations. For example, in some implementations, utilization of an exemplary coaxial electrode configuration where the coaxial electrodes impart swirl of high velocity (e.g., yet subsonic) fuel tangents are capable to produce appropriate stratified coniform(s) or patterns for a combustion chamber. For example, the disclosed devices, systems, and methods can be implemented to initiate a small current at a reduced gap or work function at the beginning of the Lorentz thrust length to reduce the voltage requirement in high compression engine applications, e.g., such as high compression diesel engines. For example, the disclosed devices, systems, and methods can be implemented to increase the current across much larger fuel cooled electrode areas to reduce erosion. For example, the disclosed devices, systems, and methods can be implemented to increase the current to produce the desired Lorentz acceleration and launch velocity. For example, in some implementations, utilization of an exemplary Lorentz-thrust system of the present technology enables the ability to receive oxidant during the compression stroke and to generate a current of ionized oxidant that is launched at a lower velocity than the subsequent fuel injection and to time the interception of the launched oxidants by higher velocity fuel to control stratified combustion after TDC (top dead center) to optimize Brake Mean Effective Pressure (BMEP) and fuel efficiency. For example, in some implementations, generation of corona ignition is more efficiently provided in one or both of the patterns of ions launched by the Lorentz electrodes and/or in the intercept zone to accelerate initiation and/or completion of combustion. And, in some implementations, for example, it is highly favorable to utilize adaptively adjusted magnetic lens to produce coaxial cones of Lorentz launched ions and swirl tangents to increase air-utilization efficiency in events including multi-burst stratified combustion, expansive work production by surplus air that is heated, and insulation of hot combustion gases by surplus air to reduce heat transfer to the engine cooling system. For example, the disclosed devices, systems, and methods can be implemented to provide fail safe or limp home modes of operation, e.g., including generation of spark ignition at the combustion chamber interface of the Lorentz coaxial electrodes by ionization of an unthrottled air-fuel mixture using hydrogen or hydrogen-characterized fuel blends.

In particular, for example, with regards to compressed natural gas (CNG), methane, or other $C_xH_y$ fuels as a fluidic substance for use in the disclosed devices, systems, and methods, the following techniques can be employed. For example, to provide unthrottled air inlet and stratified-charge ignition and combustion of methane, Lorentz force can be utilized to launch activated oxidant ion currents and subsequent Lorentz force launched fuel ions such as $CH_3$, $CH_2$, CH, H, $H^+$ etc., which are swept along with valve-controlled sonic velocity bursts of $CH_4$. Therefore, by implementing such techniques, carbonaceous remnants that are deposited on the coaxial electrodes by such methane fuel injection events are oxidized and removed.

The disclosed devices, systems, and methods described herein can be implemented to perform cleaning and fueling sequence techniques utilizing the Lorentz ion current thrust production of the disclosed technology, and using exemplary control circuits. In one example, at the beginning of a cleaning and fueling sequence technique at a variably-controlled look ahead time before the fuel valve is opened and while the exemplary coaxial electrodes are loaded with compressed air, a small current is produced at a reduced gap at the beginning of the Lorentz thrust length to reduce the voltage requirement in a high compression engine applications (e.g., high compression diesel engine). In some applications, this small current can be current-limited at far less than lethal magnitude, although at very high voltage (e.g., similar to a Taser discharge in air.) Upon establishing the small current of ions across the reduced gap, the impedance will precipitously diminish and the ion current can be dramatically increased as a current source with far higher than lethal current capacity is utilized. Thus at the beginning of an exemplary cleaning and fueling sequence technique, moist air can be used to source the production of highly-activated $O_3$, O, $O^-$, $OH^-$, NO, $N_2O$, $NO_2$ ions and radicals that will impinge upon, chemically attack, and clean the carbonaceous remnants from the electrode surfaces.

Subsequently, for example, methane flow will start through the fuel control valve and a small current is will be produced at the reduced gap provided at the beginning of the Lorentz thrust length to reduce the voltage requirement in the high compression engine application. Also in such exemplary applications, this small current can be current-limited at far less than lethal magnitude, although at very high voltage (e.g., similar to a Taser discharge in air.) Upon establishing the small current of ions across the reduced gap, the impedance will precipitously diminish and the ion current can be dramatically increased as a current source with far higher than lethal current capacity is utilized to launch fuel ions such as $CH_3$, $CH_2$, CH, H, $H^+$ etc., that are swept along with each valve-controlled sonic velocity burst of $CH_4$.

The circuit charging-discharging sequences for such cleaning and fueling sequences must be able to provide the above steps at cold start and engine cycle frequencies up to about 100 Hz. During each Lorentz launch time, the exemplary control circuit must be able to sustain current sourcing such as needed for relatively slow launches for air ions and fast launches for fuel ions.

The exemplary cleaning and fueling sequences techniques can include delay between a cleaning sequence and a fueling sequence. In some implementations, the same sub-circuit is utilized repeatedly (e.g., as compared to one sub-circuit for the utilized for the cleaning sequence and another sub-circuit for the fueling sequence), for example, a minimum time delay depending upon the piston speed i.e. engine revolutions per minute or RPM can be utilized during operation of the technique. For example, in some applications, a fueling sequence may be desired to begin before the end of a cleaning sequence to initiate combustion of the fuel as it impinges at higher velocity through the interface with the activated oxidant ions.

In certain applications positive or negative corona discharges are stimulated in one or more patterns produced by an acoustic shock wave caused by injection of a fluid at a velocity that exceeds the speed of sound of at least some of the gaseous contents in the combustion chamber.

In other applications positive or negative corona discharges are stimulated in one or more patterns provided by injection of sparks that are launched from controlled erosion of selected electrode surfaces that have considerable reserve material such as portions near the combustion chamber of electrode 1028 in which a small ion current is thrust along such erodible material surface to cause sparks to be included in the ion current that is launched into the combustion chamber. Suitable metal alloys for production of such sparks include but are not limited to various modified oxidation and erosion resistant alloys that are used for spark plug electrodes such as alloys that typically contain combinations of selections such as iron, nickel, cobalt, chromium, molybdenum, or aluminum. Modifications for spark production purposes include additions of small amounts of misch metal selections such as cerium, lanthanum and/or praseodymium.

In other embodiments such spark producing surfaces are utilized as sites that launch misch metal sparks as a result of one or more electrical trigger sparks at or near the combustion chamber interface. In certain embodiments the electrical trigger spark is generated on or proximate to a surface with low work function and a proximate substance contributes a spark of hot metal that may be projected into the combustion chamber by the flow of oxidant and/or fuel. Oxidation of the hot metal spark may further increase the temperature and ability to initiate and/or accelerate combustion of fuel in the combustion chamber. Electrodes such as 14602, 14644, 14646, 15762, 15764, 15780, 15772, 15782, 16262, 16266, 16282, 16283, and 16285 may be utilized to provide such low work function zones and/or metal spark material.

In other embodiments a corona discharge is first produced between relatively close spaced electrodes such as 14602, 14644, 14646, 15762, 15764, 15780, 15772, 15782, 16262, 16266, 16282, 16283, and 16285 whereby the first corona plasma is then swept or thrust into the combustion chamber by the flow of a fluid such as oxidant or fuel. The velocity of such swept corona plasma may range from subsonic to supersonic. The pattern produced by such swept corona generated plasma is then utilized to stimulate a second corona discharge in the combustion chamber to accelerate ignition and/or completion of combustion.

The following processes summarize such events:

Process 1: Inject fluid oxidant and/or fuel at a velocity that produces a pattern of sonic shock in at least some of the gas contents of a combustion chamber. Utilize the resulting pattern of sonic shock to stimulate corona plasma production in the combustion chamber. Utilize the corona plasma to produce ignition and/or to accelerate completion of combustion of fuel in the combustion chamber.

Process 2: Lorentz thrust ion current across a surface that contributes sparks of metal and sweeps such sparks into a combustion chamber. Utilize the pattern of such sparks in the combustion chamber to stimulate corona plasma production in the combustion chamber to produce ignition and/or to accelerate completion of combustion of fuel in the combustion chamber.

Process 3: Generate an electrical spark on a surface proximate to a combustion chamber that contributes metal sourced material at a temperature sufficient to produce ignition and/or to accelerate completion of combustion of fuel in the combustion chamber. In some applications the metal sourced material is further heated by oxidation. In certain applications the metal sourced material is swept into the combustion chamber by the flow of oxidant and/or fuel.

Process 4: Stimulate a first corona plasma in a location proximate to a combustion chamber. Sweep the first corona plasma into the combustion chamber to produce ignition and/or to accelerate completion of combustion of fuel in the combustion chamber.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method to produce an ignition in a chamber, comprising:
   generating a positive corona discharge at a predetermined location in a chamber;
   producing a Lorentz force to thrust ions into the chamber; and
   generating a negative corona discharge at the or another predetermined location proximate a port toward the chamber at a faster rate than that of the positive corona discharge,
   wherein the negative corona discharge combines with the positive corona discharge to ignite an ignitable substance in the chamber.

2. The method of claim 1, wherein the chamber contains a fluidic substance present in the chamber, the fluidic substance including at least one of a fuel or an oxidant.

3. The method of claim 1, wherein the generating the positive corona discharge at the predetermined location includes applying an electric field at a corona-generating electrode positioned proximate to the port of the chamber.

4. The method of claim 3, wherein the corona-generating electrode comprises a high work function material.

5. The method of claim 3, wherein the corona-generating electrode is structured to include a plurality of electrodes having at least two different structural configurations, wherein one structural configuration includes a substantially blunt end that is projected toward the port, and another structural configuration includes a circular, curvilinear, or pointed end that is projected toward the port.

6. The method of claim 3, wherein the generating the negative corona discharge includes applying another electric field at the corona-generating electrode subsequent to the applied electric field at the corona-generating electrode to generate the positive corona.

7. The method of claim 3, wherein the generating the negative corona discharge includes applying an electric field at a second corona-generating electrode positioned proximate to the port of the chamber.

8. The method of claim 7, wherein the second corona-generating electrode comprises a high work function material.

9. The method of claim 7, wherein the second corona-generating electrode is structured to include a circular, curvilinear, or pointed end.

10. The method of claim 9, wherein the generated negative corona discharge is characterized by at least one of a larger and faster-emanating field.

11. The method of claim 1, wherein the generated positive corona discharge is characterized by at least one of a smaller and slower-emanating field.

12. The method of claim 1, wherein the producing the Lorentz force includes:
   generating a current of ionized particles of a fluidic substance in a region between two electrodes proximate the port by applying an electric field between the electrodes to ionize at least some of the fluidic substance, and
   applying a magnetic field to interact with the generated current of the ionized particles.

13. The method of claim 12, wherein the applied magnetic field is applied by an electromagnet and/or a permanent located at a position proximate the chamber.

14. The method of claim 12, wherein the applied magnetic field is applied by a permanent magnet material included as part of at least one of the electrodes that generates the current of the ionized particles.

* * * * *